(12) United States Patent
Pan et al.

(10) Patent No.: US 12,375,653 B2
(45) Date of Patent: Jul. 29, 2025

(54) FILTERING METHOD AND APPARATUS AND DEVICES

(71) Applicant: HANGZHOU HIKVISION DIGITAL TECHNOLOGY CO., LTD., Hangzhou (CN)

(72) Inventors: Dongping Pan, Hangzhou (CN); Yucheng Sun, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/262,227

(22) PCT Filed: Mar. 2, 2022

(86) PCT No.: PCT/CN2022/078876
§ 371 (c)(1),
(2) Date: Jul. 20, 2023

(87) PCT Pub. No.: WO2022/184109
PCT Pub. Date: Sep. 9, 2022

(65) Prior Publication Data
US 2024/0146916 A1 May 2, 2024

(30) Foreign Application Priority Data
Mar. 5, 2021 (CN) .......................... 202110247471.2

(51) Int. Cl.
H04N 19/117 (2014.01)
H04N 19/105 (2014.01)
(Continued)

(52) U.S. Cl.
CPC ......... *H04N 19/117* (2014.11); *H04N 19/105* (2014.11); *H04N 19/182* (2014.11); *H04N 19/80* (2014.11)

(58) Field of Classification Search
CPC .. H04N 19/117; H04N 19/105; H04N 19/182; H04N 19/80; H04N 19/14;
(Continued)

(56) References Cited

U.S. PATENT DOCUMENTS 11,523,111 B2 * 12/2022 Kotra ...................... H04N 19/70
2012/0082244 A1 * 4/2012 Chen ...................... H04N 19/82
375/E7.189

(Continued)

FOREIGN PATENT DOCUMENTS

CN 102857751 1/2013
CN 104702963 6/2015
(Continued)

OTHER PUBLICATIONS

International Search Report in International Appln. No. PCT/CN2022/078876, mailed on May 24, 2022, 6 pages (with English translation).
(Continued)

Primary Examiner — Francis Geroleo
(74) Attorney, Agent, or Firm — Fish & Richardson P.C.

(57) ABSTRACT

Filtering methods, apparatus, and devices are provided. In one aspect, a filtering method includes: determining whether enhanced adaptive leveling filtering is enabled for a current adaptive leveling filtering unit; if it is determined that the enhanced adaptive leveling filtering is enabled for the current adaptive leveling filtering unit, performing adaptive leveling filtering on the current adaptive leveling filtering unit by using a first filter; if it is determined that the enhanced adaptive leveling filtering is disabled for the
(Continued)

current adaptive leveling filtering unit, performing adaptive leveling filtering on the current adaptive leveling filtering unit by using a second filter. The first filter includes a centrosymmetric filter with a 7*7 cross shape plus a 5*5 square shape, and the second filter includes a centrosymmetric filter with a 7*7 cross shape plus a 3*3 square shape.

14 Claims, 9 Drawing Sheets

(51) Int. Cl.
*H04N 19/182* (2014.01)
*H04N 19/80* (2014.01)

(58) Field of Classification Search
CPC ...... H04N 19/176; H04N 19/82; H04N 19/86; H04N 19/70
See application file for complete search history.

(56) References Cited

U.S. PATENT DOCUMENTS

| | | | |
|---|---|---|---|
| 2012/0177104 A1 | 7/2012 | Budagavi et al. | |
| 2012/0189064 A1* | 7/2012 | Kossentini | H04N 19/117 375/E7.193 |
| 2014/0355695 A1* | 12/2014 | Lim | H04N 19/13 375/240.29 |
| 2018/0324420 A1* | 11/2018 | Wang | H04N 19/103 |
| 2021/0014537 A1* | 1/2021 | Hu | H04N 19/174 |
| 2021/0021820 A1* | 1/2021 | Ikai | H04N 19/124 |
| 2021/0195183 A1* | 6/2021 | Hu | H04N 19/176 |
| 2022/0078415 A1* | 3/2022 | Taquet | H04N 19/136 |

FOREIGN PATENT DOCUMENTS

| | | |
|---|---|---|
| CN | 105306957 | 2/2016 |
| CN | 106878729 | 6/2017 |
| CN | 113824956 | 12/2021 |
| CN | 113852831 | 12/2021 |
| EP | 3481064 | 5/2019 |
| JP | 2021-505074 | 2/2021 |
| KR | 10-2016-0015799 | 2/2016 |
| TW | 202101979 | 1/2021 |
| WO | WO 2018170801 | 9/2018 |
| WO | WO 2019107994 A1 | 6/2019 |
| WO | WO 2020200270 | 10/2020 |
| WO | WO 2021004542 | 1/2021 |

OTHER PUBLICATIONS

Socek et al., "CE2-related: Alternate ALF filter shapes for luma" JVETof ITU-TSG 16 WP 3 and ISO/IEC JTC I/SC 29/WG 11, Jan. 9, 2019, 5 pages.
Taquet et al., "CE5-4: Alternative luma filter sets and alternative chroma filters for ALF" JVET of ITU-T SG 16 WP 3 and ISO/EC JTC 1/SC 29/WG 11, Jun. 18, 2019, 6 pages.

* cited by examiner

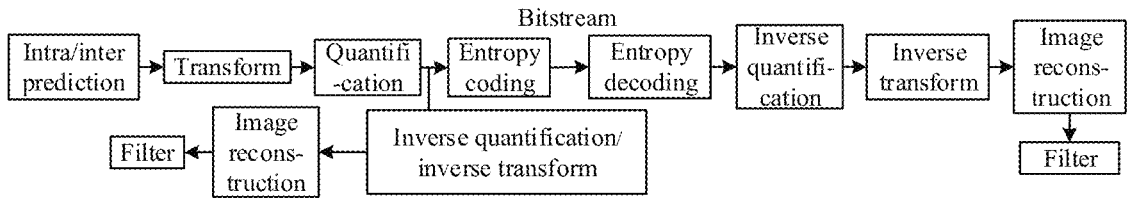
FIG. 1A
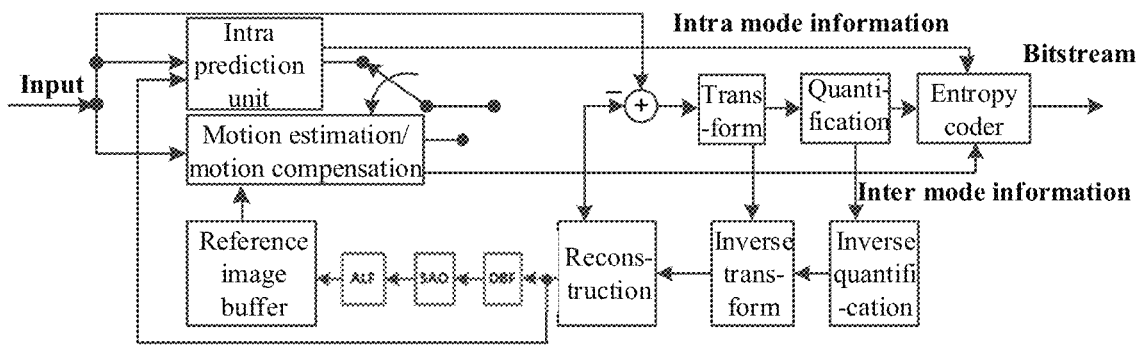
FIG. 1B
FIG. 2

FILTERING METHOD AND APPARATUS AND DEVICES

CROSS REFERENCE TO RELATED APPLICATIONS

The present application is a U.S. National Stage of International Application No. PCT/CN2022/078876, filed on Mar. 2, 2022, which claims the benefit of priority to Chinese Application No. 202110247471.2, filed on Mar. 5, 2021, the contents of which are incorporated herein by reference in their entireties for all purposes.

TECHNICAL FIELD

The present disclosure relates to video coding and decoding technologies and in particular to a filtering method and apparatus and devices.

BACKGROUND

Complete video coding typically includes operations such as prediction, transform, quantization, entropy coding and filtering. There is a quantization operation after block-based motion compensation, which produces coding noises and causes video quality distortion. Typically, loop post-processing techniques can be used to reduce the impact of such distortion. However, in practice, it has been found that the filtering performance of existing loop post-processing techniques is poor.

SUMMARY

In view of this, there is provided a filtering method and apparatus and devices in the present disclosure. Specifically, the present disclosure is achieved by the following technical solutions.

According to a first aspect of the present disclosure, there is provided a filtering method, applied to an encoder/decoder device. The method includes: determining whether enhanced adaptive leveling filtering is enabled for a current adaptive leveling filtering unit; if it is determined that the enhanced adaptive leveling filtering is enabled for the current adaptive leveling filtering unit, performing adaptive leveling filtering on the current adaptive leveling filtering unit by using a first filter; if it is determined that the enhanced adaptive leveling filtering is disabled for the current adaptive leveling filtering unit, performing adaptive leveling filtering on the current adaptive leveling filtering unit by using a second filter. The first filter is a centrosymmetric filter with a 7*7 cross shape plus a 5*5 square shape; and the second filter is a centrosymmetric filter with a 7*7 cross shape plus a 3*3 square shape.

In combination with the first aspect, in a first example, determining whether the enhanced adaptive leveling filtering is enabled for the current adaptive leveling filtering unit comprises: determining a value of a flag for indicating whether the enhanced adaptive leveling filtering is enabled for the current adaptive leveling filtering unit; when the value of the flag is a first value, determining the enhanced adaptive leveling filtering is enabled for the current adaptive leveling filtering unit; and when the value of the flag is a second value, determining that the enhanced adaptive leveling filtering is disabled for the current adaptive leveling filtering unit. The flag for indicating whether the enhanced adaptive leveling filtering is enabled for the current adaptive leveling filtering unit may be EalfEnableFlag, the value of which may be decoded from the decoder device, or obtained from a bitstream data at the decoder device; or a constant value. Obtaining the value of the EalfEnableFlag from the bitstream data at the decoder device may include: determining the value of the EalfEnableFlag based on a value of an enhanced adaptive leveling filtering enable flag parsed from the bitstream data, where the enhanced adaptive leveling filtering enable flag may be a sequence level parameter.

In combination with the first aspect, in a second example, the method further includes: in a process of performing adaptive leveling filtering on a current filtered pixel within the current adaptive leveling filtering unit, for a reference pixel of the current filtered pixels, when the reference pixel is within the current adaptive leveling filtering unit, performing adaptive leveling filtering by using a pixel value of the reference pixel; when the reference pixel is not within the current adaptive leveling filtering unit, the method further includes: if the pixel value of the reference pixel is not available, performing adaptive leveling filtering by using a pixel closest to the reference pixel within the current adaptive leveling filtering unit to replace the reference pixel; and if the pixel value of the reference pixel is available, performing adaptive leveling filtering by using the pixel value of the reference pixel.

In combination with the second example of the first aspect, in a third example, the unavailability of the pixel value of the reference pixel includes one of the followings: the reference pixel is beyond a picture boundary of a current picture; the reference pixel is beyond a patch boundary of a current patch and disallows performing filtering by crossing the patch boundary; and the reference pixel is beyond an upper boundary or a lower boundary of the current adaptive leveling filtering unit.

In combination with the second example or the third example of the first aspect, in a fourth example, the method further includes: if it is determined that the enhanced adaptive leveling filtering is enabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel; if it is determined that the enhanced adaptive leveling filtering is disabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel.

According to a second aspect of the present disclosure, there is provided a filtering apparatus, applied to an encoder/decoder device, the filtering apparatus includes: a filtering unit, configured to determine whether enhanced adaptive leveling filtering is enabled for a current adaptive leveling filtering unit; and further configured to: if it is determined that the enhanced adaptive leveling filtering is enabled for the current adaptive leveling filtering unit, perform adaptive leveling filtering on the current adaptive leveling filtering unit by using a first filter; if it is determined that the enhanced adaptive leveling filtering is disabled for the current adaptive leveling filtering unit, perform adaptive leveling filtering on the current adaptive leveling filtering unit by using a second filter. The first filter is a centrosymmetric filter with a 7*7 cross shape plus a 5*5 square shape; the second filter is a centrosymmetric filter with a 7*7 cross shape plus a 3*3 square shape.

In combination with the second aspect, in a first example, determining, by the filtering unit, whether the enhanced adaptive leveling filtering is enabled for the current adaptive leveling filtering unit includes: determining a value of a flag for indicating whether the enhanced adaptive leveling filtering is enabled for the current adaptive leveling filtering unit; when the value of the flag is a first value, determining the enhanced adaptive leveling filtering is enabled for the current adaptive leveling filtering unit; and when the value of the flag is a second value, determining the enhanced adaptive leveling filtering is disabled for the current adaptive leveling filtering unit. The flag for indicating whether the enhanced adaptive leveling filtering is enabled for the current adaptive leveling filtering unit may be EalfEnableFlag, the value of which may be decoded from the decoder device, or obtained from a bitstream data at the decoder device; or a constant value. Obtaining the value of the EalfEnableFlag from the bitstream data at the decoder device may include: determining the value of the EalfEnableFlag based on a value of an enhanced adaptive leveling filtering enable flag parsed from the bitstream data, where the enhanced adaptive leveling filtering enable flag may be a sequence level parameter.

In combination with the second aspect, in a second example, the filtering unit is further configured to, in a process of performing adaptive leveling filtering on a current filtered pixel within the current adaptive leveling filtering unit, for a reference pixel of the current filtered pixel, when the reference pixel is within the current adaptive leveling filtering unit, perform adaptive leveling filtering by using a pixel value of the reference pixel; when the reference pixel is not within the current adaptive leveling filtering unit, the filtering unit is further configured to: if the pixel value of the reference pixel is not available, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

In combination with the second example of the second aspect, in a third example, the unavailability of the pixel value of the reference pixel includes one of the followings: the reference pixel is beyond a picture boundary of a current picture; the reference pixel is beyond a patch boundary of a current patch and disallows performing filtering by crossing the patch boundary; and the reference pixel is beyond an upper boundary or a lower boundary of the current adaptive leveling filtering unit.

In combination with the second or third example of the second aspect, in a fourth example, the filtering unit is further configured to: if it is determined that the enhanced adaptive leveling filtering is enabled for the current adaptive leveling filtering unit and the pixel value of the reference pixel for performing adaptive leveling filtering on the current adaptive leveling filtering unit is not available, perform adaptive leveling filtering by using a pixel closest to the reference pixel within the current adaptive leveling filtering unit to replace the reference pixel; if it is determined that the enhanced adaptive leveling filtering is disabled for the current adaptive leveling filtering unit and the pixel value of the reference pixel for performing adaptive leveling filtering on the current adaptive leveling filtering unit is not available, perform adaptive leveling filtering by using a pixel closest to the reference pixel within the current adaptive leveling filtering unit to replace the reference pixel.

According to a third aspect of the present disclosure, there is provided a decoder device, including a processor and a machine-readable storage medium, wherein the machine-readable storage medium stores machine-executable instructions capable of being executed by the processor, and the processor is used to execute the machine-executable instructions to implement the filtering method provided in the above first aspect.

According to a fourth aspect of embodiments of the present application, there is provided an encoder device, including a processor and a machine-readable storage medium, where the machine-readable storage medium stores machine-executable instructions capable of being executed by the processor, and the processor is used to execute the machine-executable instructions to implement the filtering method provided in the above first aspect.

In the filtering method of the embodiments of the present disclosure, it is determined whether the enhanced adaptive leveling filtering is enabled for the current adaptive leveling filtering unit; when it is determined that the enhanced adaptive leveling filtering is enabled for the current adaptive leveling filtering unit, adaptive leveling filtering is performed on the current adaptive leveling filtering unit by using the first filter; and when it is determined that the enhanced adaptive leveling filtering is disabled for the current adaptive leveling filtering unit, adaptive leveling filtering is performed on the current adaptive leveling filtering unit by using the second filter. In this way, the filter can be selected more flexibly and the filtering effect is optimized, thus improving the coding and decoding performance.

BRIEF DESCRIPTION OF THE DRAWINGS

FIG. 1A and FIG. 1B are schematic flowcharts illustrating video coding and decoding.

FIG. 2 is a schematic diagram of region partition.

DETAILED DESCRIPTION OF THE EMBODIMENTS

Figure 3:
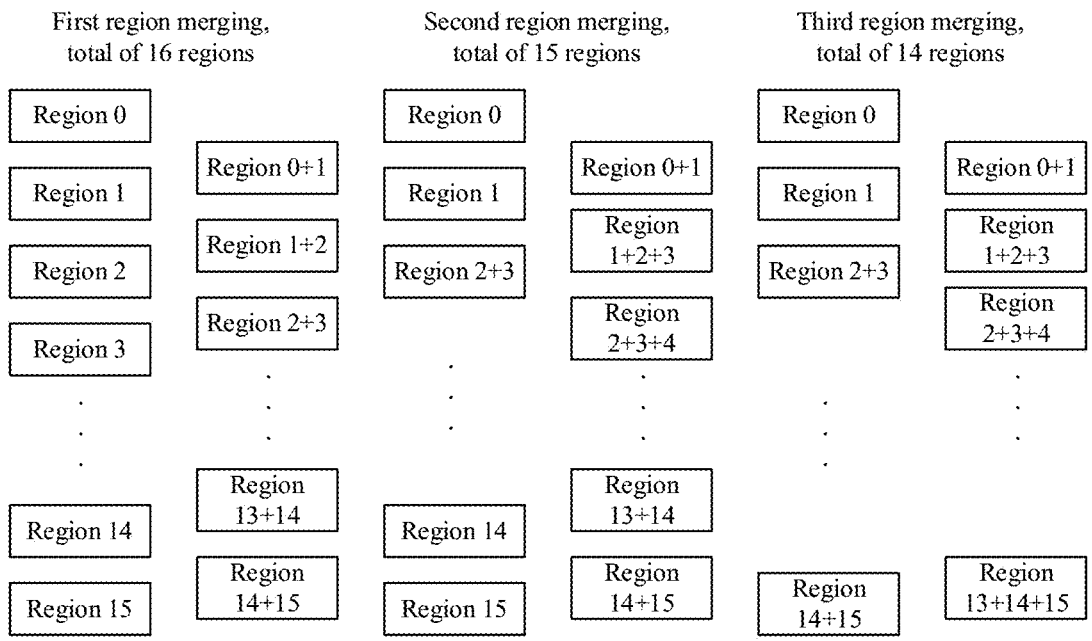
FIG. 3 is a schematic diagram of region merging.

Embodiments will be described in detail herein, which are schematically shown in the accompanying drawings. For the following description related to the drawings, unless otherwise indicated, the same reference numerals in different drawings represent the same or similar elements. The embodiments described in the following do not represent all embodiments consistent with the present disclosure. Rather, they are merely examples of devices and methods consistent with some aspects of the present disclosure as described in the appended claims.

The terms used in the present disclosure are used for the purpose of describing particular embodiments only while not intended to limit the present disclosure. The singular forms "a", "said", and "the" used in the present disclosure and the appended claims shall be interpreted as also covering plural forms, unless the context clearly indicates other meanings.

The following is a brief description of the technical terms, the existing main video coding and decoding processes and the implementation of ALF techniques involved in the embodiments of the present disclosure.

I. Technical Terms

1. Rate-Distortion Optimized (RDO): The index for evaluating the coding efficiency includes a code rate and a Peak Signal to Noise Ratio (PSNR). The smaller the code rate, the greater the compression ratio; the greater the PSNR, the better the quality of the reconstructed picture. In mode selection, the discriminatory equation is essentially a comprehensive evaluation for the above two.

The cost corresponding to the mode: $J(mode)=D+\lambda*R$, where D denotes distortion, which is usually measured using SSE (Sum of Difference Mean Square), where the SSE is a sum of difference mean square of a reconstructed block and a source picture block; $\lambda$ is a Lagrange multiplier; R is an actual number of bits required to code the picture block in this mode, including a sum of the bits required by coding mode information, motion information, and residuals, etc. In mode selection, if the RDO principle is used to make a comparative decision about the coding mode, the best coding performance is usually guaranteed.

2. Coding Tree Unit (CTU): Traditional video coding is implemented based on macroblocks. For a video of 4:2:0 sampling format, one macroblock includes a luma block of 16×16 and two chroma blocks of 8×8. Considering the natures of the high definition/ultrahigh definition video, CTU is introduced into Versatile Video Coding (VVC), where the size of the CTU is specified by the encoder and allowed to be greater than the size of the macroblock. One Coding Tree Block (CTB) and two chroma CTBs at the same location form one CTU together with corresponding syntax elements. In VVC, for a luma CTB of L×L, $L \in \{8, 16, 32, 64, 128\}$.

The luma CTB has a size range of {8×8, 16×16, 32×32, 64×64, 128×128}.

The chroma CTB has a size range of {4×4, 8×8, 16×16, 32×32, 64×64}.

In a high-resolution video coding process, better compression effect can be achieved by using larger CTBs.

3. Deblocking Filter (DBF): The picture coding process is performed based on different blocks, in each of which relatively independent coding is performed. As each block uses a different parameter, the distribution characteristics within the blocks are independent of each other, resulting in a discontinuity at the edges of the blocks, which can be called square block effect. The de-blocking filtering focuses on smoothing block boundaries to remove the square block effect.

4. Sample Adaptive Offset (SAO): It means that, by starting from a pixel domain, classifying a reconstructed picture according to its characteristics, and then performing compensation processing in the pixel domain. The main purpose is to reduce the ringing effect.

5. Adaptive Leveling Filter (ALF): it is applied after DB and SAO, which mainly aims to further improve the picture quality under objective conditions. By using ALF technique, based on the characteristics of the reference pixels, a least-square-based multiple linear regression model is constructed, and filtering compensation is performed in the pixel domain.

In some examples, loop post-processing technique may include DBF, SAO and ALF.

6. Wiener filtering: in essence, the mean square value of the estimate error (defined as a difference between a desired response and an actual output of the filter) is minimized.

II. The Main Process of the Video Coding and Decoding

Referring to FIG. 1A, the video coding, as an example, generally includes processes such as prediction, transform, quantization, and entropy coding. Further, the coding process may be implemented in accordance with the framework of FIG. 1B.

Where the prediction can be divided into an intra prediction and an inter prediction. The intra prediction is predicting a current uncoded block by using surrounding coded blocks as a reference, effectively removing redundancy in a spatial domain. The inter prediction is predicting a current picture by using neighboring coded pictures, effectively removing redundancy in a temporal domain.

The transform is transforming a picture from the spatial domain to a transform domain, so as to represent the picture by using a transform coefficient. Most pictures contain many flat regions and slowly-changing regions. In an appropriate transform, a picture can be transformed from a scattered distribution in the spatial domain to a relatively centralized distribution in the transform domain. In other words, the transform can remove frequency correlation between signals and, in conjunction with a quantization process, can effectively compress the bitstream data.

The entropy coding is a lossless coding method that can transform a series of element symbols into a binary bitstream data for transmission or storage. The input symbols may include quantized transform coefficient, motion vector information, prediction mode information, transform quantization-related syntax, etc. The entropy coding can effectively remove redundancy of the video element symbols.

The processes of the video decoding and the video coding are contrary to each other, i.e. the video decoding usually includes processes such as entropy decoding, prediction, dequantization, inverse transform and filtering, and the implementation principles of the various processes in the video decoding are the same as or similar to those in video coding.

III. Implementation of ALF Technique

Based on the ALF technique used in the framework of the Audio Video coding Standard (AVS), the optimal linear filtering of the original and distorted signals in a mean square sense can be calculated according to the principle of Wiener filtering.

The ALF coding process can include: region partition→acquisition of reference pixels→region merging and calculation of filtering coefficient→making decision on whether to start filtering for each LCU. The parameters to be calculated in the whole process are: 1) a number of filtering parameters; 2) a region merging identifier; 3) each set of filtering coefficient; 4) an identifier for indicating whether filtering is performed on the LCU; 5) an identifier for indicating whether filtering is performed on current components (Y, U, V).

Some of the processing and concepts in the ALF process are explained in details below.

1. Region Partition

In the ALF process, for acquired reconstructed video data, the data of its luma component is partitioned and the data of its chroma component is un-partitioned.

In some examples, the region partition process can be implemented as follows: a picture is partitioned into 16 regions which are approximately equal in size and aligned based on LCUs. The width of the non-rightmost region is $(((pic\_width\_InLcus+1)/4) \times Lcu\_Width)$, where pic_width_InLcus indicates a number of LCUs contained in a picture width and Lcu_Width indicates the width of each LCU. The width of the rightmost region is a difference between the width of the picture and the width of the non-rightmost three regions (the width of the picture minus the total width of the non-rightmost three regions).

Similarly, a height of a non-bottom region is $(((pic\_height\_InLcus+1)/4) \times Lcu\_Height)$, where pic_height_InLcus indicates a number of LCUs contained in a picture height and the Lcu_Height indicates the height of each LCU. A height of the bottommost region is a difference between the height of the picture and the height of the non-bottommost three regions (the height of the picture minus the total height of the non-bottommost three regions).

After a result of the region partition of the entire picture is obtained, an index value is assigned to each region, as exemplified in FIG. 2.

2. Region Merging

The region merging operation is to determine whether neighboring regions are merged based on an order of index values. The purpose of merging operation is to reduce the coding coefficients. A merge identifier is required to indicate whether a current region is merged with a neighboring region.

For example, after region partition is performed as described above, a total of 16 regions (which can be called 16 classes or 16 groups with their index values ranging from 0 to 15 in order) are obtained. In a first merging operation, merging may be performed sequentially on a region 1 and a region 1, a region 1 and a region 2, a region 2 and a region 3, . . . and a region 13 and a region 14, and a region 14 and a region 15. Further, based on a merging manner with minimum error, a first region merging operation is performed, such that 16 regions are merged into 15 regions.

For the 15 regions after the first merging operation (suppose the region 2 and the region 3 are merged to get a region 2+3), merging may be performed sequentially on the region 0 and the region 1, the region 1 and the region 2+3, the region 2+3 and the region 4, . . . , the region 13 and the region 14, and the region 14 and the region 15. Further, based on a merging manner with minimum error, a second region merging operation is performed such that the 15 regions are merged into 14 regions.

For the 14 regions after the second merging operation (suppose the region 14 and the region 15 are merged to get a region 14+15, namely, the merged region includes the region 2+3 and the region 14+15), merging may be performed sequentially on the region 0 and the region 1, the region 1 and the region 2+3, the region 2+3 and the region 4, . . . , the region 12 and the region 13, and the region 13 and the region 14+15. Further, based on a merging manner with minimum error, a third region merging operation is performed such that the 14 regions are merged into 13 regions.

The above merging operation is continued until one region is obtained as exemplified in FIG. 3.

After the above region merging operation is completed, in a case of not performing region merging (a total of 16 regions), performing one region merging operation (a total 15 regions), . . . and performing 14 region merging operations (a total of two regions) and performing 15 region merging operations (a total of one region), an error of performing Wiener filtering on the entire picture is calculated, and then the region merging manner with the minimum error is determined as a final region merging manner.

3. Reference Pixels, Filtering Coefficients

After region partition is performed in the above manner, the filter coefficient can be calculated according to the Wiener filtering principle based on the reference pixel of each pixel in each region.

For all the pixel points involved in the filtering, with each pixel point as the current pixel, within a certain scope with the pixel point as a center, surrounding pixel points are selected as reference pixels, and the filtering coefficient is calculated based on the least square method with the reference pixels and the current pixel as input and an original value of the pixel point as the target.

Figure 4A:
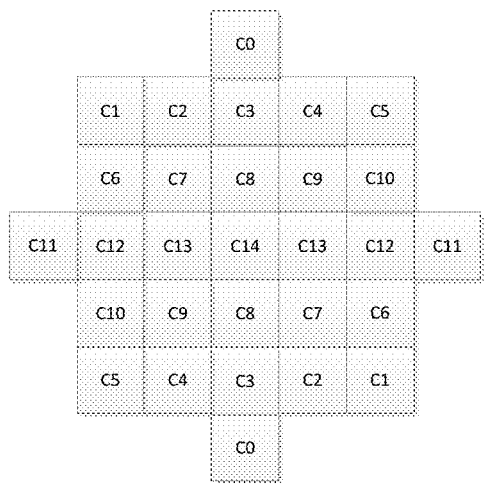
FIG. 4A is a schematic diagram illustrating a shape of a centrosymmetric filter with a 7*7 cross shape plus a 5*5 square shape.

FIG. 4A is a schematic diagram illustrating a shape of a filter. As shown in FIG. 4A, the filter is a centrosymmetric filter with a 7*7 cross shape plus a 5*5 square shape. The reference pixels corresponding to this filter can be seen in FIG. 4B.

Figure 4B:
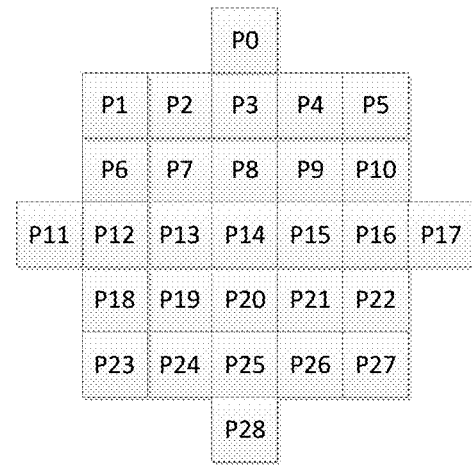
FIG. 4B is a schematic diagram illustrating reference pixels corresponding to the filter shown in FIG. 4A.

As shown in FIG. 4B, the centrosymmetric filters $P_0$ and $P_{28}$ have a same filtering coefficient. Thus, when training is performed at the encoder, $(P_i+P_{28-i}, i=0, \ldots, 13)$ are acquired as a same feature for input. $P_{14}$ is taken as a feature for input, so as to train 15 filtering coefficients. That is, the reference pixels are selected as:

$$E[i]=(P_i+P_{28-i})$$

$$E[14]=P_{14}$$

where $P_i$ belongs to the pixels in the reconstructed picture prior to filtering and E[i] is the value of the reference pixel, i=0, 1, 2, 3, 4, 5, 6, 7, 8, 9, 10, 11, 12, 13.

The aim of the Wiener filtering is to perform linear combination on the values of the reference pixels surrounding the current pixel to enable it to approximate to a current pixel value of the raw picture.

The ALF technique is performed based on Largest Coding Unit (LCU). The LCUs belonging to a same merged region use a same set of filtering coefficients for filtering.

4. Adaptive Leveling Filtering Unit

Figure 5:
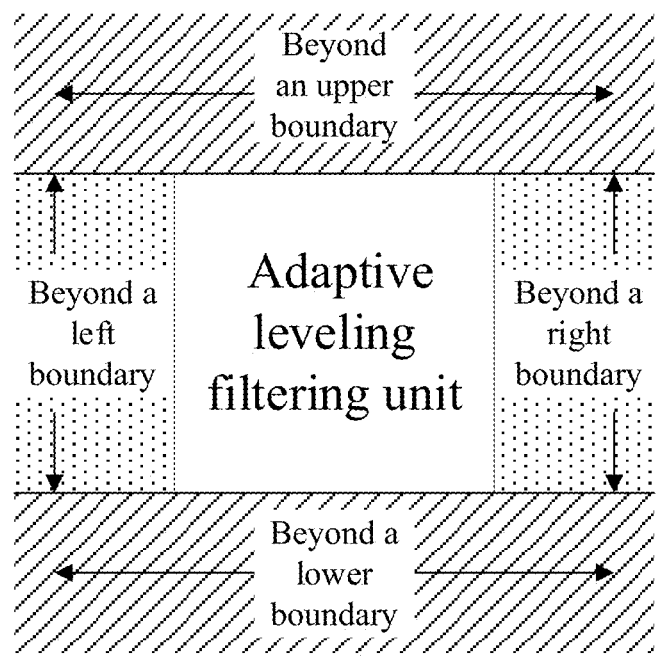
FIG. 5 is a schematic diagram illustrating a sample filtering compensation unit according to an embodiment of the present disclosure.

As shown in FIG. 5, the adaptive leveling filtering unit is derived according to a current largest coding unit in the following steps.

4.1. A part, going beyond the picture boundary, of a sample region where the current largest coding unit C is located is deleted to obtain a sample region D.

4.2. If the sample where the lower boundary of the sample region D is located does not belong to the lower boundary of the picture, the lower boundary of the sample region D of the luma component and chroma component is shrunk upwards by four rows to obtain a sample region E1; otherwise, the sample region E1 is made equal to the sample region D; where the last row of sample of the sample region D is taken as the lower boundary of the region.

4.3. If the sample where the upper boundary of the sample region E1 is located belongs to the upper boundary of the picture, or belong to a patch boundary and the value of cross_patch_loopfilter_enable_flag is '0', a sample region E2 is made equal to the sample region E1; otherwise, the upper boundary of the sample region E1 of the luma component and chroma component is extended upwards by four rows to obtain the sample region E2; where the first row of sample of the sample region E1 are the upper boundary of the region.

4.4. The sample region E2 is taken as the current adaptive leveling filtering unit; where the first row of sample of the picture is the upper boundary of the picture, and the last row of sample of the picture is the lower boundary of the picture.

5. Adaptive Leveling Filtering Operation

When it is determined to perform filtering on the current adaptive leveling filtering unit, the reference pixel used in the adaptive leveling filtering process is a sample within the adaptive leveling filtering unit, and the sample can be directly used for filtering.

If the sample used in the adaptive leveling filtering process is a sample within the adaptive leveling filtering unit, the sample is used directly for filtering; otherwise, the filtering is carried out in the following manner.

5.1. If the sample is beyond the picture boundary, or beyond the patch boundary and the value of crosspatch_loopfilter_enable_flag is '0', that is, filtering is not allowed to be performed by crossing the patch boundary, filtering is performed by using a sample closest to the sample in the adaptive leveling filtering unit to replace the sample.

5.2. If the sample is beyond the upper or lower boundary of the adaptive leveling filtering unit, filtering is performed by using a sample closest to the sample in the adaptive leveling filtering unit to replace the sample.

5.3. If the sample is not beyond the upper boundary of the adaptive leveling filtering unit, nor beyond the lower boundary of the adaptive leveling filtering unit, filtering is performed by directly using the sample.

6. Making Decision on Whether to Enable ALF

After performing region merging and calculating the filtering coefficient of each region, the encoder device is to make decision to, with the LCU as basic unit, determine whether ALF is enabled for each LCU in the current picture is coded in.

The encoder device can calculate a rate distortion cost before and after the current LCU is enabled or disabled, so as to determine whether ALF is enabled for the current LCU. If the current LCU is marked as ALF enabled, Wiener filtering is performed on each pixel within the LCU.

In related art, based on the ALF technique, only one set of fixed filtering coefficients are transmitted for each region, and the shape of the filter is unchanged. Hence, there may be some problems, for example, the pixels of same characteristics in the fixed-partitioned region are not classified into a same class, or the shape of the used filter is not proper. Further, at most one set of filtering coefficients are transmitted for each partitioned region, but, for a larger region or a region with complex picture texture, one set of filtering coefficients is not sufficient.

In order to optimize the ALF effect and improve the coding and decoding performance, the following optimization solutions is proposed in the embodiments of the present disclosure.

Solution 1, for each picture, with the LCU as the smallest unit, it is adaptively partitioned into multiple regions, where each region may include more than one LCU. Therefore, it is proposed to classify each LCU, for example, classify the LCUs in a same region into N classes, where N is a positive integer. In some examples, if the LCUs within each region are all classified into a same class, this corresponds to the fixed region partition manner of the traditional ALF solution. To distinguish from the fixed region partition manner of the traditional ALF solution, N≥2.

Solution 2, multiple sets of filtering coefficients can be transmitted in each region, and the shape of each set of filters may be same or different.

Solution 3, one set of filtering coefficients is adaptively selected based on each LCU, where the filtering coefficients of a neighboring region may be selected for the LCUs in a same region.

Solution 4, only one set of filtering coefficients can be transmitted for each region, but the shapes of the filters of different regions may be different.

Solution 5, the symmetric filter is modified to an asymmetric filter, including optimizing the filtering coefficients at the symmetric positions such that the filtering coefficients at the symmetric positions satisfy a certain proportional relationship, such as 0.5:1.5 or 0.6:1.4 or the like.

Solution 6, the value of the sample on the boundary is optimized during filtering.

In order to make the above-mentioned objects, features and advantages of the embodiments of the present disclosure more obvious and understandable, the technical solutions in the embodiments of the present disclosure are described in further details below in conjunction with the accompanying drawings.

Below, performing ALF with the size of the LCU based on the solution provided by the embodiments of the present disclosure is taken as an example, and another size or method representing the picture block may be used instead in the embodiments of the present disclosure, for example, the picture block of N*M is used, where N is a positive integer less than or equal to a width of the picture, and M is a positive integer less than or equal to a height of the picture.

Embodiment 1

In an embodiment of the present disclosure, there is provided a filtering method, which is applied to a decoder device. The filtering method may include the following steps.

At step T600, region partition is performed on a luma component of the current picture.

For region partition of the luma component of the picture, reference may be made to the descriptions about "region partition" as described above.

At step T610, based on a region class identifier of the LCU obtained by parsing the bitstream data, a region class to which the LCU belongs is determined.

In order to optimize the ALF effect and improve the coding and decoding performance, when a plurality of regions are obtained by performing region partition on the luma component of the picture based on the fixed region partition manner, for each region, the LCUs within the region may be classified into at least one class based on the pixel characteristics of each pixel within the region, that is, one region may be partitioned into at least one sub-region or region class based on LCU classification. For any LCU, based on the region to which the LCU belongs or the class of the LCU in the region, the region class to which the LCU belongs is determined. In some examples, when the encoder device sends a bitstream data to the decoder device, a region class identifier for identifying the region class to which each LCU belongs may be carried in the bitstream data sent to the decoder device. For any LCU, the decoder device may parse the region class identifier of the LCU from the bitstream data and, based on the parsed region class identifier of the LCU, determine the region class to which the LCU belongs.

At step T620, based on the region class to which the LCU belongs and the filtering coefficients parsed from the bitstream data, the filtering coefficient of the LCU is determined.

In the embodiments of the present disclosure, when the LCUs in each region are classified in the manner described above, the encoder device may perform region merging on the region classes to obtain at least one merged region (which may be referred to as a merged region) and determine the filter coefficient of each merged region. The manner of performing region merging for the region classes is similar to the relevant descriptions in the above "region merging" and will not be repeated here.

In some examples, for any region class, the encoder device may assign a coefficient index to the region class based on the merged region to which it belongs, where the coefficient index corresponds to the filtering coefficient of the merged region.

The encoder device can write the filtering coefficient of each merged region and the index of each region class into the bitstream data and send the bitstream data to the decoder device.

In some examples, for any LCU, the decoder device may, based on the region class to which the LCU belongs, determine a coefficient index of the region class to which the LCU belongs, and based on the coefficient index and the filtering coefficient parsed from the bitstream data, determine the filtering coefficient of the LCU.

At step T630, based on the filtering coefficient of the LCU, ALF is performed on the pixels of the LCU one by one.

In an embodiment of the present disclosure, for any LCU, when the filtering coefficient of the LCU is determined, ALF may be performed on the pixels of the LCU one by one based on the filtering coefficient of the LCU.

It can be seen that, by classifying the LCUs in the region obtained based on the fixed region partition manner, the region partition is made more compliant with the pixel characteristics of each LCU, thus optimizing the ALF effect and improving the coding and decoding performance.

In an embodiment, the step T610 of determining the region class to which the LCU belongs based on the region class identifier of the LCU parsed from the bitstream data comprises: determining the region class to which the LCU belongs based on the region to which the LCU belongs and the region class identifier of the LCU.

In some examples, for any LCU, based on the region to which the LCU belongs (the region obtained according to the fixed region partition manner) and the region class identifier of the LCU, the region class to which the LCU belongs may be determined.

In an example, the region class identifier of the LCU is used to identify the class of the LCU within the region to which the LCU belongs, and the class of the LCU within the region to which the LCU belongs is determined by classifying each LCU within the region to which the LCU belongs.

Determining the region class to which the LCU belongs based on the region to which the LCU belongs and the region class identifier of the LCU as above may include: determining the region class to which the LCU belongs based on the number of classes in each region, the region to which the LCU belongs, and the region class identifier of the LCU.

For any LCU, the decoder device may determine the class of the LCU within the region to which the LCU belongs based on the region class identifier of the LCU parsed from the bitstream data. For example, it is assumed that the LCUs in one region are classified into at most 2 classes. For the LCUs classified into a first class, their region class identifier may be 0; for the LCUs classified into a second class, their region class identifier may be 1.

For any LCU in any region, when the region class identifier of the LCU parsed from the bitstream data is valued as 0, it is determined that the class of the LCU in the region is the first class; when the region class identifier of the LCU parsed from the bitstream data is valued as 1, it is determined that the class of the LCU in the region is the second class.

In some examples, for any LCU, the decoder device may determine the region class to which the LCU belongs based on a class number of each class, the region to which the LCU belongs, and the region class identifier of the LCU.

As an example, determining the region class to which the LCU belongs based on the class number of each class, the region to which the LCU belongs, and the region class identifier of the LCU as above may include: based on a class number of each region prior to the region to which the LCU belongs, determining a total number of classes of the regions prior to the region to which the LCU belongs; based on the total number of classes of the regions prior to the region to which the LCU belongs, and the region class identifier of the LCU, determining the region class to which the LCU belongs.

In some examples, for any LCU, based on the class number of each region, the total number of classes of the regions prior to the region to which the LCU belongs may be determined, and based on the total number of classes for the regions prior to the region to which the LCU belongs and the region class identifier of the LCU, the region class to which the LCU belongs may be determined.

For example, it is supposed that the luma of the current picture is partitioned into a total of L regions, and the LCUs within each region are partitioned into N classes. For any LCU in a region K, when the region class identifier of that LCU parsed from the bitstream data is valued as m, it is determined that the region class to which the LCU belongs is $N*K+m$; where $m \in [0, N-1]$, $N \geq 1$ and $K \in [0, L-1]$.

In some embodiments, before the step T620 of determining the filtering coefficient of the LCU based on the region class to which the LCU belongs and the filtering coefficient parsed from the bitstream data, the method may further include: determining whether to perform ALF on the LCU; when it is determined to perform ALF on the LCU, determining to perform the above-described operation of determining the filtering coefficient of the LCU based on the region class to which the LCU belongs and the filtering coefficient parsed from the bitstream data.

For any LCU, the encoder device may determine whether to perform ALF on the LCU based on the RDO decision.

The decoder device may, before performing ALF on the LCU, determine whether ALF is performed on the LCU. For example, the decoder device may, based on an identifier parsed from the bitstream data to identify whether ALF is performed on the LCU, determine whether or not to perform ALF on the LCU.

When the decoder device determines to perform ALF on the LCU, the filtering coefficient of the LCU may be determined based on the region class to which the LCU belongs and the filtering coefficient parsed from the bitstream data, as described in the above embodiments.

In an example, determining whether to perform ALF on the LCU as above may include: parsing the LCU coefficient identifier of the LCU from the bitstream data; where the LCU coefficient identifier is used to identify a filtering coefficient used by the LCU in at least one set of filtering coefficients used by the merged region to which the LCU belongs; and when the value of the LCU coefficient identifier of the LCU is not the first value, determining to perform ALF on the LCU.

In some examples, in order to optimize the ALF effect and improve coding and decoding performance, the filtering coefficients used by one merged region are no longer limited to one set of filtering coefficients, but one or more sets of filtering coefficients can be selected depending on the actual situation.

In some examples, for any of the merged regions, the encoder device may train a plurality of sets of filtering coefficients and determine based on the RDO decision that the merged region uses one or more of sets of filtering coefficients therein. For any LCU in the region, the encoder device may, based on the LCU coefficient identifier, identify the filtering coefficient used by the LCU in one or more sets of filtering coefficients used by the merged region.

For any LCU, when the value of the LCU coefficient identifier of the LCU is the first value, it indicates that no ALF is performed on the LCU.

For any LCU, when the value of the LCU coefficient identifier of the LCU parsed by the decoder device from the bitstream data is not the first value, it is determined to perform ALF on the LCU.

For example, the first value is 0. For any LCU, the value of the LCU coefficient identifier of the LCU parsed by the decoder device from the bitstream data is 0, it is determined not to perform ALF on the LCU. When the value of the LCU coefficient identifier of the LCU parsed by the decoder device from the bitstream data is not 0, it is determined to perform ALF on the LCU, and the filtering coefficient of the LCU may be determined based on the LCU coefficient identifier of the LCU.

When the value of the LCU coefficient identifier of the LCU is not the first value, if the merged region to which the LCU belongs uses one set of filtering coefficients, the filtering coefficient of the LCU is this set of filtering coefficients; if the merged region to which the LCU belongs uses a plurality of sets of filtering coefficients, it is required to determine the filtering coefficient of the LCU based on the specific value of the LCU coefficient identifier of the LCU.

In an example, determining the filter coefficient of the LCU based on the region class to which the LCU belongs and the filtering coefficients parsed from the bitstream data may include: determining the filtering coefficient of the LCU based on the region class to which the LCU belongs, the filtering coefficients parsed from the bitstream data, and the region coefficient identifier, parsed from the bitstream data, of the merged region to which the LCU belongs. The region coefficient identifier is used to identify a filtering coefficient used by the merged region to which the LCU belongs from a plurality of sets of predetermined filtering coefficients.

In some examples, for any merged region, the encoder device may train a plurality of sets of filtering coefficients and determine, based on the RDO decision, that the merged region uses one or more sets of the plurality of sets of filtering coefficients, and write the region coefficient identifier for identifying the filtering coefficient used by the merged region into the bitstream data.

In some examples, for any LCU of any merged region, the decoder device may determine the filtering coefficient used by the merged region based on the region coefficient identifier of the merged region parsed from the bitstream data.

For example, it is assumed that the plurality of sets of predetermined filtering coefficients include two sets of filtering coefficients (assuming they are a filtering coefficient A and a filtering coefficient B). For any merged region, when the encoder device determines that the filtering coefficient A is used by the merged region, the encoder device determines the value of the region coefficient identifier of the merged region is 0; when the encoder device determines the filtering coefficient B is used by the merged region, the encoder device determines that the value of the region coefficient identifier of the merged region is 1; when the encoder device determines the filtering coefficient A and the filtering coefficient B are used by the merged region, the encoder device determines that the value of the region coefficient identifier of the merged region is 2.

For any merged region, when the value of the region coefficient identifier of the merged region parsed by the decoder device from the bitstream data is 0, it is determined that the filtering coefficient A is used by the region; when the value of the region coefficient identifier of the merged region parsed by the decoder device from the bitstream data is 1, it is determined that the filtering coefficient B is used by the merged region; when the value of the region coefficient identifier of the merged region parsed by the decoder device from the bitstream data is 2, it is determined that the filtering coefficient A and the filtering coefficient B are used by the merged region.

In some examples, for any merged region, when the decoder device, based on the region coefficient identifier of the merged region parsed from the bitstream data, determines the region uses one set of filtering coefficients, for any LCU of the merged region, if it is determined to perform ALF on the LCU, for example, if the value of the LCU coefficient identifier of the LCU is not the first value, it is determined that the filtering coefficient used by the LCU is the filtering coefficient used by the merged region; when the decoder device, based on the region coefficient identifier of the merged region parsed from the bitstream data, determines the region uses a plurality of sets of filtering coefficients, if it is determined to perform ALF on the LCU, the filtering coefficient used by the LCU (one set of filtering coefficients in a plurality of sets of filtering coefficients used by the merged region) may be determined based on the LCU coefficient identifier of the LCU.

Determining the filtering coefficient of the LCU based on the region class to which the LCU belongs, the filtering coefficients parsed from the bitstream data, and the region coefficient identifier, parsed from the bitstream data, of the merged region to which the LCU belongs may include: when it is determined based on the region coefficient identifier of the merged region to which the LCU belongs that the merged region to which the LCU belongs uses a plurality of sets of filtering coefficients, determining the filtering coefficient of the LCU based on the region class to which the LCU belongs, the filtering coefficients parsed from the bitstream data, and the filtering coefficient identifier of the LCU.

For any LCU, when the decoder device determines the region class to which the LCU belongs based on the region class identifier of the LCU parsed from the bitstream data, the decoder device may also, based on region class to which the LCU belongs, determine the merged region to which the LCU belongs, and based on the region coefficient identifier, parsed from the bitstream data, of the merged region to which the region class belongs, determine the filtering coefficient of the region class.

For example, it is assumed that the luma component of the current picture is partitioned into 16 regions according to the fixed region partition manner. Then, by classifying the LCUs in the region, a total of 32 region classes are obtained. After the region classes are merged, an index table may be obtained based on merger of the region classes, where the index table is a 32-element one-dimensional vector in which the elements are indexes of the merged regions to which the region classes sequentially.

Assuming that the 32-element one-dimensional vector is {a1, a2, . . . , a32}, a1 is the index of the merged region to which the region class 0 belongs . . . a32 is the index of the merged region to which the region class 32 belongs. If a1 to a5 are all 0 and a6 to all are all 1, it means that the region classes 0 to 4 are merged into the merged region 0 and the region classes 5 to 10 are merged into the merged region 1.

The encoder device may send the above index table to the decoder device via a bitstream data so that the decoder device determines the merged region to which each region class belongs based on the index table parsed from the bitstream data. Thus, for any LCU, based on the region class identifier of the LCU, the region class to which the LCU belongs may be determined and, based on the region class to which the LCU belongs, the merged region to which the LCU belongs may be determined.

When the decoder device determines that a plurality of sets of filtering coefficients are used by the merged region to which the LCU belongs, the decoder device may determine the filtering coefficient by the LCU based on the LCU coefficient identifier of that LCU parsed from the bitstream data.

For any merged region, the filter shapes of a plurality of sets of filtering coefficients used by the merged region may be completely same or not completely same. For example, if the merged region 1 uses the filtering coefficient A, the filtering coefficient B and the filtering coefficient C, the filter shapes of the filtering coefficient A, the filtering coefficient B and the filtering coefficient C may be all same, all different or partially same, for example, the filter shapes of the filtering coefficient A and the filtering coefficient B are same, but the filter shapes of the filtering coefficient A and the filtering coefficient C are different.

In some embodiments, the step T620 of determining the filtering coefficient of the LCU based on the region class to which the LCU belongs and the filtering coefficients parsed from the bitstream data may include: determining the filtering coefficient of the LCU based on the region class to which the LCU belongs, the filtering coefficients parsed from the bitstream data, and a coefficient selection identifier of the LCU; where the coefficient selection identifier is used to identify a filtering coefficient selected by the LCU from a plurality of sets of candidate filtering coefficients.

In order to optimize the ALF effect and improve coding and decoding performance, the LCU is no longer restricted to selecting the filtering coefficient of the merged region to which it belongs, but adaptively selects one set of filtering coefficients for ALF from a plurality of sets of filtering coefficients.

In some examples, for any LCU, the candidate filtering coefficients of the LCU may include, but not limited to, the filtering coefficient of the merged region to which it belongs and the filtering coefficient of a neighboring merged region of the merged region to which it belongs. When one set of filtering coefficients is transmitted in each merged region, one LCU may have a plurality of sets of candidate filtering coefficients, improving the selection flexibility of LCU filtering coefficient, optimizing the ALF effect and improving coding and decoding performance.

For any LCU, the encoder device may, based on the RDO decision, determine a filtering coefficient used by the LCU from a plurality of sets of candidate filtering coefficients, and write the coefficient selection identifier corresponding to the filtering coefficient into the bitstream data and send it to the decoder device. The decoder device may determine the filtering coefficient of the LCU based on the region class to which the LCU belongs, the filtering coefficients parsed from the bitstream data, and the coefficient selection identifier of the LCU.

In an example, determining the filtering coefficient of the LCU based on the region class to which the LCU belongs, the filtering coefficients parsed from the bitstream data, and the coefficient selection identifier of the LCU as above may include: when the value of the coefficient selection identifier of the LCU is the first value, determining a filtering coefficient of a previous merged region of the merged region to which the LCU belongs as the filtering coefficient of the LCU; when the value of the coefficient selection identifier of the LCU is the second value, determining the filtering coefficient of the merged region to which the LCU belongs as the filtering coefficient of the LCU; and when the value of the coefficient selection identifier of the LCU is a third value, determining a filtering coefficient of a next merged region of the merged region to which the LCU belongs as the filtering coefficient of the LCU.

For any LCU, the candidate filtering coefficients of the LCU may include the filtering coefficient of the merged region to which the LCU belongs, the filtering coefficient of the previous merged region of the merged region to which the LCU belongs, and the filtering coefficient of the next merged region of the merged region to which the LCU belongs. In some examples, the previous merged region of the merged region to which the LCU belongs is a merged region corresponding to a previous adjacent index of the index of the merged region to which the LCU belongs and the next merged region of the merged region to which the LCU belongs is a merged region corresponding to a next adjacent index of the index of the merged region to which the LCU belongs.

For example, if the merged region to which the LCU belongs is a merged region 2 and its corresponding index is 2, the previous merged region of the merged region to which the LCU belongs is a merged region (merged region 1) corresponding to the previous adjacent index (1) of the index 2, and the next merged region of the merged region to which the LCU belongs is a merged region (merged region 3) corresponding to the next adjacent index (3) of the index 2.

For any LCU, the encoder device may determine the filtering coefficient used by the LCU based on the RDO decision. When it is determined that the filtering coefficient used by the LCU is the filtering coefficient of the previous merged region of the merged region to which the LCU belongs, it is determined that the value of the coefficient selection identifier of the LCU is the first value, for example, 0; when it is determined that the filtering coefficient used by the LCU is the filtering coefficient of the merged region to which the LCU belongs, it is determined that the value of the coefficient selection identifier of the LCU is the second value, for example, 1; when the filtering coefficient used by the LCU is the filtering coefficient of the next merged region of the merged region to which the LCU belongs, it is determined that the value of the coefficient selection identifier of the LCU is the third value, for example, 2.

In some examples, for any LCU, when the value of the coefficient selection identifier of the LCU parsed from the bitstream data by the decoder device is the first value, the filtering coefficient of the previous merged region of the merged region to which the LCU belongs may be determined as the filtering coefficient of the LCU; when the value of the coefficient selection identifier of the LCU parsed from the bitstream data is the second value, the filtering coefficient of the merged region to which the LCU is determined as the filtering coefficient of the LCU; when the value of the coefficient selection identifier of the LCU parsed from the bitstream data is the third value, the filtering coefficient of the next merged region of the merged region to which the LCU belongs may be determined as the filtering coefficient of the LCU.

Parsing the filtering coefficients from the bitstream data may include: for any merged region, parsing the filter shape of the merged region from the bitstream data; and based on the filter shape, parsing the filtering coefficient of the merged region from the bitstream data.

In some examples, in order to increase the flexibility of the filtering coefficients, optimize the ALF effect and improve the coding and decoding performance, each merged region is no longer restricted to using a same filter shape, but can in some examples use a different filter shape, that is, the filter shapes used by different merged regions can be same or different.

In some examples, for any merged region, the encoder device may train a plurality of sets of filtering coefficients of different filter shapes and based on RDO decision, determine the filter shape and the filtering coefficient used by the merged region, and write the filter shape and the filter coefficient into the bitstream data to be sent to the decoder device.

In some examples, for any merged region, the decoder device may, when obtaining the filtering coefficient of the merged region, parse the filter shape of the merged region from the bitstream data and, based on the filter shape, parse the filtering coefficient of the region class from the bitstream data.

In one example, determining the filtering coefficient of the LCU based on the region class to which the LCU belongs and the filtering coefficients parsed from the bitstream data may include: determining the filter shape and the filtering coefficient of the LCU based on the region class to which the LCU belongs and the filter shapes and the filtering coefficients parsed from the bitstream data.

Performing ALF on the pixels of the LCU one by one based on the filtering coefficient of the LCU may include: performing ALF on the pixels of the LCU one by one based on the filter shape and the filtering coefficient of the LCU. In some examples, for any LCU, the merged region to which the LCU belongs may be determined based on the region class to which the LCU belongs, a filter shape and a filtering coefficient of the merged region may be parsed from the bitstream data, the filter shape and the filtering coefficient may be determined as the filter shape and the filtering coefficient of the LCU, and then AFL filtering is performed on the pixels of the LCU one by one based on the filter shape and the filtering coefficient.

In an embodiment of the present disclosure, the filter shape may also be selected for a picture, or for the component of the picture (such as the luma component and/or the chroma component). For example, if a centrosymmetric filter shape with 7*7 cross shape plus 5*5 square shape as shown in FIG. 4A is selected for the picture A, each LCU on which ALF is performed in the picture A uses the centrosymmetric filter shape with 7*7 cross shape plus 5*5 square shape.

In some embodiments, the step T630 of performing ALF on the pixels of the LCU one by one based on the filtering coefficient of the LCU may include: performing ALF on the pixels of the LCU one by one based on the filtering coefficient of the LCU and a weight coefficient of a position of each reference pixel corresponding to the merged region to which the LCU belongs as parsed from the code stream.

In some examples, in order to optimize the ALF effect and improve the coding and decoding performance, the filter used for performing ALF is no longer restricted to a symmetric filter, but in some examples, an asymmetric filter, that is, the position-symmetric filtering coefficients may be different and satisfy a certain proportional relationship, for example, 0.5:1.5 or 0.6:1.4, etc.

When ALF is performed based on the determined filtering coefficients, according to a sum of a product of each filtering coefficient of the determined filtering coefficients and a reference pixel of a corresponding position, a filtered pixel value can be obtained. The above ratio can be taken as a ratio between the filtering coefficients of the symmetrical positions, or, as a ratio of weights of (referred to as weight ratio) the pixel values of the corresponding reference pixels of the filtering coefficients of the symmetrical positions involved in ALF calculation, that is, the above asymmetric filter refers to that the filtering coefficients of the symmetric positions are different or, the weights of the pixel values of the reference pixels corresponding to the filtering coefficients of the symmetric positions are different.

For example, the filter coefficient of a centrosymmetric filter shape with a 7*7 cross shape plus a 5*5 square shape is $C_i$, and the filtering coefficient of its symmetric position is $C_{28-i}$. Thus, $C_i:C_{28-i}=A_i:(2-A_i)$, or, the ratio of the weights of $P_i$ and $P_{28-i}$ in participating in the ALF calculation is $A_i:(2-A_i)$, where $P_i$ is a pixel value of a reference pixel position corresponding to $C_i$ and $P_{28-i}$ is a pixel value of the reference pixel position corresponding to $C_{28-i}$. For a current filtered pixel of the LCU, the filtered pixel value of the pixel can be determined as follows:

$$P = \sum_{i=0}^{13}(C_i * A_i * P_i + C_i * (2 - A_i) * P_{28-i}) + C_{14} * P_{14}$$

In the above equation, $C_i$ is the (i+1)-th filtering coefficient in the filtering coefficients of the merged region to which the LCU belongs, $P_i$ is a pixel value of the reference pixel position corresponding to the filtering coefficient $C_i$, the reference pixel position corresponding to $P_{28-i}$ and the reference pixel position corresponding to $P_i$ are centrosymmetric about the pixel position of the current filtered pixel, $A_i$ is a weight coefficient of the pixel value of the reference pixel position corresponding to $P_i$, $P_{14}$ is the pixel value of the current filtered pixel, $C_{14}$ is the filtering coefficient of the current filtered pixel, and $0<A_i<2$.

In some examples, for any merged region, the encoder device may determine the filtering coefficient and the filter performance of the merged region under the condition that each position corresponds to a different weight coefficient. One set of filtering coefficients with the best filtering performance is selected, and the filtering coefficient and the weight coefficient corresponding to each position of the corresponding filter are recorded and written to the bitstream data to be sent to the decoder device.

In some examples, a weight coefficient set (for example, the value set of the above $A_i$) may be pre-constructed, and each weight coefficient may be selected from the set so as to obtain the filtering coefficient with the best filtering performance and the weight coefficient corresponding to each position of the corresponding filter, and further, an index of the weight coefficient in the weight coefficient set is written into the bitstream data to be sent to the decoder device.

For any LCU, the decoder device can parse the filtering coefficient of the merged region to which the LCU belongs and the weight coefficient of each reference pixel position corresponding to the merged region to which the LCU belongs from the bitstream data, and perform ALF on the pixels of the LCU one by one.

In some embodiments, the step T630 of performing ALF on the pixels of the LCU one by one based on the filtering coefficient of the LCU may include: for a current filtered pixel of the LCU, when performing ALF on the pixel, updating the pixel value of the pixel based on the pixel values of the surrounding pixels of the pixel; and based on the updated pixel value of the pixel, performing ALF on the pixel.

In some examples, for any pixel position, when the pixel value of the pixel position is too large or small, the filtering performance with which filtering is performed on the pixel position based on conventional ALF is poor. Therefore, in order to optimize the ALF effect, for the current filtered pixel, when ALF is performed on the pixel, the pixel value of the pixel can be updated based on the pixel value of the surrounding pixels of the pixel, such that the pixel value of the pixel location is smoother than the pixel values of the surrounding pixels.

In one example, updating the pixel value of the pixel based on the pixel values of the surrounding pixels of the pixel as above may include: determining a maximum value and a minimum value of the pixel values of the pixels outside a central position in a target pixel block; where the target pixel block is a 3*3 pixel block with the pixel as the central position; when the pixel value of the pixel is greater than the maximum value, updating the pixel value of the pixel to the maximum value; and when the pixel value of the pixel is less than the minimum value, updating the pixel value of the pixel to the minimum value.

For example, the surrounding pixels of the pixel are 8 neighboring pixels, that is, the remaining pixels outside the central position in a pixel block of 3*3 with the pixel as central position (referred to as target pixel block herein).

For any pixel in any LCU, the pixel value of each pixel outside the central position in the target pixel block can be determined, and the maximum and minimum values in the pixel values can be determined. When the pixel value of the pixel is greater than the maximum value, the pixel value of the pixel is updated to the maximum value; when the pixel value of the pixel is less than the minimum value, the pixel value of the pixel is updated to the minimum value.

Figures 11A, 11B, 11C, 11D, 12, 13, 14A:
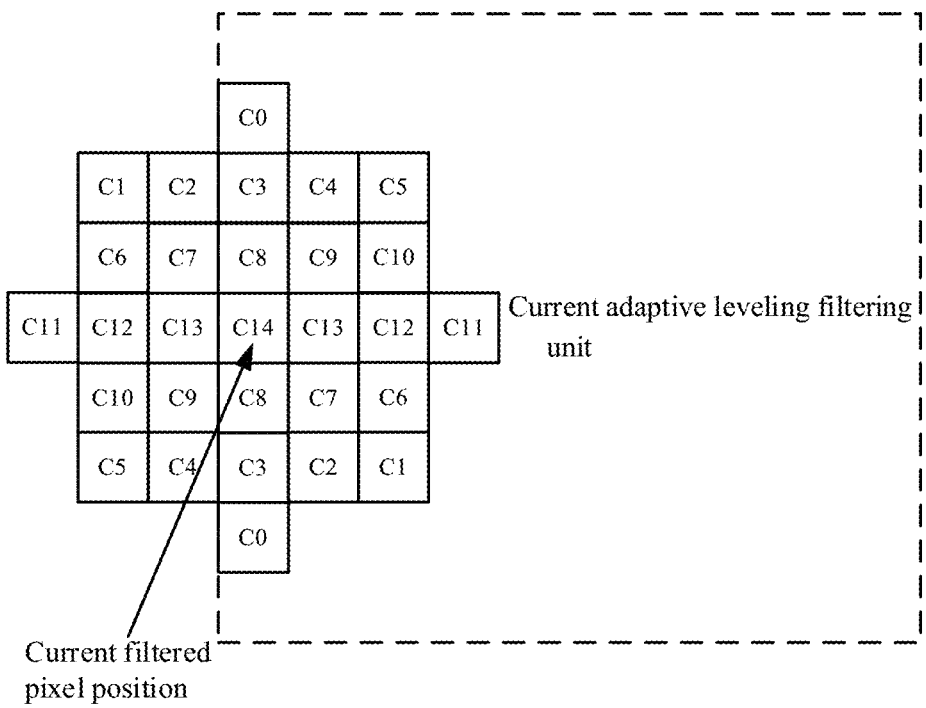
FIG. 11A to FIG. 11D are schematic diagrams of a number of different filter shapes illustrated in an embodiment of the present disclosure.
FIG. 12 is a schematic diagram illustrating a 3*3 pixel block according to an embodiment of the present disclosure.
FIG. 13 is a schematic diagram illustrating a filter with asymmetric filter coefficients according to an embodiment of the present disclosure.
FIG. 14A is a schematic diagram illustrating a reference pixel position according to an embodiment of the present disclosure.

Taking a pixel block of 3*3 shown in FIG. 12 as an example, it is supposed that the current filtered pixel is a pixel 0 and its surrounding pixels include 8 neighboring pixels of the pixel, i.e. pixels 1 to 8. When the pixel 0 is filtered, the pixel values of the pixels 1 to 8 can be obtained respectively and a maximum value and a minimum value of the pixel values of these 8 pixels can be determined. If the pixel value of the pixel 1 is the maximum and the pixel value of the pixel 8 is the minimum, the maximum value of the pixel values of these 8 pixels is the pixel value of the pixel 1 (denoted as p1) and the minimum value is the pixel value of the pixel 8 (denoted as p8). Hence, the pixel value of the pixel 0 (denoted p0) can be compared with the p1 and p8. If p0>p1, the pixel value of the pixel 0 will be updated to the p1; if p0<p8, the pixel value of the pixel 0 is updated to the p8.

Embodiment 2

Figure 6A:
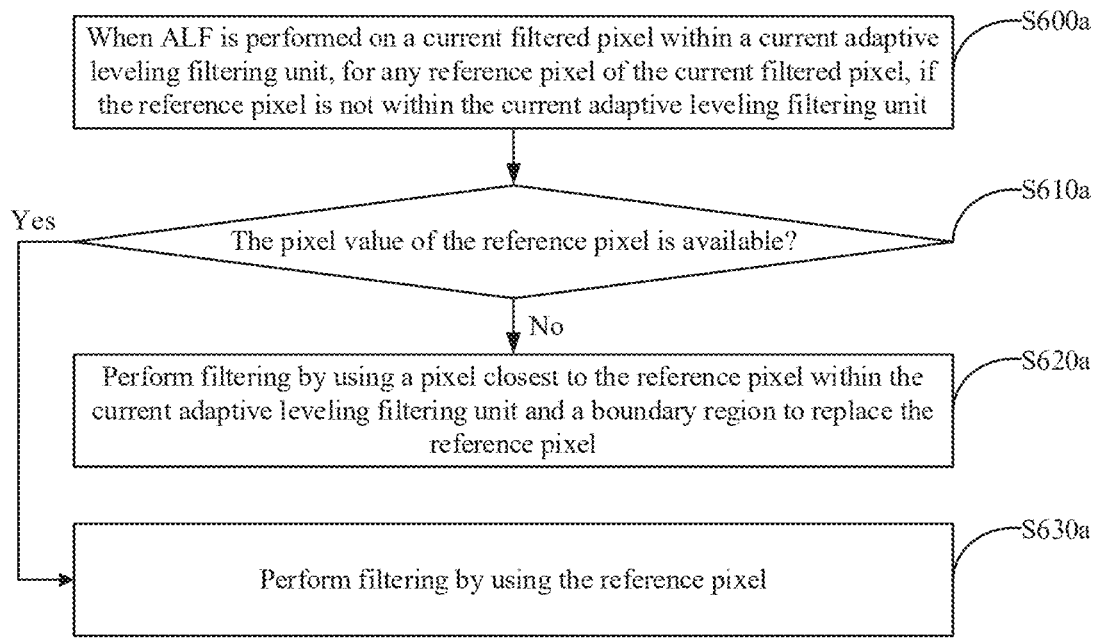
FIG. 6A is a schematic flowchart illustrating a filtering method according to an embodiment of the present disclosure.

Referring to FIG. 6A, it is a flowchart illustrating a filtering method according to an embodiment of the present application. The filtering method may be applied to an encoder/decoder device, as shown in FIG. 6A. The filtering method may include the following steps.

At Step S600a, when ALF is performed on a current filtered pixel within a current adaptive leveling filtering unit, for any reference pixel of the current filtered pixel, if the reference pixel is not within the current adaptive leveling filtering unit, S610a is performed.

At Step S610a, it is determined whether the pixel value of the reference pixel is available; if yes, step S630a is performed; otherwise, step S620a is performed.

At Step S620a, filtering is performed by using a pixel closest to the reference pixel within the current adaptive leveling filtering unit and a boundary region to replace the reference pixel.

At Step S630a, filtering is performed by using this reference pixel.

The filtering unit may be an LCU, or a picture block obtained based on the LCU, for example, a picture block obtained by cropping or expanding the LCU.

The implementation of obtaining the filtering unit based an LCU can be seen in the above descriptions of the "adaptive leveling filtering unit".

In an embodiment of the present disclosure, some reference pixels of a boundary pixel of the filtering unit may be located outside the filtering unit, namely, not within the filtering unit. Thus, it is impossible to obtain the pixel values of the some reference pixels in this case.

In one example, the unavailability of the pixel value of the reference pixel may include, but not limited to, one of the followings: the reference pixel is beyond a picture boundary; the reference pixel is beyond a patch boundary and disallows performing filtering by crossing the patch boundary; and the reference pixel is beyond an upper boundary or a lower boundary of the current adaptive leveling filtering unit.

In some examples, for any pixel position, other pixel position closest to the pixel is also usually a pixel position with a pixel value closest to the pixel value of the pixel position. In order to optimize the ALF effect, when the pixel value of the reference pixel is not available, filtering is performed by using a pixel closest to the reference pixel within the current adaptive leveling filtering unit and the boundary region to replace the reference pixel.

In some examples, a distance between pixel positions may be called Euclidean distance.

In some examples, the boundary region includes a beyond-left-boundary region and a beyond-right-boundary region of the current adaptive leveling filtering unit. The beyond-left-boundary region of the current adaptive leveling filtering unit includes all or partial region in a filtering unit neighboring the left side of the current adaptive leveling filtering unit, and the beyond-right-boundary region of the current adaptive leveling filtering unit includes all or partial region in a filtering unit neighboring the right side of the current adaptive leveling filtering unit.

Faking the filtering unit shown in FIG. 5 (i.e. a sample filtering compensation unit in FIG. 5) as the current adaptive leveling filtering unit, the boundary region of the current adaptive leveling filtering unit may include 3 columns of pixels at the left side of the left boundary of the sample filtering compensation unit shown in FIG. 5 (i.e. 3 columns of pixels close to the current adaptive leveling filtering unit in the filtering unit at the left side of the current adaptive filtering unit, which may be called the beyond-left-boundary region); 3 columns of pixels at the right side of the right boundary of the sample filtering compensation unit shown in FIG. 5 (i.e. 3 columns of pixels close to the current adaptive leveling filtering unit in the filtering unit at the right side of the current adaptive filtering unit, which may be called the beyond-right-boundary region).

In the method shown in FIG. 6A, when ALF is performed on the pixels in the current adaptive leveling filtering unit, for a reference pixel position not within the current adaptive leveling filtering unit, if the pixel value of the reference pixel position is not available, filtering is performed by using a pixel closest to the reference pixel within the current adaptive leveling filtering unit and the boundary region to replace the reference pixel, so as to optimize the ALF performance and improve the coding and decoding performance.

In some embodiments, when the pixel value of the reference pixel is not available, before filtering is performed by using a pixel closest to the reference pixel within the current adaptive leveling filtering unit and the boundary region to replace the reference pixel, the method further includes: determining whether the reference pixel corresponds to a specified position of the filter shape; and if yes, determining to perform the above operation of performing filtering by using a pixel closest to the reference pixel within the current adaptive leveling filtering unit and the boundary region to replace the reference pixel.

For the reference pixel of some specific position, when the pixel value of the reference pixel is not available, it is usual that a pixel value of a pixel position closest to the position within the boundary region is not available. For example, the pixel value of a reference pixel respectively located exactly at the left side, the right side, the upper side and the lower side of the current filtered pixel position is not available.

For example, it is assumed the current filtered pixel position (i.e. the pixel position corresponding to $C_{14}$) is at the left boundary of the current adaptive leveling filtering unit. For the reference pixel position corresponding to $C_{11}$, the reference pixel position is at the left side of the current filtered pixel position and 3 pixels away from the current filter pixel position and one filtering unit is usually wider than 3 pixels. If the pixel value of the reference pixel position corresponding to $C_{11}$ is not available, it is determined that the filtering unit at the left side of the current adaptive leveling filtering unit is beyond the boundary of the current picture (i.e. a picture where the current adaptive leveling filtering unit is located), or located beyond the patch boundary of the current patch (i.e. a patch where the current adaptive leveling filtering unit is located) and disallows performing filtering by crossing the patch boundary. In this case, the pixel value of a pixel position closest to the reference pixel position within the boundary region, i.e. the pixel position corresponding to $C_{12}$, is also unavailable. Therefore, it is necessary to perform filtering by using the pixel of the reference pixel position (the reference pixel position corresponding to $C_{11}$) closest to the reference pixel position within the current adaptive leveling filtering unit to replace the reference pixel.

Taking the scene shown in FIG. 14A as an example, when the pixel value of the reference pixel position corresponding to $C_{11}$ is not available, the pixel value of the reference pixel position corresponding to $C_{12}$ is also not available.

For a reference pixel respectively at the upper left position, upper right position, lower left position and lower right position of the current filtered pixel position, when the pixel value of the reference pixel is not available, it is probably because the reference pixel is beyond the upper or lower boundary of the current adaptive leveling filtering unit (the pixel value of the pixel position beyond the upper or lower boundary of the current adaptive leveling filtering unit is not available). In this case, the pixel position closest to the reference pixel position probably is located beyond the left boundary or right boundary of the current adaptive leveling filtering unit and its pixel value may be available.

For example, it is assumed that the current filtered pixel position (i.e. the pixel position corresponding to $C_{14}$) is at the upper left position of the current adaptive leveling filtering unit. For the reference pixel position corresponding to $C_i$, since this reference pixel position is at the upper left position of the current filtered pixel position, when the current filtered pixel position is closer to the upper left vertex of the current adaptive leveling filtering unit, the reference pixel position corresponding to $C_i$ may be beyond the upper boundary of the current adaptive leveling filtering unit, and thus, the pixel value of this reference pixel position is not available. In this case, the pixel position corresponding to $C_6$ may be beyond the left boundary of the current adaptive leveling filtering unit, and its pixel value may be available.

Figure 14B:
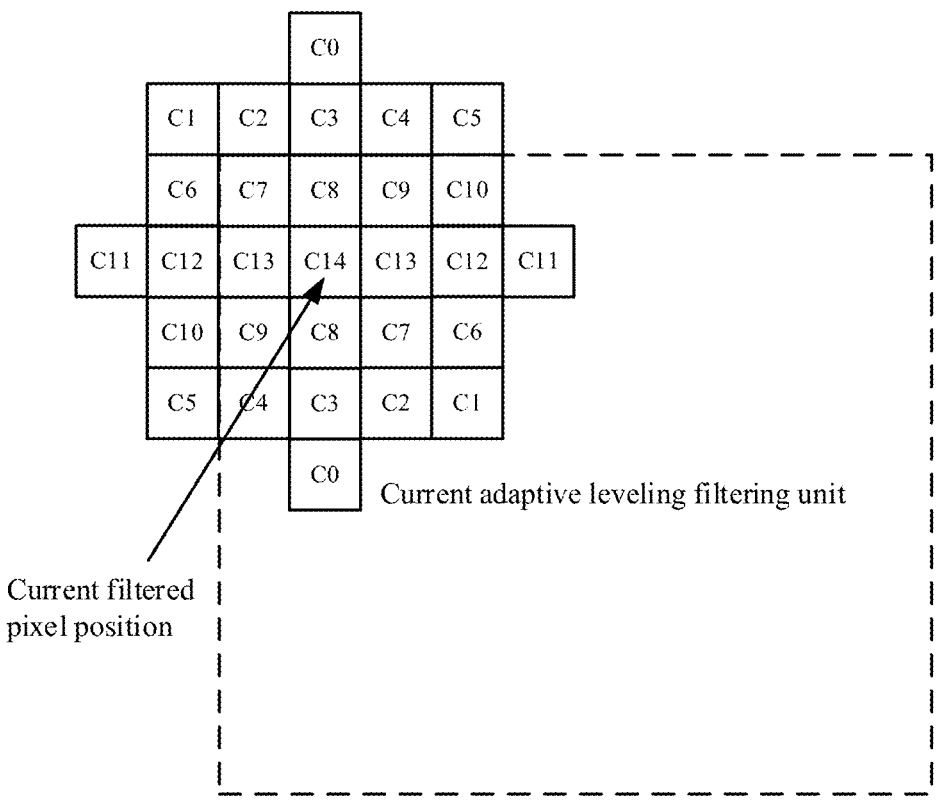
FIG. 14B is a schematic diagram illustrating another reference pixel position according to an embodiment of the present disclosure.

Taking the scene shown in FIG. 14B as an example, since the reference pixel position corresponding to $C_i$ is beyond the upper boundary of the current adaptive leveling filtering unit, the pixel value of the reference pixel position corresponding to $C_i$ is not available. The reference pixel position corresponding to $C_6$ is beyond the left boundary of the current adaptive leveling filtering unit. The pixel value beyond the left boundary of the current adaptive leveling filtered unit is available. For example, when the left boundary of the current adaptive leveling filtering unit is not a picture boundary or patch boundary, the pixel value of the reference pixel position corresponding to $C_6$ is available. In this case, for the reference pixel position with pixel value unavailable, filtering is performed by using a pixel value of a closest pixel position within the current adaptive leveling filtering unit and the boundary region to replace the reference pixel.

In order to optimize the ALF effect, for a reference pixel in the filter state at a specified position, when the pixel value of the reference pixel is unavailable, filtering is performed by using a pixel closest to the reference pixel within the current adaptive leveling filtering unit and the boundary region to replace the reference pixel.

In some examples, if the reference pixel does not correspond to the specified position of the filter shape, filtering is performed by using a pixel closest to the reference pixel within the current adaptive leveling filtering unit to replace the reference pixel, that is, the pixels in the boundary region are considered.

In one example, the specified positions may include, but not limited to, a first position, a second position, a third position of a first filter, and symmetrical positions of the first position, the second position and the third position. The first filter is a centrosymmetric filter with a 7*7 cross shape plus 5*5 square shape, where the first position is the top left corner of the first filter, the second position is a neighboring position at the right of the first position, the third position is a neighboring position below the first position, and the symmetric positions include an axisymmetric position and a centrosymmetric position.

By way of example, for the first filter shown in FIG. 4A, the first position is a position $C_i$ with its axisymmetric position $C_5$; the second position is a position $C_2$ with its axisymmetric position $C_4$; the third position is a position $C_6$ with its axisymmetric position $C_{10}$. Thus, the above specified positions may include $C_1$, $C_2$, $C_6$, $C_4$, $C_5$ and $C_{10}$.

In some embodiments, when the pixel value of the reference pixel is not available, before filtering is performed by using a pixel closest to the reference pixel within the current adaptive leveling filtering unit and the boundary region to replace the reference pixel as above, the method further includes: determining whether the enhanced adaptive leveling filtering is enabled for the current adaptive leveling filtering unit; and if yes, determining to perform the operation of performing filtering a pixel closest to the reference pixel within the current adaptive leveling filtering unit and the boundary region to replace the reference pixel.

In some examples, it is considered that the filters used in a case of allowing use of the enhanced adaptive leveling filtering (enhanced ALF) and disallowing use of the enhanced ALF are different.

Figure 9:
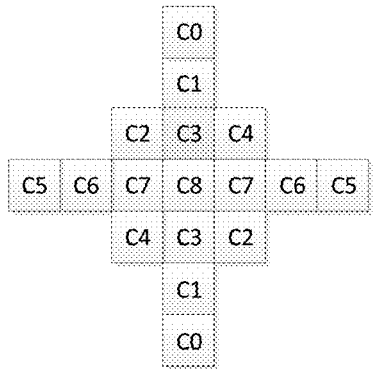
FIG. 9 is a schematic diagram illustrating a shape of a centrosymmetric filter with a 7*7 cross shape plus a 3*3 square shape.

In some examples, the filter used in case of allowing use of the enhanced adaptive leveling filtering may be as shown in FIG. 4A, whereas the filter used in a case of disallowing use of the enhanced adaptive leveling filtering may be as shown in FIG. 9.

For the filter shown in FIG. 9, when the pixel value of the reference pixel is not available, it is usual that the pixel value of the pixel closest to the reference pixel beyond the current adaptive leveling filtering unit is also unavailable. Thus, when the use of the enhanced adaptive leveling filtering is disallowed, it is not considered to use a pixel within the boundary region to replace the reference pixel with pixel value unavailable to perform filtering but considered to use a pixel within the current adaptive leveling filtering unit to replace the reference pixel with pixel value unavailable to perform filtering. Therefore, for any reference pixel, when the pixel value of the reference pixel is unavailable, it is determined whether the enhanced adaptive leveling filtering is enabled for the current adaptive leveling filtering unit. In some examples, whether the enhanced adaptive leveling filtering is enabled for the current adaptive leveling filtering unit may be determined based on the value of EalfEnableFlag. When the EalfEnableFlag is equal to 1, it indicates that the enhanced adaptive leveling filtering may be used, and when the EalfEnableFlag is equal to 0, it indicates that the enhanced adaptive leveling filtering should not be used.

In some examples, the value of the EalfEnableFlag may be derived from the decoder, or obtained from the bitstream data at the decoder. The value of the EalfEnableFlag may also be a constant value. In some examples, the value of the EalfEnableFlag can be determined based on the value of the enhanced adaptive leveling filtering enable flag (ealf_enable_flag) parsed from the bitstream data.

The "enhanced adaptive leveling filtering enable flag" may be a sequence level parameter, i.e. a value of one "enhanced adaptive leveling filtering enable flag" may be used to indicate whether enhanced adaptive leveling filtering is enabled for one picture sequence. In some examples, when the decoder device determines that the enhanced adaptive leveling filtering is enabled for the current adaptive leveling filtering unit and the pixel value of the pixel position for performing adaptive leveling filtering on the current adaptive leveling filtering unit is not available, filtering is performed using a pixel closest to the reference pixel within the current adaptive leveling filtering unit to replace the reference pixel.

In some examples, when the decoder device determines that the enhanced adaptive leveling filtering is enabled for the current adaptive leveling filtering unit and that the pixel value of the pixel position for performing adaptive leveling filtering on the current adaptive leveling filtering unit is not available, filtering is performed by using a pixel closest to the reference pixel in the boundary region to replace the reference pixel.

In some examples, when the decoder device determines that the enhanced adaptive leveling filtering is enabled for the current adaptive leveling filtering unit and that the pixel value of the pixel position for performing adaptive leveling filtering on the current adaptive leveling filtering unit is not available, filtering is performed using a pixel closest to the reference pixel within the current adaptive leveling filtering unit and the boundary region to replace the reference pixel.

In some examples, when the decoder device determines that the enhanced adaptive leveling filtering is disabled for the current adaptive leveling filtering unit and that the pixel value of the pixel position for performing adaptive leveling filtering on the current adaptive leveling filtering unit is not available, adaptive leveling filtering is performed using a pixel closest to the reference pixel within the current adaptive leveling filtering unit to replace the reference pixel, that is the reference pixels in the boundary region are not considered.

Figure 6B:
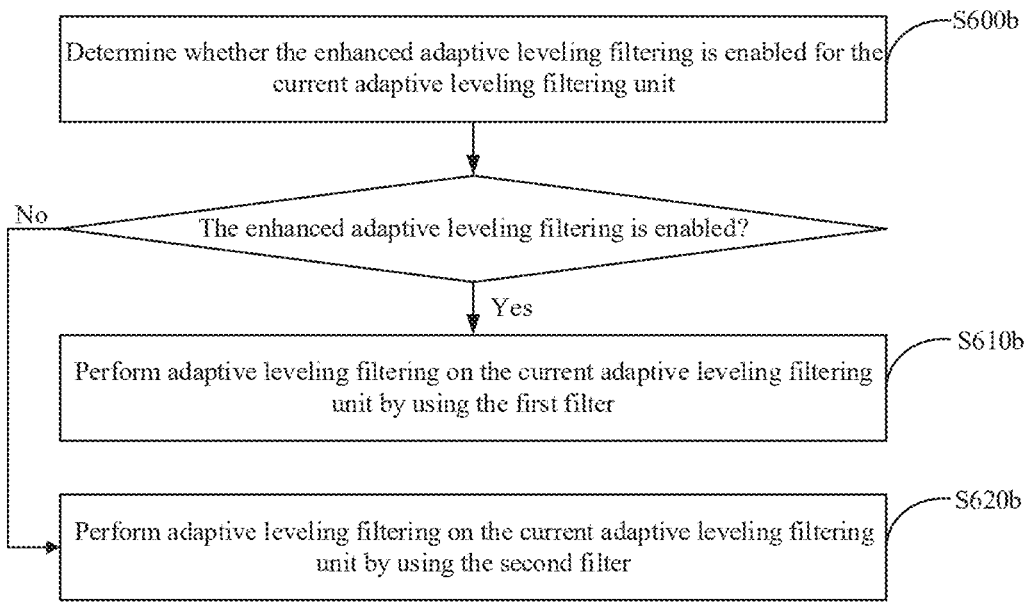
FIG. 6B is a schematic flowchart illustrating a filtering method according to an embodiment of the present disclosure.

As shown in FIG. 6B, it is a flowchart illustrating a filtering method according to an embodiment of the present disclosure. The filtering method may be applied to an encoder/decoder device. As shown in FIG. 6B, the filtering method may include the following steps.

At Step S600b, it is determined whether the enhanced adaptive leveling filtering is enabled for the current adaptive leveling filtering unit. If so, proceed to step S610b; otherwise, proceed to step S620b.

At Step S610b, adaptive leveling filtering is performed on the current adaptive leveling filtering unit by using the first filter.

At Step S620b, adaptive leveling filtering is performed on the current adaptive leveling filtering unit by using the second filter.

In an embodiment of the present disclosure, in order to improve the flexibility of filter selection, optimize the filtering performance and enhance the coding and decoding performance, the filters used in a case that the enhanced adaptive leveling filtering is enabled and disabled for the current adaptive leveling filtering unit are different. In some examples, when the decoder device determines that the enhanced adaptive filtering is enabled for the current adaptive leveling filtering unit, the filter used for performing adaptive leveling filtering on the current adaptive leveling filtering unit may be the first filter. For example, the first filter may be the filter shown in FIG. 4A.

In some examples, when the decoder device determines that the enhanced adaptive filtering is enabled for the current adaptive leveling filtering unit, the filter used for performing adaptive leveling filtering on the current adaptive leveling filtering unit may be the second filter. For example, the second filter may be the filter shown in FIG. 9.

In some embodiments, the step S600b of determining whether the enhanced adaptive leveling filtering is enabled for the current adaptive leveling filtering unit may include: determining a value of a flag for indicating whether the enhanced adaptive leveling filtering is enabled for the current adaptive leveling filtering unit; when the value of the flag is a first value, determining that the enhanced adaptive leveling filtering is enabled for the current adaptive leveling filtering unit; when the value of the flag is a second value, determining that the enhanced adaptive leveling filtering is disabled for the current adaptive leveling filtering unit.

A value of a flag may be used to indicate whether the enhanced adaptive leveling filtering is enabled for the current adaptive leveling filtering unit. In some examples, when the value of the flag is the first value (e.g. 0), it indicates that the enhanced adaptive leveling filtering is enabled for the current adaptive leveling filtering unit. When the value of the flag is the second value (e.g. 1), it indicates that the enhanced adaptive leveling filtering is disabled for the current adaptive leveling filtering unit.

In some examples, the decoder device may obtain the value of the flag and based on the value of the flag, determine whether the enhanced adaptive leveling filtering is enabled for the current adaptive leveling filtering unit.

In the process of performing adaptive leveling filtering on the current filtered pixel in the current adaptive leveling filtering unit, for any reference pixel of the current filtered pixel, when the reference pixel is not within the current adaptive leveling filtering unit: if the pixel value of the reference pixel is not available, adaptive leveling filtering is performed by using a pixel closest to the reference pixel within the current adaptive leveling filtering unit to replace the reference pixel; if the pixel value of the reference pixel is available, adaptive leveling filtering is performed by using the pixel value of the reference pixel. In some examples, for a boundary pixel of the filtering unit, some of the reference pixels of the boundary pixel may be located beyond the filtering unit, namely, not within the filtering unit. Thus, the pixel values of the some reference pixels may be unavailable.

In one example, the unavailable of the pixel value of the reference pixel includes but not limited to: one of the followings: the reference pixel is beyond a picture boundary of a current picture; the reference pixel is beyond a patch boundary of a current patch and disallows performing filtering by crossing the patch boundary; and the reference pixel is beyond an upper boundary or a lower boundary of the current adaptive leveling filtering unit.

In some examples, for any pixel position, other pixel position closest to the pixel is usually also a pixel position with the pixel value closest to the pixel value of the pixel position. Thus, in order to optimize the filtering effect, in a case of unable to obtain the pixel value of the reference pixel, filtering may be performed by using a pixel closest to the reference pixel within the current adaptive leveling filtering unit and the boundary region to replace the reference pixel.

In some examples, a distance between pixel positions may be called Euclidean distance.

In some examples, the boundary region includes a beyond-left-boundary region and a beyond-right-boundary region of the current adaptive leveling filtering unit. The beyond-left-boundary region of the current adaptive leveling filtering unit includes all or partial region in a filtering unit neighboring the left side of the current adaptive leveling filtering unit, and the beyond-right-boundary region of the current adaptive leveling filtering unit includes all or partial region in a filtering unit neighboring the right side of the current adaptive leveling filtering unit In some examples, when it is determined that the enhanced adaptive leveling filtering is enabled for the current adaptive leveling filtering unit and that the pixel value of the pixel position for performing adaptive leveling filtering on the current adaptive leveling filtering unit is not available, adaptive leveling filtering is performed using a pixel closest to the reference pixel within the current adaptive leveling filtering unit to replace the reference pixel; when it is determined that the enhanced adaptive leveling filtering is disabled for the current adaptive leveling filtering unit and that the pixel value of the pixel position for performing adaptive leveling filtering on the current adaptive leveling filtering unit is not available, adaptive leveling filtering is performed using a pixel closest to the reference pixel within the current adaptive leveling filtering unit to replace the reference pixel.

Embodiment 3

In an embodiment of the present disclosure, there is provided a filtering method. The filtering method may be applied to a decoder device. The filtering method may include the following steps.

At step T700, when it is determined to perform ALF on a current LCU of a current picture, a region coefficient identifier of a merged region to which the current LCU belongs is obtained.

At step T710, based on the region coefficient identifier of the merged region to which the current LCU belongs, a filtering coefficient of the current LCU is obtained, where the region coefficient identifier is used to identify a filtering coefficient used by the merged region to which the LCU belongs from a plurality of sets of predetermined filtering coefficients.

In an embodiment of the present disclosure, in order to optimize the ALF effect and improve the coding and decoding performance, the filtering coefficients used by one merged region are no longer limited to one set of filtering coefficients, but tone or more sets of filtering coefficients may be used based on actual situations.

In some examples, for any merged region, the encoder device may train a plurality of sets of filtering coefficients and determine, based on the RDO decision, that the merged region uses one or more sets of the plurality of sets of filtering coefficients, and write into the bitstream data the region coefficient identifier for identifying the filtering coefficients used by the merged region.

In some examples, when the decoder device determines to perform ALF on the current LCU of the current picture, the decoder device may obtain a region coefficient identifier of the merged region to which the current LCU belongs based on information parsed from the bitstream data, and based on the region coefficient identifier, determine the filtering coefficients used by the merged region to which the current LCU belongs.

When the filtering coefficients used by the merged region to which the current LCU belongs are determined, the filtering coefficient of the current LCU can be determined from the filtering coefficients used by the merged region.

In some examples, when one set of filtering coefficients is used by the merged region to which the current LCU belongs, the filter coefficients used by the merged region may be determined as the filter coefficient of the current LCU.

At step T720, ALF is performed on the pixels of the current LCU one by one based on the filtering coefficient of the current LCU.

In an embodiment of the present disclosure, when the filter coefficient of the current LCU is determined, ALF may be performed on the pixels of the current LCU one by one based on the filtering coefficient of the current LCU.

In the method flow described in Example 3, a plurality of sets of filtering coefficients are trained for each region, and it is determined based on the RDO decision that each merged region uses one or more sets of the plurality of sets of trained filtering coefficients, and a decision result is notified to the decoder device by using the region coefficient identifier. Thus, a region is no longer restricted to using one set of filtering coefficients, but uses one or more sets of filtering coefficients based on performance, thus optimizing the ALF performance and improves the coding and decoding performance.

In some embodiments, the step T700 of determining to perform ALF on the current LCU of the current picture may include: parsing an LCU coefficient identifier of the current LCU from the bitstream data; where the LCU coefficient identifier is used to identify a filtering coefficient used by the current LCU from at least one set of filtering coefficients used by the merged region to which the current LCU belongs; and when the value of the LCU coefficient identifier of the LCU is not a first value, determining to perform ALF on the current LCU.

In some examples, the encoder device may notify, by means of a region coefficient identifier, the decoder device of one or more sets of filtering coefficients used by the merged region. For any LCU in the region, the encoder device may identify, by means of the LCU coefficient identifier, the filtering coefficient used by the LCU from one or more sets of filtering coefficients used by the merged region.

In some examples, for any LCU, the decoder device may, based on the LCU coefficient identifier of that LCU parsed from the bitstream data, determine whether to perform ALF on the LCU and a filtering coefficient for performing ALF on the LCU.

In some examples, for any LCU, when the value of the LCU coefficient identifier of the LCU is the first value, it indicates not performing ALF on the LCU.

For any LCU, when the value of the LCU coefficient identifier of the LCU parsed by the decoder device from the bitstream data is not the first value, it is determined to perform ALF on the LCU.

For example, the first value is 0. For any LCU, when the value of the LCU coefficient identifier of the LCU parsed by the decoder device from the bitstream data is 0, it is determined not to perform ALF on the LCU; when the value of the LCU coefficient identifier of the LCU parsed by the decoder device from the bitstream data is not 0, it is determined to perform ALF on the LCU, and the decoder device may, based on the LCU coefficient identifier of the LCU, determine the filtering coefficient of the LCU.

When the value of the LCU coefficient identifier of the LCU is not the first value, if the merged region to which the LCU belongs uses one set of filtering coefficients, the filtering coefficient of the LCU is the set of filtering coefficients; if the merged region to which the LCU belongs uses a plurality of sets of filtering coefficients, the filtering coefficient of the LCU may be determined based on the specific value of the LCU coefficient identifier of the LCU.

In one example, the step T710 of obtaining the filtering coefficient of the current LCU based on the region coefficient identifier of the merged region to which the current LCU belongs may include: when it is determined based on the region coefficient identifier of the merged region to which the current LCU that the merged region to which the LCU belongs uses a plurality of sets of filtering coefficients, based on the LCU coefficient identifier of the current LCU, the filtering coefficient of the current LCU is determined from the plurality of sets of filtering coefficients used by the merged region to which the LCU belongs.

For any LCU, when the decoder device determines that the merged region to which the LCU belongs uses a plurality of sets of filtering coefficients, the decoder device may determine the filtering coefficient used by the LCU based on the LCU coefficient identifier of the LCU parsed from the bitstream data. For any merged region, the filter shapes of the plurality of sets of filtering coefficients used by the merged region may be completely same or not completely same.

Embodiment 4

In an embodiment of the present disclosure, there is provided a filtering method, which is applied to a decoder device. The filtering method may include the following steps.

At step T800, when it is determined to perform ALF on a current LCU of a current picture, a coefficient selection identifier of the current LCU is obtained.

At step T810, based on a merged region to which the current LCU belongs and the coefficient selection identifier for the current LCU, a filtering coefficient of the current LCU is determined; where the coefficient selection identifier is used to identify a filtering coefficient selected by the current LCU from a plurality of sets of candidate filtering coefficients.

In an embodiment of the present disclosure, in order to optimize the ALF effect and improve the coding and decoding performance, the LCU is no longer restricted to selecting the filtering coefficients of the merged region to which it belongs, but can adaptively select one set of filtering coefficients for performing ALF from a plurality of sets of filtering coefficients.

For any LCU, the candidate filtering coefficients of the LCU may include, but are not limited to, the filtering coefficients of the merged region to which it belongs and the filtering coefficients of a neighboring region of the merged region to which it belongs. Thus, in a case of transmitting one set of filtering coefficients in each region, there may be a plurality of sets of candidate filtering coefficients one LCU, increasing the selection flexibility of LCU filtering coefficients, optimizing the ALF effect, and improving coding and decoding performance.

For any LCU, the encoder device may, based on the RDO decision, determine the filtering coefficient selected by the LCU from a plurality of sets of candidate filtering coefficients, and write the coefficient selection identifier corresponding to the filtering coefficient into the bitstream data and send it to the decoder device. The decoder device may determine the filtering coefficient of the current LCU based on the merged region to which the current LCU belongs and the coefficient selection identifier of the current LCU parsed from the bitstream data.

At step T820, ALF is performed on the pixels of the current LCU one by one based on the filtering coefficient of the current LCU.

In an embodiment of the present disclosure, when the decoder device determines the filtering coefficient of the current LCU, AFL filtering may be performed on the pixels of the current LCU one by one based on the filtering coefficient of the current LCU.

In the method flow described in an embodiment, a plurality of sets of candidate filtering coefficients are set for each LCU, and the filtering coefficient used by each LCU is determined based on RDO decision, and then the decision result is notified to the decoder device via the coefficient selection identifier. Hence, the flexibility of using the filtering coefficient used by each LCU can be improved, and the ALF performance and the coding and decoding performance are improved.

In some embodiments, the step T810 of determining the filtering coefficient of the LCU based on the merged region to which the LCU belongs and the coefficient selection identifier of the LCU may include: when the value of the coefficient selection identifier of the current LCU is a first value, determining a filtering coefficient of a previous merged region of the merged region to which the current LCU belongs as the filtering coefficient of the current LCU; when the value of the coefficient selection identifier of the current LCU is a second value, determining the filtering coefficient of the merged region to which the current LCU belongs as the filtering coefficient of the current LCU; when the value of the coefficient selection identifier of the current LCU is a third value, determining a filtering coefficient of a next merged region of the merged region to which the current LCU belongs as the filtering coefficient of the current LCU.

In some examples, for any LCU within any merged region, the candidate filtering coefficients of the LCU may include the filtering coefficient of the merged region, filtering coefficient of a previous merged region of the merged region and filter coefficient of a next merged region of the merged region.

In some examples, the previous merged region of the merged region to which the LCU belongs is a merged region corresponding to a previous adjacent index of the index of the merged region to which the LCU belongs. The next merged region of the merged region to which the LCU belongs is a merged region corresponding to a next adjacent index of the index of the merged region to which the LCU belongs.

For the merged regions obtained by performing region merging on the 16 regions obtained according to the fixed region partition manner (for example, sequentially a merged region 0 to a merged region 15 in order), the next merged region of the merged region 15 may be the merged region 0, and the previous merged region of the merged region 0 may be the merged region 15.

In some examples, for any LCU, the encoder device may, based on RDO decision, determine the filtering coefficient used by the LCU. When it is determined that the filtering coefficient used by the LCU is the filtering coefficient of the previous merged region to the merged region which the LCU belongs, it is determined that the value of the coefficient selection identifier of the LCU is the first value, such as 0; when it is determined that the filtering coefficient used by the LCU is the filtering coefficient of the merged region to which the LCU belongs, it is determined that the value of the coefficient selection identifier of the LCU is the second value, for example, 1; when it is determined that the filtering coefficient used by the LCU is the filtering coefficient of the next merged region of the merged region to which the LCU belongs, it is determined that the value of the coefficient selection identifier of the LCU is the third value, for example, 3.

In some examples, for any LCU, when the value of the coefficient selection identifier of the LCU parsed from the bitstream data by the decoder device is the first value, the filtering coefficient of the previous merged region of the merged region to which the LCU belongs may be determined as the filtering coefficient of the LCU; when the value of the coefficient selection identifier of the LCU parsed from the bitstream data is the second value, the filtering coefficient of the merged region to which the LCU belongs is determined as the filtering coefficient of the LCU; when the value of the coefficient selection identifier of the LCU parsed from the bitstream data is the third value, the filtering coefficient of the next merged region of the merged region to which the LCU belongs may be determined as the filtering coefficient of the LCU.

It can be seen that the filtering coefficient of the merged region to which the LCU belongs and the filtering coefficients of the previous merged region and the next merged region of the merged region to which the LCU belongs are taken as the candidate filtering coefficients of the LCU, and based on the RDO decision, one set of filtering coefficients is selected as the filtering coefficient of the LCU. Thus, when one set of filtering coefficients is trained in one merged region, there may be a plurality of sets of candidate filtering coefficients in the LCU of the merged region. In this way, it is not required to train a plurality of sets of filtering coefficients for one merged region, thus improving the flexibility of the filtering coefficient of the LCU, optimizing the ALF performance and promoting the coding and decoding performance.

Embodiment 5

Figure 7:
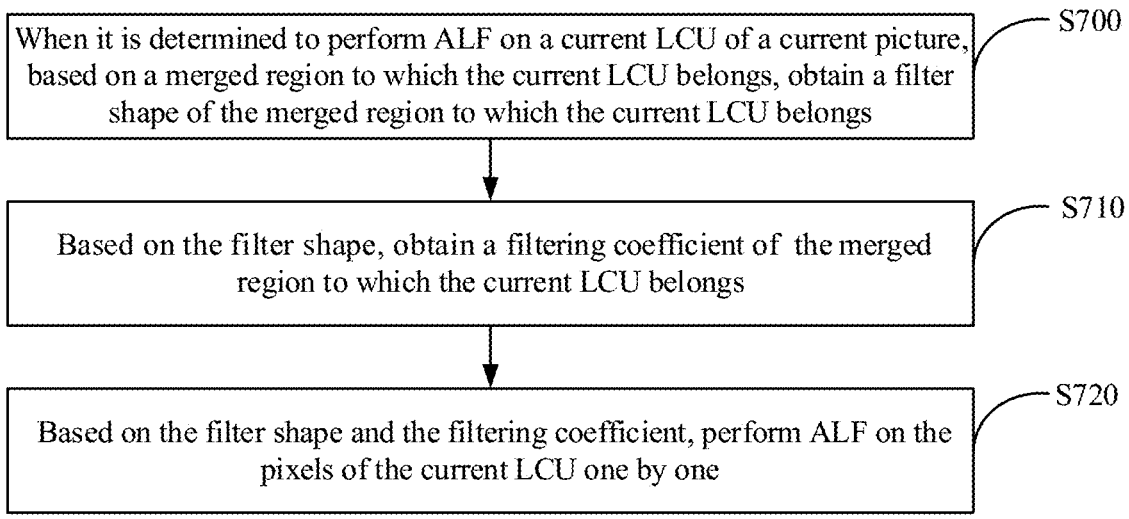
FIG. 7 is a schematic flowchart illustrating a filtering method according to an embodiment of the present disclosure.

Referring to FIG. 7, it is a flowchart illustrating a filtering method according to an embodiment of the present disclosure. The filtering method may be applied to a decoder device. As shown in FIG. 7, the filtering method may include the following steps.

At step S700, when it is determined to perform ALF on the current LCU of the current picture, a filter shape of the merged region to which the current LCU belongs is obtained based on the merged region to which the current LCU belongs.

At step S710, based on the filter shape, the filtering coefficient of the merged region to which the current LCU belongs is obtained.

In an embodiment of the present disclosure, in order to improve the flexibility of the filtering coefficients, optimize the ALF effect and enhance the coding and decoding performance, each region is no longer restricted to using a same filter shape, but can selectively use different filter shapes, i.e. the filter shapes used in different merged regions can be same or different.

In some examples, for any merged region, the encoder device may train a plurality of sets of filtering coefficients of different filter shapes and based on the RDO decision, determine the filter shape and the filtering coefficient used by the merged region, and write the filter shape and filtering coefficient to the bitstream data to be sent to the decoder device.

In some examples, for any merged region, the decoder device, when obtaining the filtering coefficient of the merged region, may parse the filter shape of the merged region from the bitstream data and, based on the filter shape, parse the filtering coefficient of the merged region from the bitstream data.

At step S720, ALF is performed on the pixels of the current LCU one by one based on the filter shape and filtering coefficient.

In an embodiment of the present disclosure, when the decoder device determines the filtering coefficient of the current LCU, ALF may be performed on the pixels of the current LCU one by one based on the filtering coefficient of the current LCU.

As can be seen, in the method flow shown in FIG. 7, a plurality of sets of filtering coefficients with different filter shapes are trained for each region, and the filter shape and filtering coefficient used by each merged region are determined based on RDO decision, and then the decision result is notified to the decoder device by the bitstream data. The decoder device can parse the filter shape and the filtering coefficient of each region from the bitstream data, thus improving the ALF effect and the coding and decoding performance In an embodiment of the present disclosure, the filter shape may also be selected for the picture, or for a component of the picture (e.g., a luma component and/or chroma component). For example, when a centrosymmetric filter shape with a 7*7 cross shape plus a 5*5 square shape is selected for the picture A, each LCU subjected to ALF in the picture A uses the centrosymmetric filter shape with a 7*7 cross shape plus a 5*5 square shape.

Embodiment 6

Figure 8:
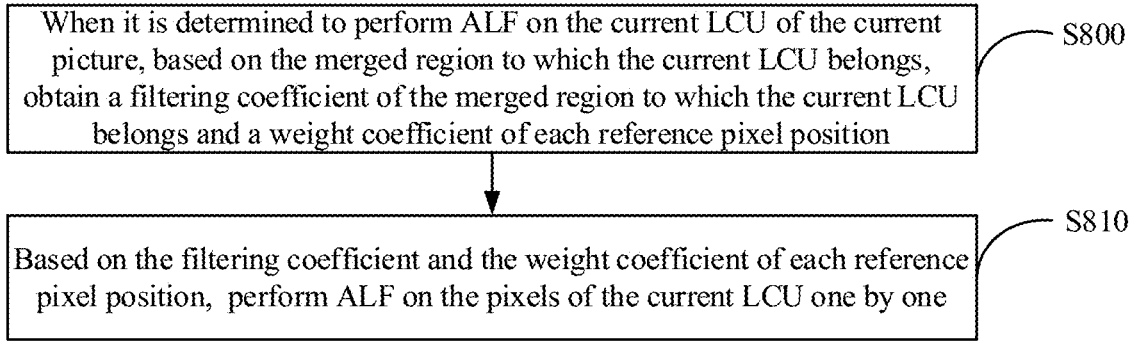
FIG. 8 is a schematic flowchart illustrating a filtering method according to an embodiment of the present disclosure.

Referring to FIG. 8, it is a flowchart illustrating a filtering method according to an embodiment of the present disclosure. The filtering method may be applied to a decoder device. As shown in FIG. 8, the filtering method may include the following steps.

At step S800, when it is determined to perform ALF on the current LCU of the current picture, based on the merged region to which the current LCU belongs, a filtering coefficient of the merged region to which the current LCU belongs and a weight coefficient of each reference pixel position are obtained.

At step S810, based on the filtering coefficient and the weight coefficient of each reference pixel position, ALF is performed on the pixels of the current LCU one by one.

In an embodiment of the present disclosure, in order to optimize the ALF effect and improve the coding and decoding performance, the filter used for performing ALF is no longer restricted to a symmetric filter, but an asymmetric filter can be used, i.e. the filtering coefficients at symmetrical positions can be different and satisfy a certain proportional relationship, such as 0.5:1.5 or 0.6:1.4, etc.

When ALF is performed based on the determined filtering coefficients, according to a sum of a product of each filtering coefficient of the determined filtering coefficients and a reference pixel of a corresponding position, a filtered pixel value can be obtained. The above ratio can be taken as a ratio between the filtering coefficients of the symmetrical positions, or, as a ratio of weights of (referred to as weight ratio) the pixel values of the corresponding reference pixels of the filtering coefficients of the symmetrical positions involved in ALF calculation, that is, the above asymmetric filter refers to that the filtering coefficients of the symmetric positions are different or, the weights of the pixel values of the reference pixels corresponding to the filtering coefficients of the symmetric positions are different.

For example, if the filtering coefficient of a centrosymmetric filter shape with a 7*7 cross shape plus a 5*5 square shape is $C_i$, the filtering coefficient of its corresponding position is $C_{28-i}$. Thus, $C_i:C_{28-i}=A_i: (2-A_i)$, or, the ratio of the weights of $P_i$ and $P_{28-i}$ in participating in the ALF calculation is $A_i: (2-A_i)$, where $P_i$ is a pixel value of a reference pixel position corresponding to $C_i$ and $P_{28-i}$ is a pixel value of the reference pixel position corresponding to $C_{28-i}$. For a current filtered pixel of the LCU, the filtered pixel value of the pixel can be determined as follows:

$$P = \sum_{i=0}^{13}(C_i * A_i * P_i + C_i * (2 - A_i) * P_{28-i}) + C_{14} * P_{14}$$

In the above equation, $C_i$ is the (i+1)-th filtering coefficient in the filtering coefficients of the merged region to which the LCU belongs, $P_i$ is a pixel value of the reference pixel position corresponding to the filtering coefficient $C_i$, the reference pixel position corresponding to $P_{28-i}$ and the reference pixel position corresponding to $P_i$ are centrosymmetric about the pixel position of the current filtered pixel, $A_i$ is a weight coefficient of the pixel value of the reference pixel position corresponding to $P_i$, $P_{14}$ is the pixel value of the current filtered pixel, $C_{14}$ is the filtering coefficient of the current filtered pixel, and $0<A_i<2$.

In an embodiment of the present disclosure, for any merged region, the encoder device may determine the filtering coefficient and the filter performance of the merged region under the condition that each position corresponds to a different weight coefficient. One set of filtering coefficients with the best filtering performance is selected, and the filtering coefficient and the weight coefficient corresponding to each position of the corresponding filter are recorded and written to the bitstream data to be sent to the decoder device.

In some examples, a weight coefficient set (for example, the value set of the above $A_i$) may be pre-constructed, and each weight coefficient may be selected from the set so as to obtain the filtering coefficient with the best filtering performance and the weight coefficient corresponding to each position of the corresponding filter, and further, an index of the weight coefficient in the weight coefficient set is written into the bitstream data to be sent to the decoder device.

For any LCU, the decoder device can parse the filtering coefficient of the merged region to which the LCU belongs and the weight coefficient of each reference pixel position corresponding to the merged region to which the LCU belongs from the bitstream data, and perform ALF on the pixels of the LCU one by one.

In the method flow shown in FIG. 8, the filter used by each merged region is no longer restricted to a symmetric filter, and the filtering coefficients of the reference pixels of symmetric positions are no longer restricted to same, but satisfy a certain proportional relationship. Since satisfying the proportional relationship between the filtering coefficients of the symmetric positions does not require more filtering coefficients, thus improving the flexibility of the filtering coefficients and optimizing the ALF performance and enhancing the coding and decoding performance.

Embodiment 7

In an embodiment of the present disclosure, there is provided a filtering method which may be applied to an encoder device. The filtering method may include the following steps.

At step T100, a luma component of a current picture is partitioned.

The region partition of the luma component of the picture can be found in the "region partition" section above.

At step T110, for any region, each LCU within the region is classified and the region is partitioned into a plurality of region classes based on the class of each LCU.

In an embodiment of the present disclosure, in order to optimize the ALF effect and improve the coding and decoding performance, when a plurality of regions are obtained by performing region partition on the luma component of the picture according to the fixed region partition manner, for each region, the LCUs within the region may be partitioned into at least one class based on the pixel characteristics of each pixel within the region, i.e. one region may be partitioned into at least one sub-region or region class by way of LCU classification.

At step T120, region merging is performed on the region classes and a filtering coefficient of each merged region is determined.

At step T130, the filtering coefficient of each merged region and a region class identifier of each LCU are written into the bitstream data.

In an embodiment of the present disclosure, when the encoder device classifies the LCUs within each region in the manner described above, the encoder device may perform region merging on the region classes to obtain at least one merged region, and determine a filtering coefficient of each merged region.

The implementation of performing region merging on the region classes is similar to the descriptions of the "region merging" as above and will not be repeated here.

In some examples, for any region class, based on the merged region to which the region class belongs, the encoder device may assign a coefficient index to the region and the coefficient index corresponds to a filtering coefficient of the merged region.

In an embodiment of the present disclosure, the encoder device may write the filtering coefficient of each merged region, an index of each region class and a region class identifier for identifying the region class to which each LCU belongs to the bitstream data and then send them to the decoder device.

The processing flow of the decoder device can be found in the relevant descriptions in the above-mentioned embodiments and will not be repeated here.

Embodiment 8

In an embodiment of the present disclosure, there is provided a filtering method which may be applied to an encoder device. The filtering method may include the following steps.

At step T200, for any merged region of the current picture, a filtering coefficient used by the merged region is determined based on the RDO decision.

At step T210, based on the filtering coefficient of the merged region, a region coefficient identifier of the merged region is determined; where the region coefficient identifier is used to identify the filtering coefficient used by the merged region from a plurality of sets of predetermined filtering coefficients.

At step T220, the filtering coefficient used by each merged region and the region coefficient identifier of each merged region are written into the bitstream data.

In an embodiment of the present disclosure, in order to optimize the ALF effect and improve the coding and decoding performance, the filtering coefficient used by one merged region is no longer limited to one set of filtering coefficients, but one or more sets of filtering coefficients can be selected according to the actual situation.

For any merged region, the encoder device may train a plurality of sets of filtering coefficients and based on the RDO decision, determine that the merged region uses one or more sets of the plurality of sets of filtering coefficients, and write the region coefficient identifier for identifying the filtering coefficient used by the merged region into the bitstream data.

The processing flow of the decoder device can be found in the relevant descriptions in the above-mentioned embodiments and will not be repeated here.

The above filtering method may further include: for any merged region of the current picture, when the filtering coefficient used by the merged region includes a plurality of sets of filtering coefficients, based on the filtering coefficient of each LCU in the merged region, determining a LCU coefficient identifier of each LCU; and writing the LCU coefficient identifier of each LCU to the bitstream data.

In some examples, the encoder device may notify the decoder device that the merged region uses one or more sets of filtering coefficients by means of the region coefficient identifier. For any LCU in the merged region, the encoder device may identify, by means of the LCU coefficient identifier, the filtering coefficient used by the LCU from one or more sets of filtering coefficients used by the merged region.

For any merged region, when the encoder device determines that the merged region uses a plurality of sets of filtering coefficients, for any LCU in the merged region, the encoder device may notify the decoder device of the filtering coefficient used by the LCU in the plurality of sets of filtering coefficients by means of the LCU coefficient identifier.

For any LCU, when no ALF performed on the LCU, the value of the LCU coefficient identifier of the LCU written into the bitstream data by the encoder device is a first value. For example, the first value is 0. For any LCU, when the encoder device determines not to perform ALF on the LCU, the value of the LCU coefficient identifier of the LCU written into the bitstream data is 0.

Embodiment 9

In an embodiment of the present disclosure, there is provided a filtering method which may be applied to an encoder device. The filtering method may include the following steps.

At step T300, for any merged region of the current picture, determine, based on the RDO decision, the filtering coefficient used by the merged region is determined from a plurality of sets of filtering coefficients.

At step T310, based on the filter coefficient used by the region, a coefficient selection identifier of each LCU in the merged region is determined; where the coefficient selection identifier is used to identify the filtering coefficient selected by each LCU from a plurality of sets of candidate filtering coefficients.

At step T320, the filtering coefficient used by each merged region and the coefficient selection identifier of each LCU are written into the bitstream data.

In an embodiment of the present disclosure, in order to optimize the ALF effect and improve the coding and decoding performance, the LCU is no longer restricted to selecting the filtering coefficient of the merged region to which it belongs, but can adaptively select one set of filtering coefficients for performing ALF from a plurality of sets of filtering coefficients.

In some examples, for any LCU, the candidate filtering coefficients of the LCU may include, but not limited to, the filtering coefficient of the merged region to which it belongs and the filtering coefficients of the neighboring regions of the merged region to which it belongs. In a case of transmitting one set of filtering coefficients in each region, there may be a plurality of sets of candidate filtering coefficients for one LCU, increasing the selection flexibility of LCU filtering coefficient, optimizing the ALF effect and improving coding and decoding performance.

In some examples, for any LCU, the encoder device may, based on the RDO decision, determine the filtering coefficient used by the LCU from the plurality of sets of candidate filtering coefficients, and write the coefficient selection identifier corresponding to the filtering coefficient to the bitstream data to be sent to the decoder device.

The processing flow of the decoder device can be found in the relevant descriptions in the above-mentioned embodiments and will not be repeated here.

For any LCU in any merged region, the candidate filtering coefficients of the LCU may include the filtering coefficient of the merged region, the filtering coefficient of a previous merged region of the merged region and the filtering coefficient of a next merged region of the merged region.

For 16 merged regions obtained by performing region merging on the 16 regions obtained according to the fixed region partition manner (for example, sequentially a merged region 0 to a merged region 15 in order), the next merged region of the merged region 15 may be the merged region 0, and the previous merged region of the merged region 0 may be the merged region 15.

For any LCU, the encoder device may, based on RDO decision, determine the filtering coefficient used by the LCU. When it is determined that the filtering coefficient used by the LCU is the filtering coefficient of the previous merged region to the merged region which the LCU belongs, it is determined that the value of the coefficient selection identifier of the LCU is the first value, such as 0; when it is determined that the filtering coefficient used by the LCU is the filtering coefficient of the merged region to which the LCU belongs, it is determined that the value of the coefficient selection identifier of the LCU is the second value, for example, 1; when it is determined that the filtering coefficient used by the LCU is the filtering coefficient of the next merged region of the merged region to which the LCU belongs, it is determined that the value of the coefficient selection identifier of the LCU is the third value, for example, 3

Embodiment 10

In an embodiment of the present disclosure, there is provided a filtering method which may be applied to an encoder device. The filtering method may include the following steps.

At step T400, for any merged region of a current picture, a filter shape and a filtering coefficient used by the merged region are determined based on the RDO decision.

At step T410, the filter shape and filtering coefficient used by each merged region are written into the bitstream data.

In an embodiment of the present disclosure, in order to increase the flexibility of the filtering coefficients, optimize the ALF effect and improve the coding and decoding performance, each merged region is no longer restricted to using a same filter shape, but can in some examples use a different filter shape, that is, the filter shapes used by different merged regions can be same or different.

In some examples, for any merged region, the encoder device may train a plurality of sets of filtering coefficients of different filter shapes and based on RDO decision, determine the filter shape and the filtering coefficient used by the merged region, and write the filter shape and the filtering coefficient into the bitstream data to be sent to the decoder device.

The processing flow of the decoder device can be found in the relevant descriptions in the above-mentioned embodiments and will not be repeated here.

In an embodiment of the present disclosure, the filter shape may also be selected for the picture, or for a component of the picture (e.g., a luma component and/or chroma component). For example, when a centrosymmetric filter shape with a 7*7 cross shape plus a 5*5 square shape is selected for the picture A, each LCU subjected to ALF in the picture A uses the centrosymmetric filter shape with a 7*7 cross shape plus a 5*5 square shape.

Embodiment 11

In an embodiment of the present disclosure, there is provided a filtering method which may be applied to an encoder device. The filtering method may include the following steps.

At step T500, for any merged region of a current picture, based on the RDO decision, the filter coefficient used by the merged region and the weight coefficient of each corresponding reference pixel position are determined.

At step T510, the filtering coefficient used by each merged region and the weight coefficient of each corresponding reference pixel position are written into the bitstream data.

In an embodiment of the present disclosure, in order to optimize the ALF effect and improve the coding and decoding performance, the filter used for performing ALF is no longer restricted to a symmetric filter, but in some examples, an asymmetric filter, that is, the position-symmetric filtering coefficients may be different and satisfy a certain proportional relationship, for example, 0.5:1.5 or 0.6:1.4, etc.

With the filter shown in FIG. 13 as an example, the filtering coefficients centrosymmetric about the position of $C_{14}$ are no longer restricted to same, but can satisfy certain proportional relationships, for example, $C_1:C_{27}=0.5:1.5$, $C_6:C_{22}=0.6:1.4$, etc.

When ALF is performed based on the determined filtering coefficients, according to a sum of a product of each filtering coefficient of the determined filtering coefficients and a reference pixel of a corresponding position, a filtered pixel value can be obtained. The above ratio can be taken as a ratio between the filtering coefficients of the symmetrical positions, or, as a ratio of weights of (referred to as weight ratio) the pixel values of the corresponding reference pixels of the filtering coefficients of the symmetrical positions involved in ALF calculation, that is, the above asymmetric filter refers to that the filtering coefficients of the symmetric positions are different or, the weights of the pixel values of the reference pixels corresponding to the filtering coefficients of the symmetric positions are different.

For example, as shown in FIG. 13, the filtering coefficient of a centrosymmetric filter shape with a 7*7 cross shape plus a 5*5 square shape is $C_i$, and the filtering coefficient of its symmetric position is $C_{28-i}$. Thus, $C_i:C_{28-i}=A_i:(2-A_i)$, or, the ratio of the weights of $P_i$ and $P_{28-i}$ in participating in the ALF calculation is $A_i:(2-A_i)$, where $P_i$ is a pixel value of a reference pixel position corresponding to $C_i$ and $P_{28-i}$ is a pixel value of the reference pixel position corresponding to $C_{28-i}$. For a current filtered pixel of the LCU, the filtered pixel value of the pixel can be determined as follows:

$$P = \sum_{i=0}^{13}(C_i * A_i * P_i + C_i * (2 - A_i) * P_{28-i}) + C_{14} * P_{14}$$

In the above equation, $C_i$ is the (i+1)-th filtering coefficient in the filtering coefficients of the merged region to which the LCU belongs, $P_i$ is a pixel value of the reference pixel position corresponding to the filtering coefficient $C_i$, the reference pixel position corresponding to $P_{28-i}$ and the reference pixel position corresponding to $P_i$ are centrosymmetric about the pixel position of the current filtered pixel, $A_i$ is a weight coefficient of the pixel value of the reference pixel position corresponding to $P_i$, $P_{14}$ is the pixel value of the current filtered pixel, $C_{14}$ is the filtering coefficient of the current filtered pixel, and $0<A_i<2$.

For the filter shown in FIG. 13, if $C_i:C_{28-i}=A_i:(2-A_i)$, when the filtering coefficients of the symmetric positions (centrosymmetric about the $C_{14}$) are different, it is only required to train 15 coefficients from $C_0$ to $C_{14}$, and the remaining coefficients can be determined based on the weight coefficients. For example, if $A_1=0.5$, $C_1:C_{27}=0.5:1.5$; if $A_0=0.6$, $C_0:C_{28}=0.6:1.4$.

In an embodiment of the present disclosure, for any merged region, the encoder device may determine the filtering coefficient and the filter performance of the merged region under the condition that each position corresponds to a different weight coefficient. One set of filtering coefficients with the best filtering performance is selected, and the filtering coefficient and the weight coefficient corresponding to each position of the corresponding filter are recorded and written to the bitstream data to be sent to the decoder device.

In some examples, a weight coefficient set (for example, the value set of the above $A_i$) may be pre-constructed, and each weight coefficient may be selected from the set so as to obtain the filtering coefficient with the best filtering performance and the weight coefficient corresponding to each position of the corresponding filter, and further, an index of the weight coefficient in the weight coefficient set is written into the bitstream data to be sent to the decoder device The processing flow of the decoder device can be found in the relevant descriptions in the above-mentioned embodiments and will not be repeated here.

In order to enable persons skilled in the arts to better understand the technical solutions provided by the embodiments of the present application, the technical solutions provided by the embodiments of the present application are described below with specific examples.

For the shortcomings of conventional ALF, the following optimization solutions are proposed in the embodiments of the present disclosure.

Solution 1: For each picture, with the LCU as the smallest unit, the picture is adaptively partitioned into multiple regions, where each region may include more than one LCU. Therefore, it is proposed to perform classification on the LCUs so as to classify the LCUs in a same region into N classes, where N is a positive integer.

Solution 2: A plurality of sets of filtering coefficients can be transmitted in each region, and each set of filter shapes can be same or different.

Solution 3: One set of filtering coefficients is selected adaptively based on each LCU, and the LCUs in a same region can select the filtering coefficients of a neighboring region.

Solution 4: Only one set of filtering coefficients can be transmitted in each region, but the filter shape of each region may not be same.

Solution 5: The symmetric filter is modified to an asymmetric filter, including optimizing the filtering coefficients at the symmetric positions such that a certain proportional relationship is satisfied at symmetric positions, such as 0.5:1.5 or 0.6:1.4, etc.

Solution 6: The values of the samples at the boundary during filtering are optimized.

The main improvement points of the present disclosure are first described below at the encoder and decoder respectively.

I. Coding Methods and Encoder

For an encoder, an ALF sequence header may be obtained to determine whether to enable ALF for a current sequence.

If the ALF sequence header indicates disabled, the ALF is disabled, and the enhanced ALF (i.e. enhancement made by the ALF solution provided in the embodiments of the present disclosure for the conventional ALF, which may include one or more optimization solutions from above the solution 1 to solution 6) is also disabled. The ALF sequence header is transmitted to the decoder device. If the ALF sequence header indicates enabled, the ALF technique coding is enabled and the EALF sequence header is available.

If enhanced ALF is enabled, the original ALF is used for filtering. The ALF sequence header, an ealf sequence header (that is, enhanced ALF sequence header) and the parameters required for ALF are transmitted on to the decoder device.

If enhanced ALF is enabled, the following solution can be used to optimize ALF and the ALF sequence header, the ealf sequence header and the parameters required for the enhanced ALF are transmitted to the decoder device.

In some examples, the ealf sequence header may be not-present. In this case, if the ALF sequence header indicates enabled, it is determined to use the enhanced ALF.

1.1. Adaptive Region Partition with the LCU as the Smallest Unit

The luma component is subjected to fixed region partition to generate a plurality of regions; the LCUs belonging to a same region are further partitioned (i.e. each LCU within the same region is classified), and one region is further partitioned into at most $N_1$ classes, with $N_1$ being a positive integer. In some examples, if $N_1=2$, the total number of regions is at most twice the original; if $N_1=1$, the original fixed region partition solution is performed.

The encoder device can mark a partition result of the LCUs within each region and send it to the decoder device (i.e. the region class identifier of each LCU is sent to the decoder device).

1.2. A Solution in which a Plurality of Sets of Filtering Coefficients can be Transmitted in Each Region.

For any merged region, at most n sets of filtering coefficients can be transmitted, and each LCU in the merged region is marked. 0 means disabled, i.e. no ALF is performed; i means that the current LCU uses a particular set of filtering coefficients in the region, where the value of i is in the range [1, n].

In some examples, each set of filtering coefficients is obtained as follows: for the first training for the filtering coefficients, it is defaulted that ALF is performed on all LCUs; after decision, those disabled LCUs (LCUs on which the ALF is not performed) are not involved in a second training of the filtering coefficients. At the same time, the LCUs having the same mark jointly train a same set of filtering coefficients.

Similarly, the third training of the filtering coefficients is carried out based on the result of the second decision.

Finally, based on a picture level or region level, it is determined that at most n sets of filtering coefficients are used for the picture or the merged region, and finally the filtering coefficient corresponding to each merged region is written to the bitstream data.

1.3. Each LCU Adaptively Selects One Set of Filtering Coefficients.

For a luma component, for any LCU, the filtering coefficient of the region where the current LCU is located or the filtering coefficient of other region can be used during decision, and a maximum number of filters available for each LCU is $N_2$ (i.e. $N_2$ sets of filtering coefficients, $N_2 \geq 2$). The RDO decision is made under $N_2$ sets of filtering coefficients to select one set of filtering coefficients with the best performance and the optimal selection result of the current LCU is sent to the decoder device (i.e. the coefficient selection identifier is sent to the decoder device). In some examples, $N_2$ is less than or equal to the number of the merged regions.

1.4. Each Region Selects a Different Filter Shape.

One set of filtering coefficients is transmitted in each region. For any LCU, the encoder device can notify the decoder device, via one flag, of performing or not performing ALF (i.e. disabled).

When the filtering coefficient of each region is calculated, for any merged region, the filtering coefficients under $N_3$ ($N_3>2$) different filter shapes can be calculated respectively, and filtering performances under $N_3$ different filter shapes are calculated respectively. So, a filter shape with the best performance is selected. Then, the filter shape and the filtering coefficient with the best performance in reach region can be notified to the decoder device via the bitstream data.

The encoder device can also select different filter shapes based on the picture level, or based on the Y, U and V components. For example, different filter shapes are selected base the picture level. For any picture, the filtering coefficient of each region under $N_4$ different filter shapes can be calculated respectively, and the filtering performance of the picture under $N_4$ ($N_4>2$) filter shapes is calculated. Thus, a filter shape with best performance is selected. Then, the best-performing filter shape of the picture and the filtering coefficient of each region are notified to the decoder device via the bitstream data.

1.5. Modification of a Symmetric Filter to an Asymmetric Filter

For a symmetric filter with $N_5$ ($N_5>2$) coefficients, it is only required to train $\lfloor N_5/2 \rfloor+1$ filtering coefficients, where $\lfloor * \rfloor$ is a down rounding operation. For example, when "*" is not an integer, the non-integer part of "*" is set to 0, e.g. $\lfloor 3/2 \rfloor=1$, $\lfloor 7/3 \rfloor=2$.

In some examples, after modifying the symmetric filter to the asymmetric filter, the filtering coefficients of the symmetric positions satisfy a different proportional relationship. Thus, during coefficient training, it is still only required to train $\lfloor N_5/2 \rfloor+1$ filtering coefficient.

Taking the filter shape shown in FIG. 4A as an example, $C_i$ and $C_{28-i}$ are symmetrical positions. The RDO decision can be used to select a proportional relationship of the filtering coefficients of each pair of symmetrical positions and the proportion of the filtering coefficient of each position and the filtering coefficient of the symmetric position is sent to the decoder device via the bitstream data. In some examples, when the proportion of the filtering coefficients of all symmetrical positions is 1:1, the filters trained are still symmetric filters.

II. Decoding Method and Decoder Device

For decoder devices, the ALF sequence header can be read from the code stream to determine whether ALF is to be enabled for the current sequence. If the ALF sequence header indicates disabled, ALF is disabled. If the ALF sequence header indicates enabled, the ealf sequence header can continue to be read.

If the ealf sequence header indicates disabled, the filtering parameters required for the original ALF are obtained; if the ealf sequence header indicates enabled, the filtering parameters required for the enhanced ALF are read.

In some examples, the ealf sequence header may also not be present. In this case, if the ALF sequence header indicates enabled, the filtering parameters required for the enhanced ALF are read.

2.1. Adaptive Region Partition with LCU as the Smallest Unit

The luma component is subjected to fixed region partition to generate multiple regions; the filtering coefficients of all regions are read from the bitstream data, while the region class identifiers of all LCUs on which ALF is performed are also read from the bitstream data; according to the fixed region partition result, based on the region class identifier, the region class to which the LCU belongs is determined; the corresponding filtering coefficient is obtained based on the region class to which the LCU belongs, and then ALF is performed on the pixels of the LCU one by one.

2.2. Solution in which a Plurality of Sets of Filtering Coefficients can be Transmitted in Each Region The picture-level or region-level coefficient identifier is read from the bitstream data, and based on the picture-level or region-level coefficient identifier, a plurality of sets of filtering coefficients in each merged region are read from the bitstream data, and based on the picture-level or region-level coefficient identifier, a number of the filters selectable (i.e. a number of sets of filtering coefficients) is determined.

The LCU coefficient identifier of each LCU is obtained from the bitstream data and one set of filtering coefficients is selected based on the LCU coefficient identifier of each LCU. When filtering is performed on the current LCU, this set of filtering coefficients is used to perform ALF on the pixels of the LCU one by one.

2.3. Adaptive Selection of One Set of Filtering Coefficients for Each LCU

The filtering coefficient in each region and the ALF flag of each LCU (i.e. indicating whether to perform ALF or not perform ALF on the LCU) are read from the bitstream data. For each LCU on which ALF is performed, the coefficient selection identifier of the LCU is read from the bitstream data.

For any LCU, the maximum number of filters available is $N_2$ (i.e. there are at most $N_2$ sets of candidate filtering coefficients).

2.4. Choose a Different Filter Shape for Each Region

For any merged region, the filter shape of the merged region can be read from the bitstream data and the filtering coefficient of the merged region can be read based on the filter shape. ALF is performed on the pixels of each LCU one by one based on the filter shape and filtering coefficient.

2.5. Modification of a Symmetric Filter to an Asymmetric Filter

The filtering coefficient of each merged region is read from the bitstream data, and the proportional relationship of the filtering coefficients of symmetric positions is read.

Based on the proportional relationship of the filtering coefficient of each position and the filtering coefficient of the symmetric position, the filtering coefficient of each position of the merged region can be derived, and ALF is performed on the pixels of the LCU one by one in the merged region.

The optimization solution for the value of the samples in the filtering boundary is described below.

Embodiment 12: Optimization Solution 1 for the Values of the Samples in the Filtering Boundary For example, the filter shape is as shown in FIG. 4A. If the samples used in the adaptive leveling filtering process (i.e. the reference pixels for performing filtering on the current filtered pixel in the adaptive leveling filtering unit) are samples in the adaptive leveling filtering unit (i.e. the reference pixels are in the adaptive leveling filtering unit), the samples are used for filtering; if the samples used in the adaptive leveling filtering process are not samples in the adaptive leveling filtering unit (i.e. the reference pixels are not within the adaptive leveling filtering unit) the filtering is performed as follows.

12.1. If the sample is beyond the picture boundary, or beyond the patch boundary and disallows performing filtering by crossing the patch boundary, 12.1.1. if the sample corresponds to the $C_1, C_2, C_6, C_4, C_5$ or $C_{10}$ position of the filter shape, filtering is performed by using a sample closest to the sample within the adaptive leveling filtering unit and the boundary region to replace the sample;

12.1.2. if the sample does not correspond to the $C_1, C_2, C_6, C_4, C_5$ or $C_{10}$ position of the filter shape, filtering is performed by using a sample closest to the sample within the adaptive leveling filtering unit to replace the sample.

12.2. If the sample is beyond the upper or lower boundary of the adaptive leveling filtering unit, 12.2.1. if the sample corresponds to the $C_1, C_2, C_6, C_4, C_5$ or $C_{10}$ position of the filter shape, filtering is performed by using a sample closest to the sample within the adaptive leveling filtering unit and the boundary region to replace the sample.

12.2.2. if the sample does not correspond to the $C_1, C_2, C_6, C_4, C_5$ or $C_{10}$ position of the filter shape, filtering is performed by using a sample closest to the sample within the adaptive leveling filtering unit to replace the sample.

12.3. If the sample does not satisfy the conditions in 12.1 nor satisfy the conditions in 12.2, the sample is used for filtering.

Embodiment 13: Optimization Solution 2 for the Values of the Samples in the Filtering Boundary For example, the filter shape is as shown in FIG. 4A. If the samples used in the adaptive leveling filtering process (i.e. the reference pixels for performing filtering on the current filtered pixel in the adaptive leveling filtering unit) are samples in the adaptive leveling filtering unit (i.e. the reference pixels are in the adaptive leveling filtering unit), the samples are used for filtering; if the samples used in the adaptive leveling filtering process are not samples in the adaptive leveling filtering unit (i.e. the reference pixels are not within the adaptive leveling filtering unit) the filtering is performed as follows.

13.1. If the sample is beyond the picture boundary, or beyond the patch boundary and disallows performing filtering by crossing the patch boundary, filtering is performed by using a sample closest to the sample within the adaptive leveling filtering unit and the boundary region to replace the sample.

13.2. If the sample is beyond the upper or lower boundary of the adaptive leveling filtering unit, filtering is performed by using a sample closest to the sample within the adaptive leveling filtering unit and the boundary region to replace the sample.

13.3. If the sample does not satisfy the conditions in 13.1 nor satisfy the conditions in 13.2, the sample is used for filtering.

Embodiment 14: Optimization Solution 3 of the Values of the Samples in the Filtering Boundary For example, the filter shape is as shown in FIG. 4A. If the samples used in the adaptive leveling filtering process (i.e. the reference pixels for performing filtering on the current filtered pixel in the adaptive leveling filtering unit) are samples in the adaptive leveling filtering unit (i.e. the reference pixels are in the adaptive leveling filtering unit), the samples are used for filtering; if the samples used in the adaptive leveling filtering process are not samples in the adaptive leveling filtering unit (i.e. the reference pixels are not within the adaptive leveling filtering unit), the filtering is performed as follows.

14.1. If the sample is beyond the picture boundary, or beyond the patch boundary and disallows performing filtering by crossing the patch boundary,
  14.1.1. if the EalfEnableFlag (enable flag for enhanced adaptive leveling filtering) is equal to 1, filtering is performed by using a sample closest to the sample within the adaptive leveling filtering unit and the boundary region to replace the sample.
  14.1.2. if the EalfEnableFlag is equal to 0, filtering is performed by using a sample closest to the sample within the adaptive leveling filtering unit to replace the sample.
14.2. If the sample is beyond the upper or lower boundary of the adaptive leveling filtering unit,
  14.2.1. if the EalfEnableFlag is equal to 1, filtering is performed by using a sample closest to the sample within the adaptive leveling filtering unit and the boundary region to replace the sample.
  14.2.2. if the EalfEnableFlag is equal to 0, filtering is performed by using a sample closest to the sample within the adaptive leveling filtering unit to replace the sample.
14.3. If the sample does not satisfy the conditions in 14.1 nor satisfy the conditions in 14.2, the sample is used for filtering.

The EalfEnableFlag refers to a flag whose value may include '1' or '0'. When the EalfEnableFlag is equal to 1, it means that enhanced adaptive leveling filtering can be used; when the EalfEnableFlag is equal to 0, it means that adaptive leveling filtering should not be used. In some examples, the value of the EalfEnableFlag can be derived from the decoder, or obtained from the bitstream data at the decoder. The value of the EalfEnableFlag can also be a constant value. The value of the EalfEnableFlag can be equal to the value of ealf_enable_flag (i.e. enhanced adaptive leveling filtering enable flag). When the EalfEnableFlag is equal to 1, it means enhanced adaptive leveling filtering can be used; when the EalfEnableFlag is equal to 0, it means that adaptive leveling filtering should not be used.

Embodiment 15: Optimization Solution 4 for the Values of the Samples in the Filtering Boundary When the sample is beyond the picture boundary, or beyond the patch boundary and the value of the CplfEnableFlag is 0, or beyond the upper or lower boundary of the current adaptive leveling filtering unit, the true value of the sample cannot be obtained, and thus, filtering is performed by using a sample closest to the sample within the current adaptive leveling filtering unit to replace the sample.

The current adaptive leveling filtering unit may be filtered using the first filter as shown in FIG. 4A, and the current adaptive leveling filtering unit may also be filtered using the second filter as shown in FIG. 9.

It is assumed that the current adaptive leveling filtering unit is filtered by using the first filter as shown in FIG. 4A, with the filter shape shown in FIG. 4A.

When any sample used in the adaptive leveling filtering process (a reference pixel sample for performing filtering on current filtered pixel within the current adaptive leveling filtering unit) is a sample within the current adaptive leveling filtering unit, filtering is performed directly using the sample; when any sample used in the adaptive leveling filtering process is not a sample within the current adaptive leveling filtering unit, filtering is performed as follows.

15.1. If the sample is beyond the picture boundary, or beyond the patch boundary and the value of CplfEnableFlag is 0, filtering is performed by using a sample closest to the sample within the current adaptive leveling filtering unit to replace the sample. The CplfEnableFlag is used to indicate whether the adaptive leveling filtering can be performed by crossing the patch boundary.
15.2. If the sample is beyond the upper or lower boundary of the current adaptive leveling filtering unit, filtering is performed by using a sample closest to the sample within the current adaptive leveling filtering unit to replace the sample.
15.3. Otherwise, filtering is performed by directly using the sample.

In some examples, CplfEnableFlag indicates whether adaptive leveling filter can be performed by crossing the patch boundary, which may also be called cross_patch_loop-filter_enable_flag.

Figure 4C:
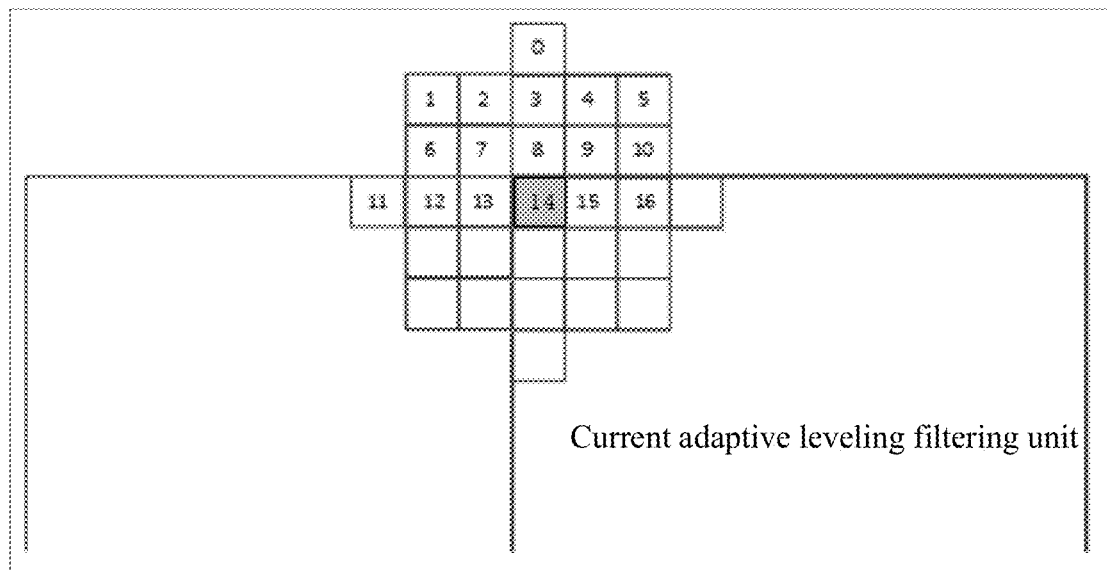
FIG. 4C is a schematic diagram illustrating a reference pixel position for filtering a current adaptive leveling filtering unit.

As shown in FIG. 4C, a pixel position subjected to adaptive leveling filtering within the current adaptive leveling filtering unit is the sample position 14, it is required to obtain a reference pixel sample beyond the current adaptive leveling filtering unit as shown in FIG. 4C. As shown in FIG. 4C, as an example, the reference pixel samples 0, 1, 2, 3, 4, 5, 6, 7, 8, 9, 10 are beyond the upper boundary of the current adaptive leveling filtering unit. When the values of the samples at these positions are not available, it is required to find other sample values instead.

When a filtered sample is at the upper left corner of the current adaptive leveling filtering unit, for example, when the sample values of the reference pixel samples at the positions 1, 2, 6 and 7 are not available, filtering is performed by using a value of a sample at a position closest to the samples 1, 2, 6 and 7 within the current adaptive leveling filtering unit. The sample position 14 is a position closest to the four points within the current adaptive leveling filtering unit, and filtering is performed by using the sample value of the sample position 14 to replace the values of the four samples.

When the sample values of the reference pixel samples at the positions 4, 5, 9, 10 are not available, filtering is performed by using a value of a sample at a position closest to the samples 4, 5, 9, 10 within the current adaptive leveling filtering unit. The sample 15 is a sample position closest to the samples 4 and 9 within the current adaptive leveling filtering unit, and thus, filtering can be performed by using the sample value of the sample position 15 to replace the values of the samples 4 and 9 respectively; The sample 16 is a sample position closest to the samples 5 and 10 within the current adaptive leveling filtering unit, and thus, filtering can be performed by using the sample value of the sample position 16 to replace the values of the samples 5 and 10 respectively. When the sample values of the reference pixel samples at the positions 0, 3 and 8 is unavailable, filtering is performed by using a sample value of a sample position closest to the samples 0, 3 and 8 within current adaptive leveling filtering unit. The sample 14 is a position closest to the three points within the current adaptive leveling filtering unit, and thus, filtering can be performed by using the sample value of the sample position 14 to replace the values of the above three samples respectively.

The above is only an example of a value obtaining manner when some of the reference pixel samples are not available, and is not meant to be exhaustive nor limit the scope of protection of the present disclosure.

The ALF optimization solution is explained in detail below.

Embodiment 16: Adaptive Region Partition with LCU as the Smallest Unit

Encoder Device

Taking the fixed region partition manner shown in FIG. 2 as an example, fixed region partition is performed on the luma component of a picture in the manner described in the "Region partition" section above. The luma component is partitioned into 16 regions, each region denoted as K, K∈[0,15], and one or more LCUs exist within each region.

The LCUs in a same region are further partitioned.

In some examples, the method of partitioning LCUs within a region may be LCU merging. A cost of paired merging of the LCUs is calculated and two LCUs with the smallest cost are merged and so on. All costs when only [1, $N_6$] class remains after merging are calculated and a partition manner with the smallest cost is selected. The final selection of each LCU is marked.

For example, at most two classes are obtained by partition, that is, $N_{6=2}$. Thus, each LCU is marked as 1 or 0, that is, the value of the region class identifier of the above LCU includes 1 or 0.

In some examples, for a LCU marked 0 (i.e. the value of the region class identifier is 0), the region class to which the LCU belongs is 2K; for a LCU marked 1 (i.e. the value of the region class identifier is 1), the class to which the LCU belongs is 2K+1.

In some examples, the luma component is partitioned into at most 32 regions. After region partition, region merging is performed on the 32 regions and a filtering coefficient of each merged region is calculated. The LCU region partition result (the region class identifier of each LCU) and the filtering coefficient obtained after region partition are notified to the decoder device via the bitstream data.

Decoder Device

The luma component of the picture can be subjected to fixed region partition in the manner described in the "region partition" above. The luma component is partitioned into 16 regions with its partition result shown in FIG. 2.

For any LCU in the region K, the region class identifier of the LCU can be obtained; the region class to which the LCU with the region class identifier 0 belongs is 2k; the region class to which the LCU with the region class identifier 1 belongs is 2K+1.

Based on the region class of each LCU and the filtering coefficients parsed from the bitstream data, the filtering coefficient of each LCU is determined and ALF is performed on the pixels of each LCU one by one based on the filtering coefficient of each LCU.

Embodiment 17: Optimization Solution in which 2 Sets of Filtering Coefficients can be Transmitted in Each Region Encoder Device Each LCU is identified. It is assumed that 0 indicates that ALF is disabled, 1 indicates that the first set of filtering coefficients is used, and 2 indicates that the second set of filtering coefficients is used, i.e. the value of the LCU coefficient identifier of the LCU includes 0, 1, and 2. The above first value is 0, and the non-first value is 1 or 2.

Coefficient identification is made for each region, where 0 indicates only the first set of filtering coefficients is used, 1 indicates only the second set of filtering coefficients is used, and 2 indicates two sets of filtering coefficient are used.

In some examples, the filter shape of the first set of filtering coefficients is as shown in FIG. 4A and the filter shape of the second set of filtering coefficients is as shown in FIG. 12 (centrosymmetric filter shape with 7*7 cross shape plus 3*3 square shape).

During the training of a filtering coefficient, when the filtering coefficient is calculated for the first time, the pixels of all LCUs in the current region are used as filtering parameters. After decision, the first set of coefficients is trained, and only the LCUs with the identifier 1 are used for training. When the second set of coefficients is trained, and only the LCUs with identifier 2 are used for training. Finally, based on the RDO decision, it is determined that performance of only one set of filters or two sets of filters is used in the current region.

If the performance of using the first set of filtering coefficients only is optimal, it is determined that the value of the region coefficient identifier is 0 and written into bitstream data. Further, the first set of filtering coefficients and the LCU coefficient identifier of each LCU are written into the bitstream data and the value of the LCU coefficient identifier of each LCU is 0 or 1. If the performance of using the second set of filtering coefficients only is optimal, it is determined that the value of the region coefficient identifier is 1 and written into bitstream data. Further, the second set of filtering coefficients and the LCU coefficient identifier of each LCU are written into the bitstream data and the value of the LCU coefficient identifier of each LCU is 0 or 1. If the performance of using two sets of filtering coefficients is optimal, it is determined that the value of the region coefficient identifier is 2 and written into bitstream data. Further, the two sets of filtering coefficients and the LCU coefficient identifier of each LCU are written into the bitstream data, and the value of the LCU coefficient identifier of each LCU is 0 or 1 or 2.

Decoder Device

For any merged region, the region coefficient identifier of the merged region is read from the bitstream data. If the value of the region coefficient identifier is 0, the merged region obtains 15 filtering coefficients (i.e. the first set of filtering coefficients); if the value of the region coefficient identifier is 1, the merged region obtains 9 filtering coefficients (i.e. the second set of filtering coefficients); if the value of the region coefficient identifier is 2, the merged region obtains 9 and 15 filtering coefficients respectively.

In some examples, if the value of the region coefficient identifier is 0, the LCU coefficient identifiers of all LCUs in the merged area are obtained; if the value of the LCU coefficient identifier is 0, it means that ALF is disabled for the LCU, i.e. no ALF is performed on this LCU; if the value of the LCU coefficient identifier is 1, it means that ALF is enabled for the LCU, i.e. ALF is performed on the LCU and the LCU uses the first set of filtering coefficients.

If the value of the region coefficient identifier is 1, the LCU coefficient identifiers of all LCUs in the merged area are obtained. If the value of the LCU coefficient identifier is 0, it means that ALF is disabled for the LCU, i.e. no ALF is performed on that LCU; if the value of the LCU coefficient identifier is 1, it means that ALF is enabled for the LCU, i.e. ALF is performed on the LCU and the LCU uses the second set of filtering coefficients.

If the value of the region coefficient identifier is 2, the LCU coefficient identifiers of all LCUs in the merged area are obtained. If the value of the LCU coefficient identifier is 0, it means that ALF is disabled for the LCU, i.e. no ALF is performed on the LCU; if the value of the LCU coefficient identifier is 1, it means that ALF is enabled for the LCU, i.e. ALF is performed on the LCU and this LCU uses the first set of filtering coefficients. If the value of the LCU coefficient identifier is 2, ALF is enabled for the LCU, i.e. ALF is performed on the LCU and the LCU uses the second set of filtering coefficients.

Embodiment 18: Adaptive Selection of One Set of Filtering Coefficients for Each LCU Encoder Device As an example, each LCU can select up to three sets of filtering coefficients. For any LCU, the candidate filtering coefficients of the LCU include the filtering coefficient of the merge region to which the LCU belongs (which may be called the filtering coefficient of the current merged region), the filtering coefficient of the previous merged region of the merged region to which the LCU belongs (which may be called the filtering coefficient of the previous merged region), and the filtering coefficient of the next merged region of the merged region to which the LCU belongs (which may be called the filtering coefficient of the next merged region).

For any LCU, the performances under 3 sets of filtering coefficients can be calculated respectively (the RDO decision), and one set of filtering coefficients with best performance is selected.

In some examples, if the filtering coefficient with best performance is a filtering coefficient of the previous merged region, the coefficient selection identifier of the LCU is 0 (with the above first value being 0 as an example); if the filtering coefficient with best performance is a filtering coefficient of the current merged region, the coefficient selection identifier of the LCU is 1 (with the above second value being 1 as an example); if the filtering coefficient with best performance is a filtering coefficient of the next merged region, the coefficient selection identifier of the LCU is 2 (with the above third value being 2 as an example).

Figure 10:
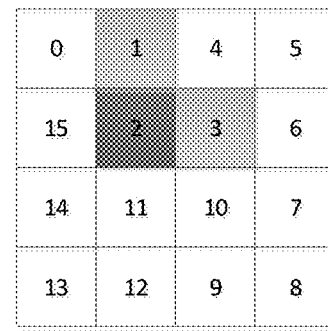
FIG. 10 is a schematic diagram illustrating a merged region according to an embodiment of the present disclosure.

For example, it is assumed that the merged regions of the current picture are as shown in FIG. 10, including 16 merged regions. When decision is made, if the LCU currently processed belongs to the merged region 2, the candidate filtering coefficients of the LCU may include the filtering coefficient of the merged region 1, the filtering coefficient of the merged region 2 and the filtering coefficient of the merged region 3. The filtering coefficient with the best performance can be determined based on RDO decision and the LCU can be marked based on the decision result.

As a chroma component (U-component or V-component) has only one set of filtering coefficients, its LCU may not participate in the selection of the filtering coefficient, or, the LCUs of two chroma components may select a filtering coefficient of the other component, i.e. the LCU of the U-component may select the filtering coefficient of the V-component and the LCU of the V-component may select the filtering coefficient of the U-component.

Decoder Device

The filtering coefficient of the merged region to which the current LCU belongs (i.e. the filtering coefficient of the current region) and the filtering coefficients of the two neighboring regions (i.e. the filter coefficient of the previous merged region and the filter coefficient of the next merged region) are obtained, and the filtering coefficient of the current LCU is selected according to the coefficient selection identifier of the LCU.

Since there is only one set of filtering coefficients for each of the two chroma components, their LCUs may not participate in the selection of the filtering coefficients, or, when the ALF enable flag is enabled for both chroma components, the LCUs of both chromas may select the filtering coefficient of the other component, i.e. the LCU of the U component may select the filtering coefficient of the V component and the LCU of the V component may select the filtering coefficient of the U component.

Embodiment 19: Selecting a Different Filter Shape for Each Region

Encoder Device

In some examples, the filter shape may be selected as in FIG. 4A or FIG. 9, or two or more of the four filter shapes may be selected as shown in FIG. 11A to FIG. 11D, or other filter shapes other than those shown in FIG. 4A, FIG. 9 and FIG. 11A to FIG. 11D are selected.

For any merged region, $N_3$ sets of filtering coefficients can be trained, which have different filter shapes. In each region, the performance of the merged region after using one of the filter shapes is calculated, and one set of filtering coefficients with best performance is selected. The corresponding filter shape is sent to the decoder device via the bitstream data, and the filtering coefficient with best performance in the merged region is also sent to the decoder device.

Decoder Device

For any LCU, when it is determined to perform ALF on the LCU, the filter shape of the merged region is obtained based on the merged region to which the LCU belongs, and the filtering coefficient of the merged region is obtained based on the filter shape.

When the filtering coefficient of the current LCU is determined, ALF may be performed on the pixels of the current LCU one by one based on the filtering coefficient of the current LCU.

Embodiment 20: Modification of a Symmetric Filter to an Asymmetric Filter

Encoder Device

Taking the filter shape shown in FIG. 4A as an example, the weight coefficient $A_i$ of the pixel value of the reference pixel of the position $C_i$ (i=0, 1, . . . , 13) can be determined, and in this case, the weight of the reference pixel value corresponding to its symmetric position $C_{28-i}$ is $2-A_i$.

In some examples, $A_i \in [0.5, 0.6, 0.8, 1.2, 1.4, 1.5, 1]$.

As shown in FIG. 4A, there are a total of 14 symmetrical positions, and the filtering coefficient and filtering performance of the region can be calculated when each position corresponds to a different weighting coefficient. One set of filtering coefficient with best filtering performance is selected, and the filtering coefficient and the weight coefficient corresponding to each position of the corresponding filter are recorded.

In some examples, for any weight coefficient, a number (or index) identifying the position of the weight coefficient in the weight coefficient set may be sent to the decoder device.

The decoder device obtains the filtering coefficient of each region and the weight coefficient corresponding to each filtering coefficient.

For any merged region, its filtering coefficients and the weight coefficient corresponding to the each filtering coefficient are obtained to derive the filtering coefficient of the corresponding position.

For the current filtered pixel of the LCU, the filtered pixel value of that pixel can be determined in the following equation:

$$P = \sum_{i=0}^{13}(C_i * A_i * P_i + C_i * (2 - A_i) * P_{28-i}) + C_{14} * P_{14}$$

In the above equation, $C_i$ is the (i+1)-th filtering coefficient in the filtering coefficients of the merged region to which the LCU belongs, $P_i$ is a pixel value of the reference pixel position corresponding to the filtering coefficient $C_i$, the reference pixel position corresponding to $P_{28-i}$ and the reference pixel position corresponding to $P_i$ are centrosymmetric about the pixel position of the current filtered pixel, $A_i$ is a weight coefficient of the pixel value of the reference pixel position corresponding to $P_i$, $P_{14}$ is the pixel value of the current filtered pixel, $C_{14}$ is the filtering coefficient of the current filtered pixel, and $0<A_i<2$.

Embodiment 21: Adaptive Selection of One Set of Filtering Coefficients for LCU In the process of filtering the pixels, for any to-be-filtered pixel, a maximum value and a minimum value of pixel values are obtained within a 3*3 pixel block (a 3*3 pixel block with the current filtered pixel as center, excluding the current to-be-filed pixel), that is, a maximum value and a minimum value of the pixel values of 8 pixels outside the central position within the 3*3 pixel block with the current to-be-filtered pixel as center are obtained.

If the pixel value of the current to-be-filtered pixel is greater than the maximum value or less than the minimum value, the maximum value or the minimum value in place of the pixel value of the current to-be-filtered pixel is involved in filtering. In other words, if the pixel value of the current to-be-filtered pixel is greater than the maximum value, the maximum value in place of the pixel value of the current to-be-filtered pixel is involved in filtering; the pixel value of the current to-be-filtered pixel is less than the minimum value, the minimum value in place of the pixel value of the current to-be-filtered pixel is involved in filtering.

The decoding process of the adaptive leveling filtering will be detailed below.

Embodiment 22: Decoding Process of the Adaptive Leveling Filtering

I. Definition of Adaptive Leveling Filtering Parameters

Parameter 1: adaptive leveling filtering enable flag (alf_enable_flag): binary variable. The value '1' indicates that adaptive leveling filtering is allowed; and the value '0' indicates that adaptive leveling filtering should not be used.

In some examples, the value of the AlfEnableFlag is equal to the value of alf_enable_flag. The value of alf_enable_flag can be obtained from a sequence header, i.e. before the entire sequence starts to be compressed, the value '1' indicates the ALF of the entire video sequence is enabled, and the value '0' indicates that the ALF of the entire video sequence is disabled. The AlfEnableFlag is a sequence header flag.

Parameter 2: the enhanced adaptive leveling filtering enable flag (ealf_enable_flag): binary variable. The value '1' indicates that the enhanced adaptive leveling filtering is allowed; and the value '0' indicates that the enhanced adaptive leveling filtering should not be used.

In some examples, the value of EalfEnableFlag is equal to the value of ealf_enable_flag, and its syntax is described as follows.

```
if (AlfEnableFlag) {
    ealf_enable_flag            u(1)
}
```

When the value of AlfEnableFlag is 1, the enhanced adaptive leveling filtering enable flag is read from the bitstream data, which is the sequence header flag.

Parameter 3, a picture-level adaptive leveling filtering enable flag (picture alf_enable_flag[compIdx]): binary variable. The value '1' indicates that adaptive leveling filtering is enabled for the compIdx-th component of the current picture; the value '0' indicates that adaptive leveling filtering is disabled for the compIdx-th component of the current picture.

In some examples, the value of PictureAlfEnableFlag[compIdx] is equal to the value of picture alf_enable_flag[compIdx], and its syntax is described as follows.

```
if (AlfEnableFlag) {
    for (compIdx=0; compIdx<3; compIdx++) {
        picture_alf_enable_flag[compIdx]    u(1)
    }
}
```

When the value of AlfEnableFlag is 1, the picture-level adaptive leveling filtering enable flags of the Y, U and V components are read from the bitstream data, which are the picture header flags.

Parameter 4: the adaptive leveling filtering coefficient of a picture luma component sample (alf_coeff_luma[i][j]): alf_coeff_luma[i][j] indicates the j-th coefficient of the i-th adaptive leveling filter of the luma component.

In some examples, the value of alfCoeffLuma[i][j] is equal to the value of alf_coeff_luma[i].

In some examples, if the value of EalfEnableFlag is 0, the value of AlfCoeffLuma[i][j] (j=0 to 7) should be −64 to 63, and the value of AlfCoeffLuma[i][8] should be −1088 to 1071.

If the value of EalfEnableFlag is 1, the value of AlfCoeffLuma[i][j] (j=0 to 13) should be −64 to 63, and the value of AlfCoeffLuma[i][14] should be −1088 to 1071.

Parameter x: the accuracy of the adaptive leveling filtering coefficients of each set of picture luma component samples. If x=0, the value of AlfCoeffLuma[i][j] (j=0~13) should be −32~32, if x=1, the value of AlfCoeffLuma[i][j](j=0~13) should be −64~63, if x=2, the value of AlfCoeffLuma[i]W(j=0~13) should be −128 to 128.

Parameter 5, the adaptive leveling filtering coefficient of the picture chroma component (alf_coeff_chroma[0][j], alf_coeff_chroma[1][j]): alf_coeff_chroma[0][j] indicates the j-th adaptive leveling filtering coefficient of the Cb component, alf_coeff_chroma[1][j] indicates the j-th adaptive leveling filtering coefficient of the Cr component.

In some examples, the value of AlfCoeffChroma[0][j] is equal to the value of alf_coeff_chroma[0][j] and the value of AlfCoeffChroma[1][j] is equal to the value of alf_coeff_chroma[1][j].

In some examples, if the value of EalfEnableFlag is 0, the value of AlfCoeffChroma[i][j] (i=0 to 1, j=0 to 7) should be −64 to 63, and the value of AlfCoeffChroma[i][8] (i=0 to 1) should be −1088 to 1071.

If the value of EalfEnableFlag is 1, the value of AlfCoeffChroma[i][j] (i=0 to 1, j=0 to 13) should be −64 to 63, and the value of AlfCoeffChroma[i] (i=0 to 1) should be −1088 to 1071.

Parameter y: the accuracy of the adaptive leveling filtering coefficient of each set of picture chroma components. If y=0, the value of AlfCoeffLuma[i][j](j=0~13) should be −32~32, if y=1, the value of AlfCoeffLuma[i][j](j=0~13) should be −64~63, if y=2, the value of AlfCoeffLuma[i][j](j=0~13) should be −128 to 128.

Parameter 6: the number of neighboring adaptive leveling filtering regions of the picture luma component (alf_region_distance[i]): alf_region_distance[i] indicates a difference between a starting number of the basic units of the i-th adaptive leveling filtering region of the luma component and the starting number of the basic units of the (i−1)-th adaptive leveling filtering region.

In some examples, the value of alf_region_distance[i] is 1 to FilterNum−1.

In some examples, when there is no alf_region_distance[i] in the bitstream, if i is equal to 0, the value of alf_region_distance[i] is 0; if i is not equal to 0 and the value of alf_filter_num_minus1 is FilterNum−1, the value of alf_region_distance[i] is 1.

In some examples, a sum of alf_region_distance[i] (i=0 to alf_filter_num_minus1) should be less than or equal to FilterNum−1.

Parameter 7: adaptive leveling filtering enable flag for the largest coding unit (alf_lcu_enable_flag[compIdx][LcuIndex]): binary variable. The value '1' indicates that adaptive leveling filtering is enabled for the sample of the compIdx-th component of the LcuIndex-th largest coding unit; the value '0' indicates that adaptive leveling filtering is disabled for the sample of the compIdx-th component of the LcuIndex-th largest coding unit.

In some examples, the value of alfLCUEnableFlag[compIdx][LcuIndex] is equal to the value of alf_lcu_enable_flag[compIdx][LcuIndex], and its syntax is described as follows.

```
if (PictureAlfEnableFlag[0] == 1 || PictureAlfEnableFlag[1] == 1 ||
PictureAlfEnableFlag[2] == 1) {
  alf_parameter_set( )
}
```

If the value of one of the picture level adaptive leveling filtering enable flags of the three components is 1, the following adaptive leveling filtering parameters are obtained: If EalfEnableFlag=1, the number of filtering coefficients is 15 and the luma component is partitioned into 64 regions; otherwise the number of filtering coefficients is 9 and the luma component is partitioned into 16 regions. The filtering coefficients of the three components are obtained respectively. If the picture level adaptive leveling filtering enable flag is enabled, it is required to obtain, for the chroma, the filtering coefficient of the component alf_coeff_chroma; it is required to obtain, for the luma, a region merging manner flag alf_region_order_idx, the number of the filtering coefficients minus 1 (alf_filter_num_minus1), region merging result (alf_region_distance[i]) and each filtering coefficient (alf_coeff_luma).

The syntax description of the above adaptive leveling filtering parameters can be as follows.

|  | Descriptors |
|---|---|
| Definition of adaptive leveling filtering parameters | |
| alf_parameter_set( ) { | |
| if (EalfEnableFlag) { | |
| coeffNum = 15 | |
| FilterNum = 64 | |
| } | |
| else { | |
| FilterNum = 16 | |
| coeffNum = 9 | |
| } | |
| if (PictureAlfEnableFlag[0] == 1) { | |
| alf_filter_num_minus1 | ue(v) |
| if (EalfEnableFlag) { | |
| alf_region_order_idx | u(2) |
| } | |
| for (i=0; i<alf_filter_num_minus1+1; i++) { | |
| if ((i > 0) && (alf_filter_num_minus1 != FilterNum)) | |
| alf_region_distance[i] | ue(v) |
| for (j=0; j<coeffNum; j++) | |
| alf_coeff_luma[i][j] | se(v) |
| } | |
| } | |
| if (PictureAlfEnableFlag[1] == 1) { | |
| for (j=0; j<coeffNum; j++) | |
| alf_coeff_chroma[0][j] | se(v) |
| } | |
| if (PictureAlfEnableFlag[2] == 1) { | |
| for (j=0; j<coeffNum; j++) | |
| alf_coeff_chroma[1][j] | se(v) |
| } | |
| } | |

II. Specific Decoding Process of Adaptive Leveling Filtering

If the value of PictureAlfEnableFlag[compIdx] is 0, the value of the offset sample component is used directly as the value of the corresponding reconstructed sample component; otherwise, adaptive leveling filtering is performed on the corresponding offset sample component. In some examples, the compIdx equal to 0 indicates a luma component, and the compIdx equal to 1 indicates a Cb component and the compIdx equal to 2 indicates a Cr component.

The unit of the adaptive leveling filtering is an adaptive leveling filtering unit derived from the largest coding unit and processed sequentially in a raster scan order. The adaptive leveling filtering coefficient of each component is first obtained based on the adaptive leveling filtering coefficient decoding process, the adaptive leveling filtering unit is derived, and then the index of the adaptive leveling filtering coefficient of the luma component of the current adaptive leveling filtering unit is determined, and finally, based on the luma and chrom components of the adaptive leveling filtering unit, adaptive leveling filtering is performed to obtain a reconstructed sample.

Adaptive Leveling Filtering Coefficient Decoding Process 22.1.1. If EalfEnableFlag is equal to 0, the i-th set of filtering coefficients AlfCoeffLuma[i][j] of the luma sample is parsed from the bitstream data (i=0 to alf_filter_num_minus1, j=0 to 7). The following processing is performed for the coefficient AlfCoeffLuma[i][8] (i.e. $C_8$ in the filter shown in FIG. 9).

$$AlfCoeffLuma[i][8] \mathrel{+}= 64 - \sum_{j=0}^{7} 2 \times AlfCoeffLuma[i][j]$$

In the equation, the bit width of AlfCoeffLuma[i][j] (j=0 to 7) is 7 bits, which are in a range of −64 to 63; the value of AlfCoeffLuma[i][8] processed as above is 0 to 127.

If EalfEnableFlag is equal to 1, the i-th set of filtering coefficients AlfCoeffLuma[i][j] of the luma sample is parsed from the bitstream data (i=0 to alf_filter_num_minus1, j=0 to 13). The following processing is performed for the coefficient AlfCoeffLuma[i][14] (i.e. $C_{14}$ in the filter shown in FIG. 4A).

$$AlfCoeffLuma[i][14] \mathrel{+}= 64 - \sum_{j=0}^{13} 2 \times AlfCoeffLuma[i][j]$$

In the equation, the bit width of AlfCoeffLuma[i][j] (j=0 to 13) is 7 bits, which is in a range of −64 to 63; the value of AlfCoeffLuma[i][14] processed as above is 0 to 127.

22.1.2. The index array of the adaptive leveling filtering coefficients of the luma component (denoted as alfCoeffIdxTab[FilterNum]) is obtained based on alf_region_distance[i](i>1):

```
count = 0
alfCoeffIdxTab[0] = 0
for(i=1; i<alf_filter_num_minus1+1; i++) {
  for(j=0; j<alf_region_distance[i]−1; j++) {
    alfCoeffIdxTab[count+1] = alfCoeffIdxTab[count]
    count = count + 1
  }
  alfCoeffIdxTab[count+1] = alfCoeffIdxTab[count] + 1
  count = count + 1
}
for(i=count; i<FilterNum; i++) {
  alfCoeffIdxTab[i] = alfCoeffIdxTab[count]
}
```

22.1.3. If EalfEnableFlag is equal to 0, the filtering coefficients AlfCoeffChroma[0][j] and AlfCoeffChroma[1][j] (j=0 to 7) of the chroma sample are parsed from the bitstream data. The coefficients AlfCoeffChroma[0][8] and AlfCoeffChroma[1][8] (i.e. $C_8$ in the filter shown in FIG. 9) are processed as follows.

$$AlfCoeffChroma[i][8] \mathrel{+}= 64 - \sum_{j=0}^{7} 2 \times AlfCoeffChroma[i][j], i = 0, 1$$

In the equation, the bit width of AlfCoeffChroma[i][j] (j=0 to 7) is 7 bits, which is in a range of −64 to 63; the value of AlfCoeffChroma[i][8] processed as above is 0 to 127.

If EalfEnableFlag is equal to 1, the filtering coefficients AlfCoeffChroma[0][j] and AlfCoeffChroma[1][j] (j=0 to 13) of the chroma sample are parsed from the bit stream. The coefficients AlfCoeffChroma[0][14] and AlfCoeffChroma[1][14] (i.e. $C_{14}$ in the filter shown in FIG. 4A) are processed as follows.

$$AlfCoeffChroma[i][14] \mathrel{+}= 64 - \sum_{j=0}^{13} 2 \times AlfCoeffChroma[i][j],$$

$$i = 0, 1$$

In the equation, the bit width of AlfCoeffChroma[i][j] (j=0 to 13) is 7 bits, which is in a range of −64 to 63; the value of AlfCoeffChroma[i] processed as above is 0 to 127.

Adaptive leveling filtering unit is derived.

The adaptive leveling filtering unit is derived based on the largest coding unit in the following steps (as shown in FIG. 5).

22.2.1. A sample region D is obtained by deleting a part of the sample region where the current maximum coding unit C is located beyond the picture boundary.

22.2.2. If the sample where the lower boundary of the sample region D is located does not belong to the lower boundary of the picture, the lower boundary of the sample region D of the luma component and the chroma component is shrunk four rows upward to generate a sample region E1; otherwise, the sample region E1 is made equal to the sample region D. The last row of sample of the sample region D is the lower boundary of the region.

22.2.3. If the sample where the upper boundary of the sample region E1 is located belongs to the upper boundary of the picture, or belongs to the patch boundary and the value of crosspatch_loopfilter_enable_flag is '0', the sample region E2 is made equal to the sample region E1; otherwise, the upper boundary of the sample region E1 of the luma component and the chroma component is extended four rows upward to generate a sample region E2. The first row of sample of the sample region E1 is the upper boundary of the region.

22.2.4. The sample region E2 is used as the current adaptive leveling filtering unit. The first row of sample of the picture is the upper boundary of the picture, and the last row of sample of the picture is the lower boundary.

The index of the adaptive leveling filtering coefficient of the luma component adaptive leveling filtering unit is determined.

If the value of EalfEnableFlag is equal to 0, the index of the adaptive leveling filter coefficient (denoted as filterIdx) of the current luma component adaptive leveling filtering unit is calculated according to the following method.

```
xInterval = ((((horizontal_size + (1 << LcuSizeInBit) − 1) >>
LcuSizeInBit) + 1) >> 2) <<
LcuSizeInBit
yInterval = ((((vertical_size + (1 << LcuSizeInBit) − 1) >>
LcuSizeInBit) + 1) >> 2) <<
LcuSizeInBit
if (xInterval == 0 && yInterval == 0) {
  index = 15
}
else if (xInterval == 0) {
  index = Min(3, y/yInterval) * 4 + 3
}
else if (yInterval == 0) {
  index = Min(3, x/xInterval) + 12
}
```

-continued

```
    else {
        index = Min(3, y/yInterval) * 4 + Min(3, x/xInterval)
    }
    filterIdx = alfCoeffIdxTab[regionTable[index]]
``` where (x, y) is the coordinate of the sample of the upper left corner of the largest coding unit of the derived current adaptive leveling filtering unit in the picture, and the regionTable is defined as follows.

regionTable[16]={0, 1, 4, 5, 15, 2, 3, 6, 14, 11, 10, 7, 13, 12, 9, 8}

If EalfEnableFlag is equal to 1, the index of the adaptive leveling filtering coefficient (denoted as filterIdx) of the current luma component adaptive leveling filtering unit is calculated according to the following method.

```
lcu_width = 1 << LcuSizeInBit
lcu_height = 1 << LcuSizeInBit
y_interval = ((((vertical_size + lcu_height − 1) / lcu_height) +
4) / 8 * lcu_height)
x_interval = ((((horizontal_size + lcu_width − 1) / lcu_width) +
4) / 8 * lcu_width)
if (yInterval == 0) {
y_st_offset=0
}
else {
y_cnt = Clip3(0, 8, (vertical_size + y_interval − 1) / y_interval)
y_st_offset = vertical_size − y_interval * (y_cnt − 1)
y_st_offset = (y_st_offset + lcu_height / 2) / lcu_height *lcu_height
}
if (xInterval == 0) {
x_st_offset=0
}
else {
x_cnt = Clip3(0, 8, (horizontal_size + x_interval − 1) / x_interval)
x_st_offset = horizontal_size − x_interval * (x_cnt − 1)
x_st_offset = (x_st_offset + lcu_width / 2) / lcu_width *lcu_width
}
y_index = (y_interval == 0) ? 7 : Clip3(0, 7, y / y_interval)
y_index_offset = y_index <<3
y_index2 = (y_interval == 0 || y < y_st_offset) ? 0 :
Clip3(−1, 6, (y − y_st_offset) / y_interval)
+ 1
y_index_offset2 = y_index2<<3
x_index = (x_interval == 0) ? 7: Clip3(0, 7, x / x_interval)
x_index2 = (x_interval == 0 || x < x_st_offset) ? 0 :
Clip_post(−1, 6, (x − x_st_offset) /
x_interval) + 1
if (AlfRegionOrderIndex == 0) {
filterIdx = alfCoeffIdxTab[regionTable[0][y_index_offset +
x_index]]
}
else if (AlfRegionOrderIndex == 1)
filterIdx = alfCoeffIdxTab[regionTable[1][ y_index_offset +
x_index2]]
}
else if (AlfRegionOrderIndex == 2)
filterIdx=alfCoeffIdxTab[regionTable[2][ y_index_offset2 +
x_index2]]
}
else if (AlfRegionOrderIndex == 3)
filterIdx= alfCoeffIdxTab[regionTable[3][ y_index_offset2 +
x_index]]
}
``` where (x, y) is the coordinate of the sample of the upper left corner of the largest coding unit of the derived current adaptive leveling filtering unit in the picture, and the regionTable is defined as follows.

```
regionTable[4][64]={
{63, 60, 59, 58, 5, 4, 3, 0, 62, 61, 56, 57, 6, 7, 2, 1, 49, 50, 55, 54, 9, 8,
13, 14, 48, 51, 52, 53, 10, 11, 12, 15, 47, 46, 33, 32, 31, 30, 17, 16, 44,
45, 34, 35, 28, 29, 18, 19, 43, 40, 39, 36, 27, 24, 23, 20, 42, 41, 38, 37,
26, 25, 22, 21},
{42, 43, 44, 47, 48, 49, 62, 63, 41, 40, 45, 46, 51, 50, 61, 60, 38, 39, 34,
33, 52, 55, 56, 59, 37, 36, 35, 32, 53, 54, 57, 58, 26, 27, 28, 31, 10, 9, 6,
5, 25, 24, 29, 30, 11, 8, 7, 4, 22, 23, 18, 17, 12, 13, 2, 3, 21, 20, 19, 16,
15, 14, 1, 0},
{21, 22, 25, 26, 37, 38, 41, 42, 20, 23, 24, 27, 36, 39, 40, 43, 19, 18, 29,
28, 35, 34, 45, 44, 16, 17, 30, 31, 32, 33, 46, 47, 15, 12, 11, 10, 53, 52,
51, 48, 14, 13, 8, 9, 54, 55, 50, 49, 1, 2, 7, 6, 57, 56, 61, 62, 0, 3, 4, 5,
58, 59, 60, 63},
{0, 1, 14, 15, 16, 19, 20, 21, 3, 2, 13, 12, 17, 18, 23, 22, 4, 7, 8, 11, 30,
29, 24, 25, 5, 6, 9, 10, 31, 28, 27, 26, 58, 57, 54, 53, 32, 35, 36, 37, 59,
56, 55, 52, 33, 34, 39, 38, 60, 61, 50, 51, 46, 45, 40, 41, 63, 62, 49, 48,
47, 44, 43, 42}}
```

Adaptive Leveling Filtering Operation

If the left boundary of the current adaptive leveling filtering unit is the picture boundary, or beyond the patch boundary and the value of CplfEnableFlag is 0, the beyond-left-boundary region does not exist, otherwise beyond-left-boundary region is the region by which the current adaptive leveling filtering unit moves three sample points leftward to the current adaptive leveling filtering unit.

If the right boundary of the current adaptive leveling filtering unit is the picture boundary, or beyond the patch boundary and the value of CplfEnableFlag is 0, the beyond-right-boundary region does not exist, otherwise beyond-right-boundary region is the region by which the current adaptive leveling filtering unit moves three sample points leftward to the current adaptive leveling filtering unit.

In some examples, the boundary region includes the beyond-left-boundary region and the beyond-right-boundary region.

If AlfLCUEnableFlag[compIdx][LcuIndex] is equal to 1, adaptive leveling filtering is performed on the compIdx component, otherwise no adaptive leveling filtering is performed.

If EalfEnableFlag is equal to 0, when the sample used in the adaptive leveling filtering process is a sample within the adaptive leveling filtering unit, the sample may be directly used for filtering; when the sample used in the adaptive leveling filtering process is not a sample within the adaptive leveling filtering unit, the filtering will be performed as follows.

22.3.1. If the sample is beyond the picture boundary, or beyond the patch boundary and the value of CplfEnableFlag is 0, filtering is performed by using a sample closest to the sample within the adaptive leveling filtering unit to replace the sample.

22.3.2. If the sample is beyond the upper or lower boundary of the adaptive leveling filtering unit, filtering is performed by using a sample closest to the sample within the adaptive leveling filtering unit to replace the sample.

22.3.3. If neither of the conditions in 22.3.1 and 22.3.2 is satisfied, the sample is used for filtering.

In some examples, the adaptive leveling filtering operation for the luma component of the adaptive leveling filtering unit is as follows.

```
ptmp = AlfCoeffLuma[filterIdx][8] * p(x, y)
for(j=0; j<8; j++) {
ptmp += AlfCoeffLuma[filterIdx][j] * (p(x−Hor[j], y−Ver[j]) + p(x+Hor[j],
y+Ver[j])
```

-continued

```
}
ptmp = (ptmp + 32) >> 6
p'(x, y) = Clip3(0, (1 << BitDepth) - 1, ptmp)
```

Where p(x,y) is an offset sample, p'(x,y) is a reconstructed sample, Hor[j] and Ver[j] (j=0 to 7).

In some examples, the adaptive leveling filtering operation for the chroma component of the adaptive leveling filtering unit is as follows.

```
ptmp = AlfCoeffChroma[i][8] * p(x, y)
for(j=0; j<8; j++) {
ptmp += AlfCoeffChroma[i][j] * (p(x-Hor[j], y-Ver[j]) + p(x+Hor[j], y+Ver[j]))
}
ptmp = (ptmp + 32) >> 6
p'(x, y) = Clip3(0, (1 << BitDepth) - 1, ptmp)
``` where p(x,y) is an offset sample and p'(x,y) is a reconstructed sample, Hor[j] and Ver[j] (j=0 to 7) can be shown in Table 1.

TABLE 1

Offset values of the sample compensation filtering coordinates

| The value of j | The value of Hor[j] | The value of Ver[j] |
|---|---|---|
| 0 | 0 | 3 |
| 1 | 0 | 2 |
| 2 | 1 | 1 |
| 3 | 0 | 1 |
| 4 | 1 | −1 |
| 5 | 3 | 0 |
| 6 | 2 | 0 |
| 7 | 1 | 0 |

If EalfEnableFlag is equal to 1, when the sample used in the adaptive leveling filtering process is a sample within the adaptive leveling filtering unit, the sample can be directly used for filtering; when the sample used in the adaptive leveling filtering process is not a sample within the adaptive leveling filtering unit, the filtering will be performed as follows.

22.4.1. If the sample is beyond the picture boundary, or beyond the patch boundary and the value of CplfEnableFlag is 0, 22.4.1.1. with the filter shown in FIG. 4A as an example, if this sample corresponds to the position $C_1$, $C_2$, $C_6$, $C_4$, $C_5$ or $C_{10}$ of the filter shape, filtering is performed by using a sample closest to the sample within the adaptive leveling filtering unit and the boundary region to replace the sample.

22.4.1.2. Otherwise, filtering is performed by using a sample closest to the sample within the adaptive leveling filtering unit to replace the sample.

22.4.2. If the sample is beyond the upper or lower boundary of the adaptive leveling filtering unit, 22.4.2.1. with the filter shown in FIG. 4A as an example, if this sample corresponds to the position $C_1$, $C_2$, $C_6$, $C_4$, $C_5$ or $C_{10}$ of the filter shape, filtering is performed by using a sample closest to the sample within the adaptive leveling filtering unit and the boundary region to replace the sample.

22.4.2.2. Otherwise, filtering is performed by using a sample closest to the sample within the adaptive leveling filtering unit to replace the sample.

22.4.3. If neither of the conditions in 22.4.1 and 22.4.2 is satisfied, this sample is used for filtering.

In some examples, the adaptive leveling filtering operation for the luma component of the adaptive leveling filtering unit is as follows.

```
ptmp = AlfCoeffLuma[filterIdx][14] * p(x, y)
for(j=0; j<14; j++) {
ptmp += AlfCoeffLuma[filterIdx][j] * (p(x-Hor[j], y-Ver[j]) + p(x+Hor[j], y+Ver[j]))
}
ptmp = (ptmp + 32) >> 6
p'(x, y) = Clip3(0, (1 << BitDepth) - 1, ptmp)
``` where p(x,y) is an offset sample and p'(x,y) is a reconstructed sample, Hor[j] and Ver[j] (j=0 to 13) can be shown in Table 2.

In some examples, the adaptive leveling filtering operation for the chroma component of the adaptive leveling filtering unit is as follows.

```
ptmp = AlfCoeffChroma[i][14] * p(x, y)
for(j=0; j<14; j++) {
ptmp += AlfCoeffChroma[i][j] (p(x-Hor[j], y-Ver[j]) + p(x+Hor[j], y+Ver[j]))
}
ptmp = (ptmp + 32) >> 6
p'(x, y) = Clip3(0, (1 << BitDepth) - 1, ptmp)
```

TABLE 2

Offset values of sample compensation filtering coordinates

| The value of j | The value of Hor[j] | The value of Ver[j] |
|---|---|---|
| 0 | 0 | 3 |
| 1 | 2 | 2 |
| 2 | 1 | 2 |
| 3 | 0 | 2 |
| 4 | 1 | −2 |
| 5 | 2 | −2 |
| 6 | 2 | 1 |
| 7 | 1 | 1 |
| 8 | 0 | 1 |
| 9 | 1 | −1 |
| 10 | 2 | −1 |
| 11 | 3 | 0 |
| 12 | 2 | 0 |
| 13 | 1 | 0 |

Embodiment 23

Figure 15A:
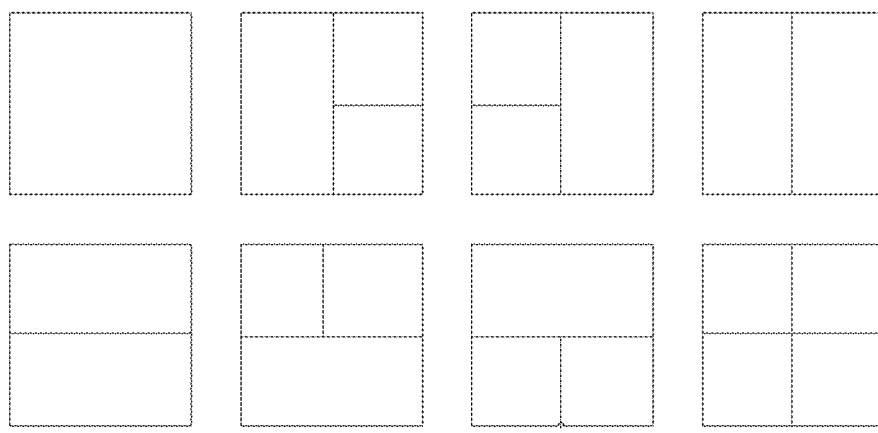
FIG. 15A and FIG. 15B are schematic diagrams illustrating a secondary partition of a region obtained by a fixed region partition manner, according to an embodiment of the present disclosure.
Figure 15B:
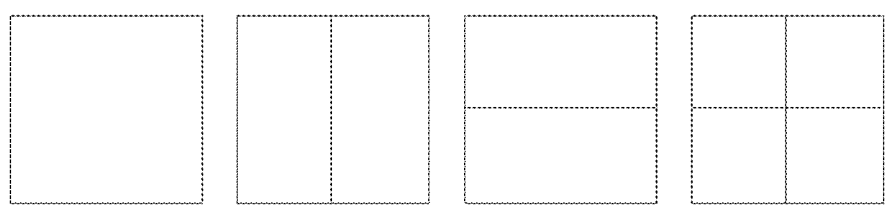

First, the picture can be subjected to fixed region partition with the fixed region partition result shown in FIG. 2, so as to obtain the index value of each region. For each region therein, the region may be partitioned based on the 8 partition manners as shown in FIG. 15A, or some partition manners shown in FIG. 15A are retained as shown in FIG. 15B.

For each region, the encoder device may determine the final partition manner based on the RDO decision and send the partition manner for each region to the decoder device via the bitstream data. In some examples, with the final partition manner in FIG. 15A as an example, the regions obtained by 16 fixed partition manners can be partitioned into up to 64 regions.

Figure 15C:
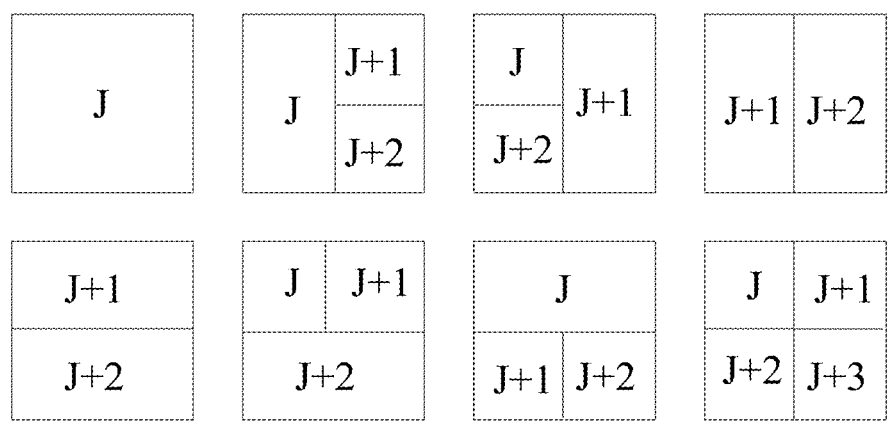
FIG. 15C is a schematic diagram illustrating a region number corresponding to each secondary partition manner in FIG. 15A according to an embodiment of the present disclosure.

In a decoding process, the decoder device may first perform fixed region partition and then read the specific partition manner of each region from the bitstream data, so as to obtain the final partition manner of the whole picture. In some examples, for each partition manner in FIG. 15A, the partitioned region numbers may be as shown in FIG. 15C. In some examples, the value of J is the index value of the maximum value of the previous region+1.

Embodiment 24

With the smallest unit of the fixed region partition being LCU, when the resolution of the picture is small, there are some regions which only retain numbers but do not contain any picture information. For such a case, after the fixed region partition result is determined, which class does not contain picture information can be determined.

In some examples, this can be determined based on the number of LCUs contained in the width and height of the picture. If the fixed region partition is a fixed 4*4 region with the index of each region as shown in FIG. 2. When the number of the LCUs contained in the width and the height is less than four, there may be regions on some rows or columns, which do not contain picture information. These regions which do not contain picture information are marked as set G, where the size of the set G is denoted as $N_7$, and $N_7$ is a positive integer.

For any index value i in all index values,
24.1. i=0 if i is equal to any element of the set G;
24.2. If i is not equal to any element of the set G, but greater than n elements in the set G, i=i−k; k≤$N_7$.

The above-mentioned embodiments are only specific examples of the implementations of the embodiments of the present disclosure, and not intended to limit the scope of protection of the present disclosure. Based on the above-mentioned embodiments, new embodiments can be obtained by performing combinations between embodiments, or variations to embodiments, and shall fall within the scope of protection of the present disclosure.

In addition, the implementation processes for the encoder and decoder of the above-mentioned embodiments can be cross-referenced.

The above descriptions are made to the methods of the embodiments of the present disclosure. The following descriptions will be made to an apparatus provided by the present disclosure.

In an embodiment of the present disclosure, there is provided a filtering apparatus. The filtering apparatus may be applied to an encoder device or decoder device. The apparatus may include a filtering unit, which is configured to: determine whether enhanced adaptive leveling filtering is enabled for a current adaptive leveling filtering unit; if it is determined that the enhanced adaptive leveling filtering is enabled for the current adaptive leveling filtering unit, perform adaptive leveling filtering on the current adaptive leveling filtering unit by using a first filter; if it is determined that the enhanced adaptive leveling filtering is disabled for the current adaptive leveling filtering unit, perform adaptive leveling filtering on the current adaptive leveling filtering unit by using a second filter. The first filter is a centrosymmetric filter with a 7*7 cross shape plus a 5*5 square shape; and the second filter is a centrosymmetric filter with a 7*7 cross shape plus a 3*3 square shape.

In one example, the filtering unit is further configured to: in a process of performing adaptive leveling filtering on a current filtered pixel within the current adaptive leveling filtering unit, for any reference pixel of the current filtered pixel, when the reference pixel is within the current adaptive leveling filtering unit, perform adaptive leveling filtering by using a pixel value of the reference pixel; when the reference pixel is not within the current adaptive leveling filtering unit, the filtering unit is further configured to: if the pixel value of the reference pixel is not available, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

In one example, the unavailability of the pixel value of the reference pixel includes one of the followings: the reference pixel is beyond a picture boundary of a current picture; the reference pixel is beyond a patch boundary of a current patch and disallows performing filtering by crossing the patch boundary; and the reference pixel is beyond an upper boundary of the current adaptive leveling filtering unit; or the reference pixel is beyond a lower boundary of the current adaptive leveling filtering unit.

in one example, the filtering unit is further configured to: if it is determined that the enhanced adaptive leveling filtering is enabled for the current adaptive leveling filtering unit and the pixel value of the pixel position for performing adaptive leveling filtering on the current adaptive leveling filtering unit is not available, perform adaptive leveling filtering by using a pixel closest to the reference pixel within the current adaptive leveling filtering unit to replace the reference pixel; if it is determined that the enhanced adaptive leveling filtering is disabled for the current adaptive leveling filtering unit and the pixel value of the pixel location for performing adaptive leveling filtering on the current adaptive leveling filtering unit is not available, perform adaptive leveling filtering by using a pixel closest to the reference pixel within the current adaptive leveling filtering unit to replace the reference pixel.

In one example, the filtering unit determines whether the enhanced adaptive leveling filtering is enabled for the current adaptive leveling filtering unit, which includes: determining a value of a flag for indicating whether the enhanced adaptive leveling filtering is enabled for the current adaptive leveling filtering unit; when the value of the flag is a first value, determining the enhanced adaptive leveling filtering is enabled for the current adaptive leveling filtering unit; and when the value of the flag is a second value, determining the enhanced adaptive leveling filtering is disabled for the current adaptive leveling filtering unit.

In one example, the flag for indicating whether the enhanced adaptive leveling filtering is enabled for the current adaptive leveling filtering unit may be EalfEnableFlag, the value of which may be decoded from the decoder device, or obtained from a bitstream data at the decoder device; or a constant value.

In an example, obtaining the value of the EalfEnableFlag from the bitstream data at the decoder device may include: determining the value of the EalfEnableFlag based on a value of an enhanced adaptive leveling filtering enable flag parsed from the bitstream data, where the enhanced adaptive leveling filtering enable flag may be a sequence level parameter.

Figure 16:
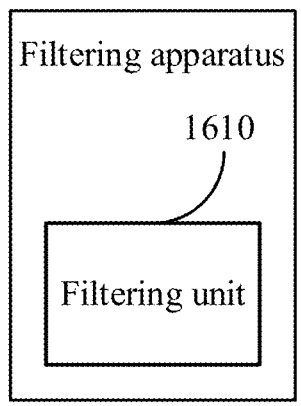
FIG. 16 is a schematic diagram illustrating a structure of a filtering apparatus according to an embodiment of the present disclosure.

Referring to FIG. 16, it is a structural schematic diagram illustrating a filtering apparatus provided in an embodiment of the present disclosure. The filtering apparatus may be applied to encoding encoder/decoder device. The filtering apparatus may include a filtering unit 1610, which is configured to: in a process of performing adaptive leveling filtering on a current filtered pixel within the current adaptive leveling filtering unit, for any reference pixel of the current filtered pixel, when the reference pixel is within the current adaptive leveling filtering unit, perform adaptive leveling filtering by using a pixel value of the reference pixel; when the reference pixel is not within the current adaptive leveling filtering unit, the filtering unit 1610 is further configured to: if the pixel value of the reference pixel is not available, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

In one example, the unavailability of the pixel value of the reference pixel includes one of the followings: the reference pixel is beyond a picture boundary of a current picture; the reference pixel is beyond a patch boundary of a current patch and disallows performing filtering by crossing the patch boundary; and the reference pixel is beyond an upper boundary or a lower boundary of the current adaptive leveling filtering unit.

Figure 17:
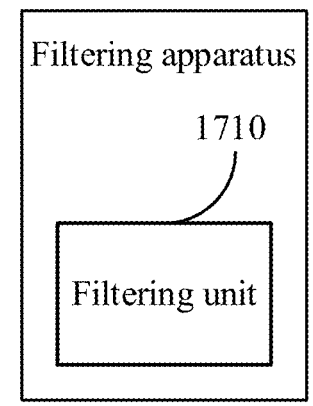
FIG. 17 is a schematic diagram illustrating a structure of a filtering apparatus according to an embodiment of the present disclosure.

Referring to FIG. 17, it is a structural schematic diagram illustrating a filtering apparatus provided by an embodiment of the present application. The filtering apparatus may be applied to encoding encoder/decoder device. The apparatus may include a filtering unit 1710 which is configured to: determine whether enhanced adaptive leveling filtering is enabled for a current adaptive leveling filtering unit; if it is determined that the enhanced adaptive leveling filtering is enabled for the current adaptive leveling filtering unit, perform adaptive leveling filtering on the current adaptive leveling filtering unit by using a first filter; if it is determined that the enhanced adaptive leveling filtering is disabled for the current adaptive leveling filtering unit, perform adaptive leveling filtering on the current adaptive leveling filtering unit by using a second filter. The first filter is a centrosymmetric filter with a 7*7 cross shape plus a 5*5 square shape; and the second filter is a centrosymmetric filter with a 7*7 cross shape plus a 3*3 square shape.

In one example, the filtering unit 1710 determines whether the enhanced adaptive leveling filtering is enabled for the current adaptive leveling filtering unit, which includes: determining a value of a flag for indicating whether the enhanced adaptive leveling filtering is enabled for the current adaptive leveling filtering unit; when the value of the flag is a first value, determining the enhanced adaptive leveling filtering is enabled for the current adaptive leveling filtering unit; and when the value of the flag is a second value, determining that the enhanced adaptive leveling filtering is disabled for the current adaptive leveling filtering unit.

In one example, the filtering unit 1710 is further configured to: in a process of performing adaptive leveling filtering on a current filtered pixel within the current adaptive leveling filtering unit, for any reference pixel of the current filtered pixel, when the reference pixel is within the current adaptive leveling filtering unit, perform adaptive leveling filtering by using a pixel value of the reference pixel; when the reference pixel is not within the current adaptive leveling filtering unit, the filtering unit 1710 is further configured to: if the pixel value of the reference pixel is not available, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

In one example, the unavailability of the pixel value of the reference pixel includes one of the followings: the reference pixel is beyond a picture boundary of a current picture; the reference pixel is beyond a patch boundary of a current patch and disallows performing filtering by crossing the patch boundary; and the reference pixel is beyond an upper boundary or a lower boundary of the current adaptive leveling filtering unit.

In one example, the filtering unit 1710 is further configured to: if it is determined that the enhanced adaptive leveling filtering is enabled for the current adaptive leveling filtering unit and the pixel value of the pixel position for performing adaptive leveling filtering on the current adaptive leveling filtering unit is not available, perform adaptive leveling filtering by using a pixel closest to the reference pixel within the current adaptive leveling filtering unit to replace the reference pixel; if it is determined that the enhanced adaptive leveling filtering is disabled for the current adaptive leveling filtering unit and the pixel value of the pixel location for performing adaptive leveling filtering on the current adaptive leveling filtering unit is not available, perform adaptive leveling filtering by using a pixel closest to the reference pixel within the current adaptive leveling filtering unit to replace the reference pixel.

Figure 18:
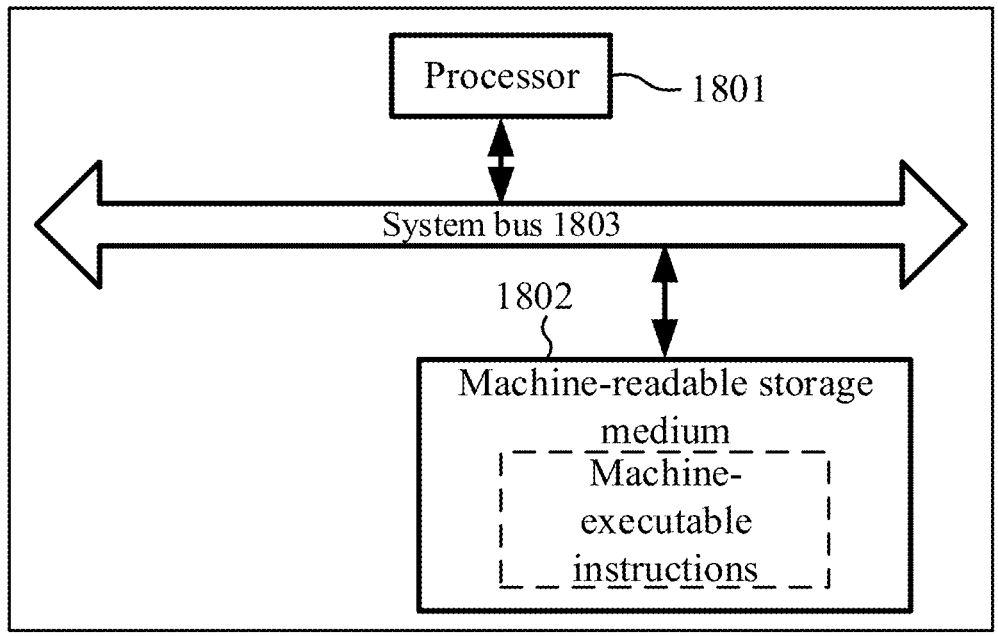
FIG. 18 is a schematic diagram illustrating a hardware structure of a decoder device according to an embodiment of the present disclosure.

FIG. 18 is a schematic diagram of a hardware structure of a decoder device according to an embodiment of the present disclosure. The decoder device may include a processor 1801, a machine-readable storage medium 1802 on which machine-executable instructions are stored. The processor 1801 and the machine-readable storage medium 1802 may communicate via a system bus 1803. Furthermore, by reading and executing the machine-executable instructions corresponding to the filtering control logic in the machine-readable storage medium 1802, the processor 1801 may execute the filtering method applied to the decoder device as described above.

A machine-readable storage medium 1802 referred to herein may be any electronic, magnetic, optical or other physical storage device that contains or stores information, such as executable instructions, data, etc. For example, a machine-readable storage medium may be: RAM (Radom Access Memory), volatile memory, non-volatile memory, flash memory, storage drives (e.g. hard disk drives), solid state drives, any type of storage disk (e.g. CD-ROM, dvd, etc.), or similar storage media, or a combination thereof.

In some embodiments, there is also provided a machine-readable storage medium storing machine-executable instructions within the machine-readable storage medium. The machine-executable instructions are executed by a processor to implement the filtering method applied to the decoder device as described above. For example, said machine-readable storage medium may be ROM, RAM, CD-ROM, magnetic tape, floppy disk and optical data storage device, etc.

Figure 19:
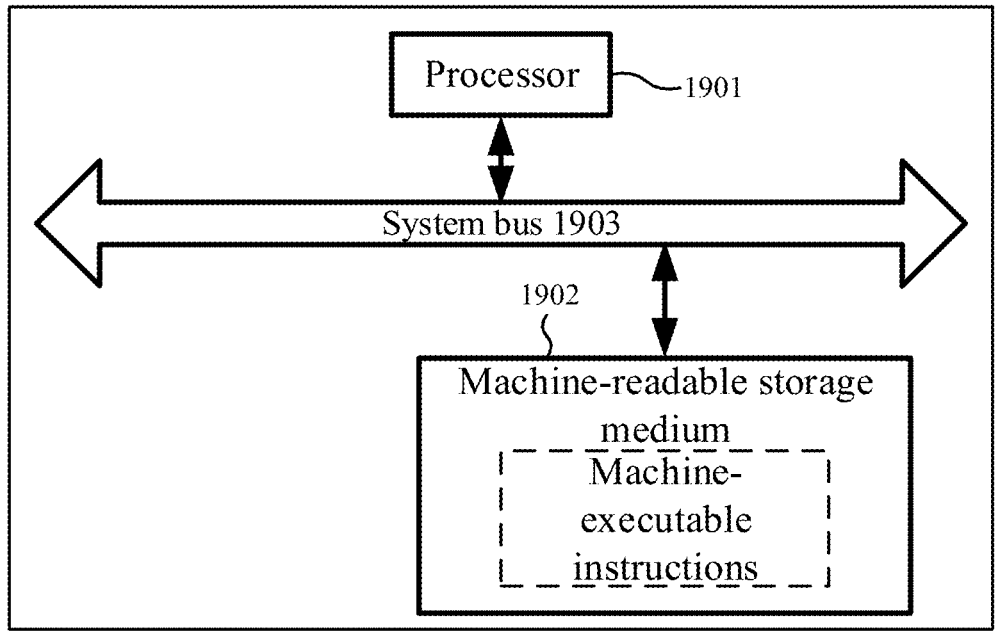
FIG. 19 is a schematic diagram illustrating a hardware structure of an encoder device according to an embodiment of the present disclosure.

FIG. 19 is a schematic diagram of a hardware structure of encoder device according to an embodiment of the present disclosure. The encoder device may include a processor 1901, a machine-readable storage medium 1902 on which machine-executable instructions are stored. The processor 1901 and the machine-readable storage medium 1902 may communicate via a system bus 1903. Furthermore, by reading and executing the machine-executable instructions corresponding to the filtering control logic in the machine-readable storage medium 1902, the processor 1901 may execute the filtering method applied to the encoder device as described above.

A machine-readable storage medium 1902 referred to herein may be any electronic, magnetic, optical or other physical storage device that contains or stores information, such as executable instructions, data, etc. For example, a machine-readable storage medium may be: RAM (Radom Access Memory), volatile memory, non-volatile memory, flash memory, storage drives (e.g. hard disk drives), solid-state drives, any type of storage disk (e.g. CD-ROM, DVD, etc.), or similar storage media, or a combination thereof.

In some embodiments, there is also provided a machine-readable storage medium having machine-executable instructions stored within the machine-readable storage medium. The machine-executable instructions are executed by a processor to implement the filtering method described above as applied to the encoder device. For example, the machine-readable storage medium may be ROM, RAM, CD-ROM, magnetic tape, floppy disk and optical data storage device, etc.

In some embodiments, there is also provided a camera device including the filtering apparatus of any of the above embodiments.

It is noted that in this text, relationship terms such as first and second are used only to distinguish one entity or operation from another, without necessarily requiring or implying any such actual relationship or order between those entities or operations. Furthermore, the terms "including", "comprising" or any other variant thereof are intended to cover non-exclusive inclusion, such that a process, method, article or apparatus including a series of elements includes not only those elements but also other elements not expressly listed, or also other elements inherent to the process, method, article or apparatus. Without further limitation, the elements defined by the statement "including a . . . " do not preclude the existence of additional identical elements in the process, method, article or apparatus including the elements.

The above descriptions are made to preferred embodiments of the present disclosure, and not intended to limit the present disclosure. Any modification, equivalent substitution, improvement, etc. within the spirit and principles of the present application shall be included within the scope of protection of the present application.

The invention claimed is:

1. A filtering method, applied to an encoder device or a decoder device, the method comprising:
    determining whether enhanced adaptive leveling filtering is enabled for a current adaptive leveling filtering unit;
    if it is determined that the enhanced adaptive leveling filtering is enabled for the current adaptive leveling filtering unit, performing adaptive leveling filtering on the current adaptive leveling filtering unit by using a first filter; and
    if it is determined that the enhanced adaptive leveling filtering is disabled for the current adaptive leveling filtering unit, performing adaptive leveling filtering on the current adaptive leveling filtering unit by using a second filter,
    wherein the first filter comprises a centrosymmetric filter with a 7*7 cross shape plus a 5*5 square shape, and the second filter comprises a centrosymmetric filter with a 7*7 cross shape plus a 3*3 square shape,
    wherein determining whether the enhanced adaptive leveling filtering is enabled for the current adaptive leveling filtering unit comprises:
        determining a value of a flag for indicating whether the enhanced adaptive leveling filtering is enabled for the current adaptive leveling filtering unit;
        when the value of the flag is a first value, determining that the enhanced adaptive leveling filtering is enabled for the current adaptive leveling filtering unit; and
        when the value of the flag is a second value, determining that the enhanced adaptive leveling filtering is disabled for the current adaptive leveling filtering unit,
    wherein the value of the flag is decoded from the decoder device, or obtained from bitstream data at the decoder device, or a constant value, and
    wherein obtaining the value of the flag from the bitstream data at the decoder device comprises:
        determining the value of the flag based on a value of an enhanced adaptive leveling filtering enable flag parsed from the bitstream data, wherein the enhanced adaptive leveling filtering enable flag is a sequence level parameter.

2. The method of claim 1, wherein, in a process of performing adaptive leveling filtering on a current filtered pixel within the current adaptive leveling filtering unit, for a reference pixel of the current filtered pixel,
    when the reference pixel is not within the current adaptive leveling filtering unit, the method further comprises:
        if the pixel value of the reference pixel is unavailable, performing adaptive leveling filtering by using a pixel closest to the reference pixel within the current adaptive leveling filtering unit to replace the reference pixel; and
        if the pixel value of the reference pixel is available, performing adaptive leveling filtering by using the pixel value of the reference pixel.

3. The method of claim 2, wherein unavailability of the pixel value of the reference pixel comprises one of:
    the reference pixel is beyond a picture boundary of a current picture;
    the reference pixel is beyond a patch boundary of a current patch and disallows performing filtering by crossing the patch boundary;
    the reference pixel is beyond an upper boundary of the current adaptive leveling filtering unit; or
    the reference pixel is beyond a lower boundary of the current adaptive leveling filtering unit.

4. The method of claim 2, further comprising:
    if it is determined that the enhanced adaptive leveling filtering is enabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel; and
    if it is determined that the enhanced adaptive leveling filtering is disabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel.

5. A decoder device, comprising:
    at least one processor; and
    at least one non-transitory machine-readable storage medium storing machine executable instructions executable by the at least one processor to:

determine whether enhanced adaptive leveling filtering is enabled for a current adaptive leveling filtering unit;

if it is determined that the enhanced adaptive leveling filtering is enabled for the current adaptive leveling filtering unit, perform adaptive leveling filtering on the current adaptive leveling filtering unit by using a first filter; and if it is determined that the enhanced adaptive leveling filtering is disabled for the current adaptive leveling filtering unit, perform adaptive leveling filtering on the current adaptive leveling filtering unit by using a second filter, wherein the first filter comprises a centrosymmetric filter with a 7*7 cross shape plus a 5*5 square shape, and the second filter comprises a centrosymmetric filter with a 7*7 cross shape plus a 3*3 square shape, wherein determining whether the enhanced adaptive leveling filtering is enabled for the current adaptive leveling filtering unit comprises:

determining a value of a flag for indicating whether the enhanced adaptive leveling filtering is enabled for the current adaptive leveling filtering unit;

when the value of the flag is a first value, determining that the enhanced adaptive leveling filtering is enabled for the current adaptive leveling filtering unit; and when the value of the flag is a second value, determining that the enhanced adaptive leveling filtering is disabled for the current adaptive leveling filtering unit, wherein the value of the flag is decoded from the decoder device, or obtained from bitstream data at the decoder device, or a constant value, and wherein obtaining the value of the flag from the bitstream data at the decoder device comprises:

determining the value of the flag based on a value of an enhanced adaptive leveling filtering enable flag parsed from the bitstream data, wherein the enhanced adaptive leveling filtering enable flag is a sequence level parameter.

6. An encoder device, comprising:
at least one processor; and
at least one non-transitory machine-readable storage medium storing machine executable instructions executable by the at least one processor to implement the filtering method of claim 1.

7. A non-transitory machine-readable storage medium, storing machine executable instructions thereon, wherein the machine executable instructions are executed by at least one processor to cause the at least one processor to perform the filtering method of claim 1.

8. A camera device, comprising a filtering apparatus, wherein the filtering apparatus is configured to:

determine whether enhanced adaptive leveling filtering is enabled for a current adaptive leveling filtering unit;

if it is determined that the enhanced adaptive leveling filtering is enabled for the current adaptive leveling filtering unit, perform adaptive leveling filtering on the current adaptive leveling filtering unit by using a first filter; and if it is determined that the enhanced adaptive leveling filtering is disabled for the current adaptive leveling filtering unit, perform adaptive leveling filtering on the current adaptive leveling filtering unit by using a second filter, wherein the first filter comprises a centrosymmetric filter with a 7*7 cross shape plus a 5*5 square shape, and the second filter comprises a centrosymmetric filter with a 7*7 cross shape plus a 3*3 square shape, wherein determining whether the enhanced adaptive leveling filtering is enabled for the current adaptive leveling filtering unit comprises:

determining a value of a flag for indicating whether the enhanced adaptive leveling filtering is enabled for the current adaptive leveling filtering unit;

when the value of the flag is a first value, determining that the enhanced adaptive leveling filtering is enabled for the current adaptive leveling filtering unit; and when the value of the flag is a second value, determining that the enhanced adaptive leveling filtering is disabled for the current adaptive leveling filtering unit, wherein the value of the flag is decoded from a decoder device, or obtained from bitstream data at the decoder device, or a constant value, and wherein obtaining the value of the flag from the bitstream data at the decoder device comprises:

determining the value of the flag based on a value of an enhanced adaptive leveling filtering enable flag parsed from the bitstream data, wherein the enhanced adaptive leveling filtering enable flag is a sequence level parameter.

9. The decoder device of claim 5, wherein in a process of performing adaptive leveling filtering on a current filtered pixel within the current adaptive leveling filtering unit, for a reference pixel of the current filtered pixel, when the reference pixel is not within the current adaptive leveling filtering unit, the processor is further configured to:

if the pixel value of the reference pixel is unavailable, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

10. The decoder device of claim 9, wherein unavailability of the pixel value of the reference pixel comprises one of:

the reference pixel is beyond a picture boundary of a current picture;

the reference pixel is beyond a patch boundary of a current patch and disallows performing filtering by crossing the patch boundary;

the reference pixel is beyond an upper boundary of the current adaptive leveling filtering unit; or the reference pixel is beyond a lower boundary of the current adaptive leveling filtering unit.

11. The decoder device of claim 9, wherein the at least one processor is further configured to:

if it is determined that the enhanced adaptive leveling filtering is enabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel; and if it is determined that the enhanced adaptive leveling filtering is disabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel.

12. The encoder device of claim 6, wherein in a process of performing adaptive leveling filtering on a current filtered pixel within the current adaptive leveling filtering unit, for a reference pixel of the current filtered pixel, when the reference pixel is not within the current adaptive leveling filtering unit, the at least one processor is further configured to:

if the pixel value of the reference pixel is unavailable, perform adaptive leveling filtering by using a pixel closest to the reference pixel within the current adaptive leveling filtering unit to replace the reference pixel; and if the pixel value of the reference pixel is available, perform adaptive leveling filtering by using the pixel value of the reference pixel.

13. The encoder device of claim 12, wherein unavailability of the pixel value of the reference pixel comprises one of:

the reference pixel is beyond a picture boundary of a current picture;

the reference pixel is beyond a patch boundary of a current patch and disallows performing filtering by crossing the patch boundary;

the reference pixel is beyond an upper boundary of the current adaptive leveling filtering unit; or the reference pixel is beyond a lower boundary of the current adaptive leveling filtering unit.

14. The encoder device of claim 12, wherein the at least one processor is further configured to:

if it is determined that the enhanced adaptive leveling filtering is enabled for the current adaptive leveling filtering unit and the pixel value of the reference pixel for performing adaptive leveling filtering on the current adaptive leveling filtering unit is not available, performing adaptive leveling filtering by using a pixel closest to the reference pixel within the current adaptive leveling filtering unit to replace the reference pixel; and if it is determined that the enhanced adaptive leveling filtering is disabled for the current adaptive leveling filtering unit and the pixel value of the reference pixel for performing adaptive leveling filtering on the current adaptive leveling filtering unit is unavailable, performing adaptive leveling filtering by using a pixel closest to the reference pixel within the current adaptive leveling filtering unit to replace the reference pixel.

* * * * *